US012638632B2

(12) United States Patent
Chiao et al.

(10) Patent No.: US 12,638,632 B2
(45) Date of Patent: May 26, 2026

(54) LIGHT SOURCE MODULE

(71) Applicant: HannStar Display Corporation, Taipei City (TW)

(72) Inventors: Yu-Chi Chiao, Taipei City (TW); Hsu-Ho Wu, Taipei City (TW); Chen-Hao Su, Taipei City (TW); Chun-Ming Hsu, Taipei City (TW); Yen-Chung Chen, Taipei City (TW); Yung-Chih Wang, Taipei City (TW); Chin-Hui Chen, Taipei City (TW); Hsin Liang Lai, Taipei City (TW); Heng-I Chang, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 0 days.

(21) Appl. No.: 19/052,295

(22) Filed: Feb. 13, 2025

(65) Prior Publication Data

US 2025/0291103 A1 Sep. 18, 2025

Related U.S. Application Data

(60) Provisional application No. 63/568,440, filed on Mar. 22, 2024, provisional application No. 63/566,927, (Continued)

(30) Foreign Application Priority Data

Aug. 16, 2024 (TW) ................................. 113130941

(51) Int. Cl.
*F21V 8/00* (2006.01)
(52) U.S. Cl.
CPC ......... *G02B 6/0036* (2013.01); *G02B 6/0038* (2013.01); *G02B 6/0043* (2013.01);
(Continued)

(58) Field of Classification Search
CPC .. G02B 6/0036; G02B 6/0038; G02B 6/0043; G02B 6/0058
See application file for complete search history.

(56) References Cited

U.S. PATENT DOCUMENTS 8,262,273 B2 * 9/2012 Yu ........................ G02B 6/0036
362/621
9,632,231 B2 * 4/2017 Zhou .................... G02B 6/0036
(Continued)

FOREIGN PATENT DOCUMENTS

JP 2000149635 5/2000
JP 2010067568 3/2010
(Continued)

OTHER PUBLICATIONS

Translated Notice of Allowance for Japanese counter-part application. Apr. 10, 2026 (Year: 2026).*
(Continued)

*Primary Examiner* — Keith G. Delahoussaye
(74) *Attorney, Agent, or Firm* — JCIPRNET

(57) ABSTRACT

A light source module including a light guide plate, a first light source and a plurality of optical microstructures is provided. The light guide plate has a first light incident surface, a first side surface and a first surface. The first light incident surface and the first side surface connect the first surface. The first surface has a first area and a second area. The second area is located between the first area and one of the first light incident surface and the first side surface. A first light source is disposed on one side of the first light incident surface of the light guide plate. A plurality of optical microstructures are disposed on the first surface. A distribution density of the plurality of optical microstructures in the first area is less than a distribution density of the plurality of optical microstructures in the second area.

17 Claims, 39 Drawing Sheets

Related U.S. Application Data filed on Mar. 19, 2024, provisional application No. 63/565,542, filed on Mar. 15, 2024.

(52) U.S. Cl.
CPC ......... G02B 6/0045 (2013.01); G02B 6/0058 (2013.01); G02B 6/0061 (2013.01); G02B 6/0068 (2013.01)

(56) References Cited

U.S. PATENT DOCUMENTS

| | | | | |
|---|---|---|---|---|
| 2002/0030985 | A1* | 3/2002 | Ohkawa | G02B 6/0071 |
| | | | | 362/614 |
| 2012/0002444 | A1 | 1/2012 | Kim et al. | |
| 2014/0098563 | A1 | 4/2014 | Kim et al. | |
| 2014/0104885 | A1* | 4/2014 | Zhang | G02B 5/0242 |
| | | | | 362/625 |
| 2015/0268404 | A1 | 9/2015 | Chiu et al. | |
| 2016/0047970 | A1* | 2/2016 | Kim | G02B 6/0055 |
| | | | | 362/606 |
| 2024/0045130 | A1 | 2/2024 | Shao et al. | |

FOREIGN PATENT DOCUMENTS

| | | |
|---|---|---|
| JP | 2012094540 | 5/2012 |
| JP | 2014127461 | 7/2014 |
| JP | 2015069706 | 4/2015 |
| JP | 2015153522 | 8/2015 |
| JP | 2017041438 | 2/2017 |
| JP | 2017107768 | 6/2017 |
| JP | 2019507477 | 3/2019 |
| JP | 2020161405 | 10/2020 |
| TW | 201636708 | 10/2016 |
| TW | I574061 | 3/2017 |
| TW | I644148 | 12/2018 |
| TW | M603123 | 10/2020 |
| TW | I752721 | 1/2022 |
| WO | 2023195996 | 10/2023 |

OTHER PUBLICATIONS

Translated Notice of Refusal for Japanese counter-part application. Jan. 26, 2026 (Year: 2026).*
"Partial Search Report of Europe Counterpart Application", issued on Aug. 4, 2025, p. 1-p. 16.
"Office Action of Japan Counterpart Application", issued on Jan. 26, 2026, p. 1-p. 7.

* cited by examiner

OMS-1

OMS-2

OMS-3

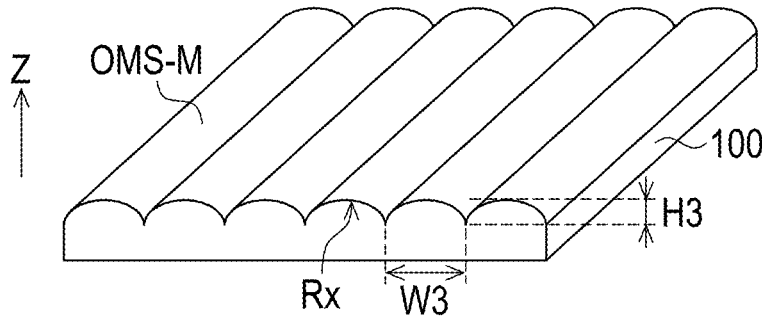
FIG. 16A
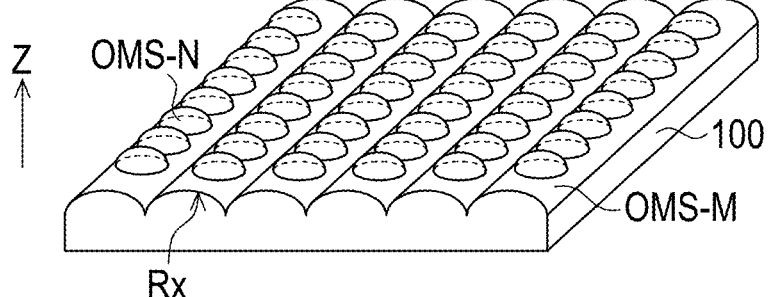
FIG. 16B
FIG. 16C
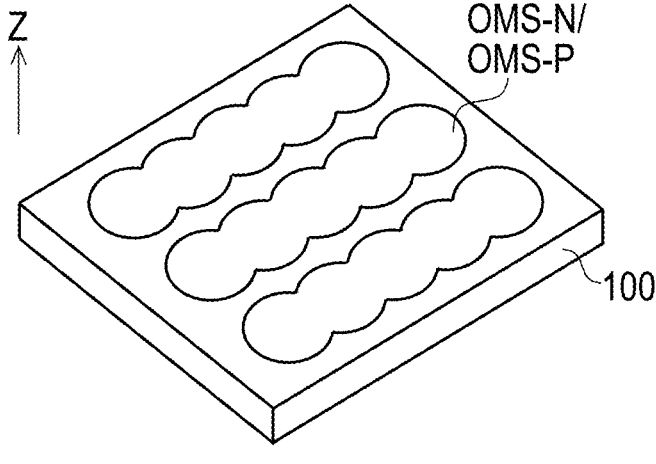
FIG. 16D

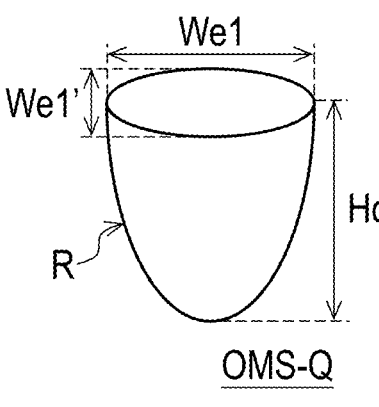
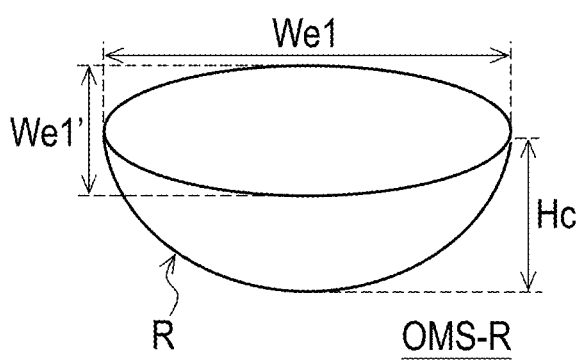
FIG. 17A          FIG. 17B
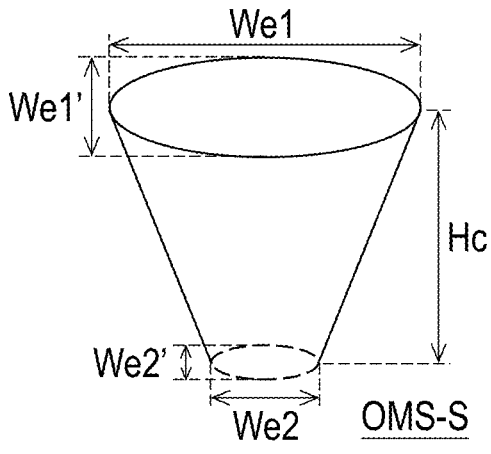
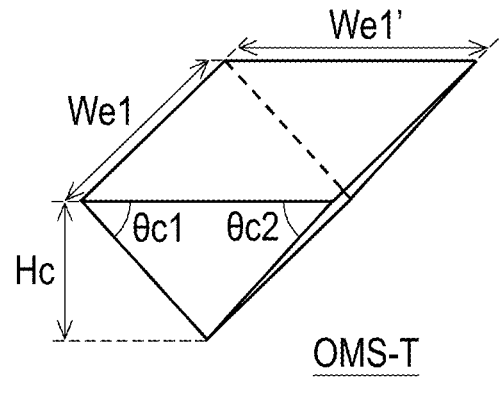
FIG. 17C          FIG. 17D
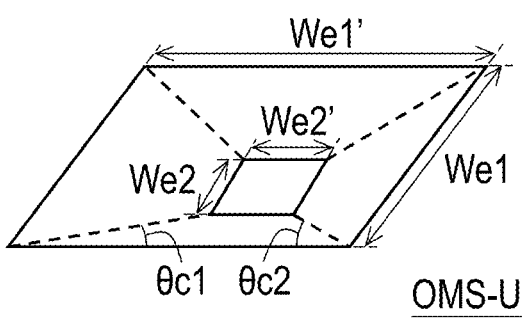
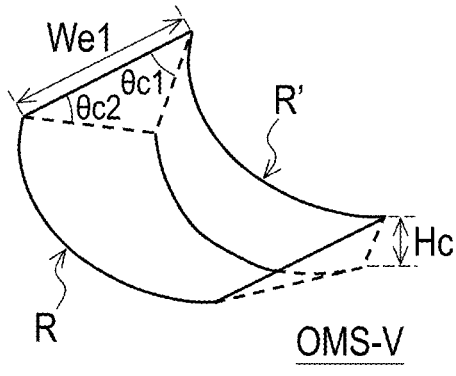
FIG. 17E          FIG. 17F

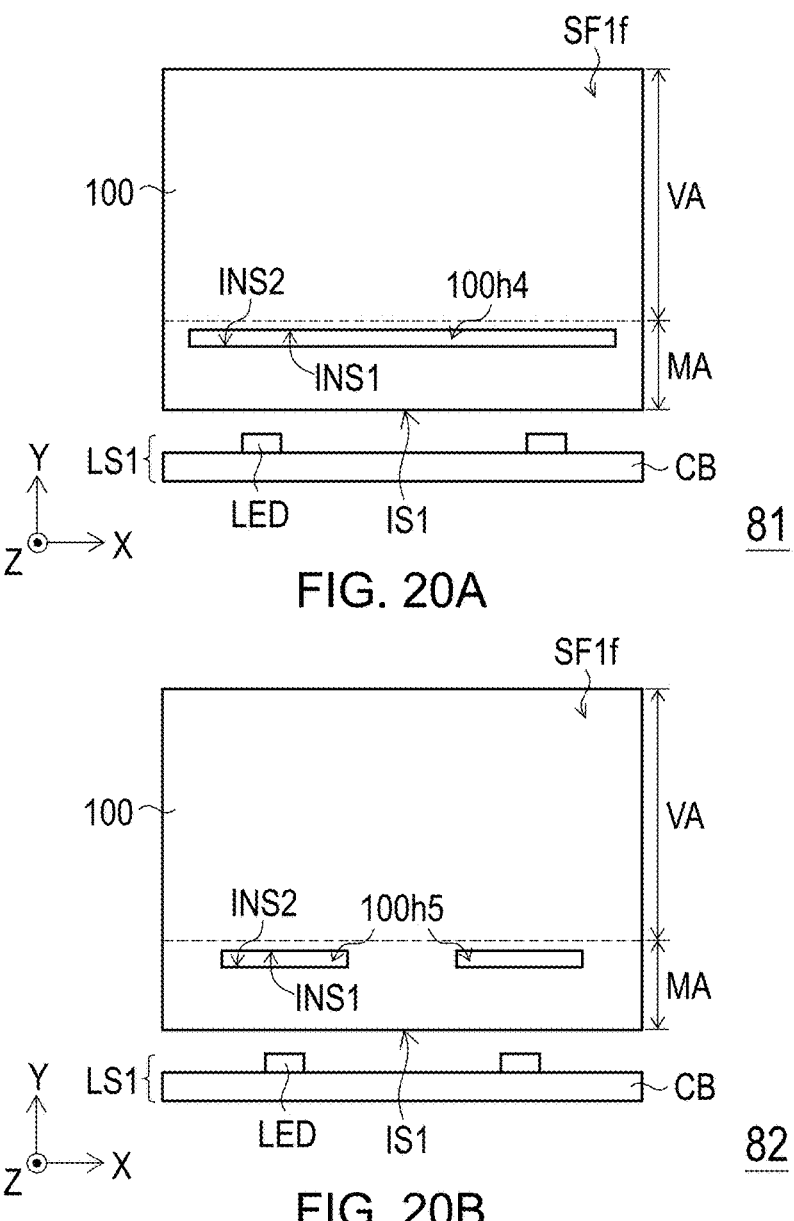
FIG. 20A
FIG. 20B
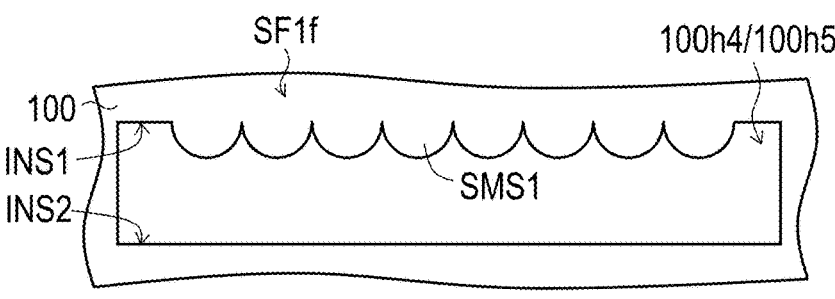
FIG. 21A

LIGHT SOURCE MODULE

CROSS-REFERENCE TO RELATED APPLICATION

This application claims the priority benefit of U.S. provisional application Ser. No. 63/565,542, filed on Mar. 15, 2024, U.S. provisional application Ser. No. 63/566,927, filed on Mar. 19, 2024, U.S. provisional application Ser. No. 63/568,440, filed on Mar. 22, 2024, and Taiwan application serial no. 113130941, filed on Aug. 16, 2024. The entirety of the above-mentioned patent applications is hereby incorporated by reference herein and made a part of this specification.

BACKGROUND

Technical Field

The invention relates to a light source module, and more particularly, to a light source module provided with a light guide plate.

Description of Related Art

For non-self-luminous display panels, such as reflective LCD panels or transmissive LCD panels, the use of light source modules can meet the application needs of such display panels in different environments. To achieve a slim appearance, most current light source modules adopt a side-light design, where the light source is positioned adjacent to a side surface of the light guide plate, and the side surface is connected to the light emitting surface of the light guide plate. However, such a design can easily worsen the light uniformity of the light source module at large viewing angles, resulting in poor visual effects or reduced display contrast.

SUMMARY

The invention provides a light source module with better uniformity of light emission at large viewing angles.

A light source module of the invention includes a light guide plate, a first light source and a plurality of optical microstructures. The light guide plate has a first light incident surface, a first side surface and a first surface. The first light incident surface and the first side surface connect the first surface. The first surface of the light guide plate has a first area and a second area. The second area is located between the first area and one of the first light incident surface and the first side surface. A first light source is disposed on one side of the first light incident surface of the light guide plate. A plurality of optical microstructures are disposed on the first surface. A distribution density of the plurality of optical microstructures in the first area is less than a distribution density of the plurality of optical microstructures in the second area.

In an embodiment of the invention, the first light source of the light source module includes a plurality of first light emitting devices and a plurality of second light emitting devices. The plurality of first light emitting devices and the plurality of second light emitting devices are arranged along a direction parallel to the first light incident surface. The plurality of first light emitting devices are arranged according to a first pitch. The plurality of second light emitting devices are arranged according to a second pitch. The first pitch is greater than the second pitch.

In an embodiment of the invention, the light source module further includes a second light source disposed on one side of a second light incident surface of the light guide plate. The first light incident surface and the second light incident surface are opposite or connected to each other. The first surface of the light guide plate further has a third area. The first area is located between the second area and the third area. A distribution density of the plurality of optical microstructures in the third area is greater than the distribution density of the plurality of optical microstructures in the first area.

In an embodiment of the invention, the plurality of optical microstructures of the light source module are recessed or protruded from the first surface. Each of the plurality of optical microstructures has a structural height along a normal direction of the first surface. The structural heights of the plurality of optical microstructures gradually increase and then gradually decrease along a direction away from an edge of the first surface or gradually decrease and then gradually increase along the direction away from the edge of the first surface.

In an embodiment of the invention, the light guide plate of the light source module further has a second surface connected to the first light incident surface. The second surface faces away from the first surface. At least one of the first surface and the second surface is a curved surface.

In an embodiment of the invention, a distance between the first surface and the second surface of the light source module gradually increases and then gradually decreases along a direction away from an edge of the first surface or gradually decreases and then gradually increases along the direction away from the edge of the first surface.

In an embodiment of the invention, one of the first surface and the second surface of the light source module is a concave curved surface, and the other of the first surface and the second surface is a convex curved surface.

In an embodiment of the invention, the plurality of optical microstructures of the light source module are recessed from the first surface and each has a first optical surface, a second optical surface and a bottom surface connected to the first optical surface and the second optical surface. A first included angle is provided between the first optical surface and a virtual extension surface of the bottom surface. A second included angle is provided between the second optical surface and the bottom surface. The second included angle is greater than or equal to the first included angle. The first included angle and the second included angle are each greater than or equal to 40 degrees and less than or equal to 50 degrees.

In an embodiment of the invention, the first surface of the light source module has a plurality of openings each defining a corresponding one of the plurality of optical microstructures. The opening and the bottom surface of one of the plurality of optical microstructures respectively have a first width and a second width along a normal direction of the first light incident surface. The first width is greater than or equal to the second width.

In an embodiment of the invention, a cross-sectional profile of each of the first optical surface and the second optical surface of the light source module is linear, curvilinear, a polyline or a combination of linear and curvilinear.

In an embodiment of the invention, the plurality of optical microstructures of the light source module include a plurality of first optical microstructures protruded from the first surface and a plurality of second optical microstructures recessed from the first surface. The plurality of first optical microstructures are spaced apart from the plurality of second optical microstructures.

In an embodiment of the invention, each of the plurality of first optical microstructures of the light source module has a first optical surface and a second optical surface connected to each other. The first optical surface is located between the first light incident surface and the second optical surface. A first included angle is provided between the first optical surface and a virtual extension surface of the first surface. A second included angle is provided between the second optical surface and the virtual extension surface. The first included angle is greater than the second included angle. Each of the plurality of second optical microstructures has a third optical surface and a fourth optical surface connected to each other. The third optical surface is located between the first light incident surface and the fourth optical surface. A third included angle is provided between the third optical surface and the virtual extension surface. A fourth included angle is provided between the fourth optical surface and the virtual extension surface. The third included angle is less than the fourth included angle.

In an embodiment of the invention, the plurality of optical microstructures of the light source module are protruded from the first surface and each has a first optical surface and a second optical surface connected to each other. The first optical surface is located between the first light incident surface and the second optical surface. A first included angle is provided between the first optical surface and a virtual extension surface of the first surface. A second included angle is provided between the second optical surface and the virtual extension surface. The first included angle is greater than the second included angle.

In an embodiment of the invention, the plurality of optical microstructures of the light source module are recessed from the first surface and each has a third optical surface and a fourth optical surface connected to each other. The third optical surface is located between the first light incident surface and the fourth optical surface. A third included angle is provided between the third optical surface and a virtual extension surface of the first surface. A fourth included angle is provided between the fourth optical surface and the virtual extension surface. The third included angle is less than the fourth included angle.

In an embodiment of the invention, each of the plurality of optical microstructures of the light source module has a recessed portion recessed from the first surface and a protruding portion protruded from the first surface. The recessed portion and the protruding portion respectively have a depth and a height along a normal direction of the first surface. The depth of the recessed portion is greater than or equal to the height of the protruding portion.

In an embodiment of the invention, each of the plurality of optical microstructures of the light source module has a first part and a second part. The first part connects the first surface and the second part. The first part is symmetrically arranged about an axis of symmetry perpendicular to the first surface. The second part is asymmetrically arranged about the axis of symmetry.

In an embodiment of the invention, the first light incident surface of the light source module is provided with at least one surface structure. The at least one surface structure include a lenticular lens structure, a lens structure or a pyramid structure.

In an embodiment of the invention, the light guide plate of the light source module is provided with at least one hole.

In an embodiment of the invention, the at least one hole includes a plurality of holes, the plurality of holes are arranged along at least one virtual distribution line, and an orthographic projection profile of the at least one virtual distribution line on the first surface is arc-shaped, wavy or polygonal.

In an embodiment of the invention, the at least one hole of the light source module is a strip-shaped hole extending parallel to the first light incident surface. The light guide plate further has a first inner surface and a second inner surface defining the strip-shaped hole. At least one of the first inner surface and the second inner surface is provided with a plurality of surface microstructures.

Based on the above, in a light source module of an embodiment of the invention, a light guide plate is provided with a plurality of optical microstructures on a first surface connected to a first light incident surface. The distribution densities of the optical microstructures in a first area and a second area of the first surface are different from each other. Accordingly, the uniformity of light emission of the light source module at large viewing angles may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 16A is a three-dimensional schematic diagram of a light source module according to an embodiment of the invention.

FIG. 16B to FIG. 16J are three-dimensional schematic diagrams of other modified embodiments of the light source module of FIG. 16A.

FIG. 17A is a three-dimensional schematic diagram of an optical microstructure of a light guide plate according to an embodiment of the invention.

FIG. 17B to FIG. 17F are three-dimensional schematic diagrams of other modified embodiments of the optical microstructure of FIG. 17A.

FIG. 20A is a schematic top view of a light source module according to an eleventh embodiment of the invention.

FIG. 20B is a schematic top view of another modified embodiment of the light source module of FIG. 20A.

FIG. 21A is an enlarged schematic diagram of a hole of a light guide plate of FIG. 20A or FIG. 20B.

DESCRIPTION OF THE EMBODIMENTS

The aforementioned and other technical contents, features, and effects of the disclosure will be clearly presented in the following detailed description of a preferred embodiment with reference to the accompanying drawings. The directional terms mentioned in the following embodiments, such as up, down, left, right, front, or back, are merely references to the directions in the accompanying drawings. Therefore, the directional terms used are for explanatory purposes and are not intended to limit the present invention.

Figure 1A:
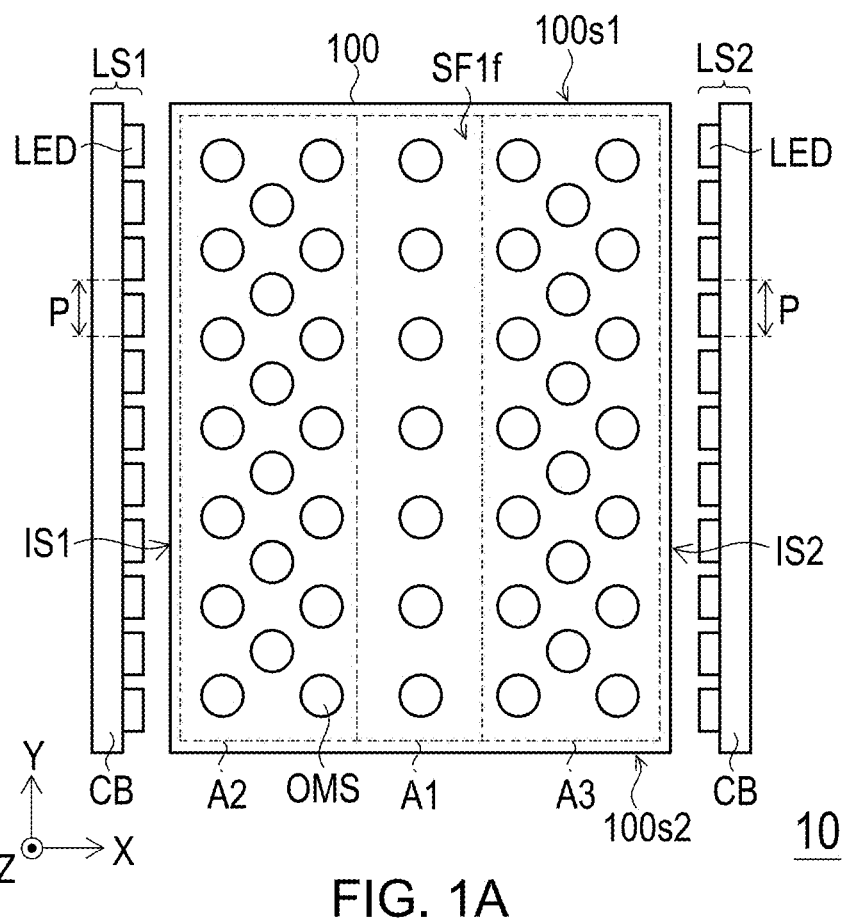
FIG. 1A is a schematic top view of a light source module according to a first embodiment of the invention.
Figure 1B:
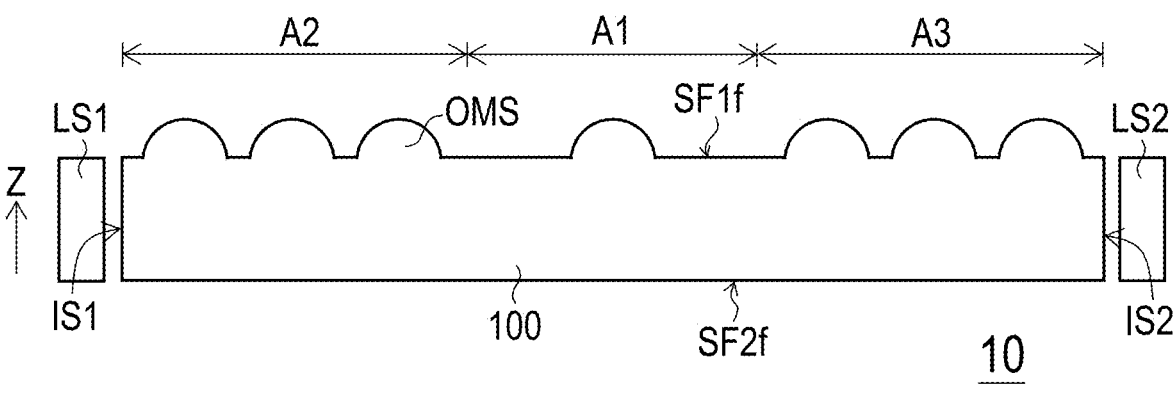
FIG. 1B is a schematic cross-sectional view of the light source module of FIG. 1A.
Figure 1C:
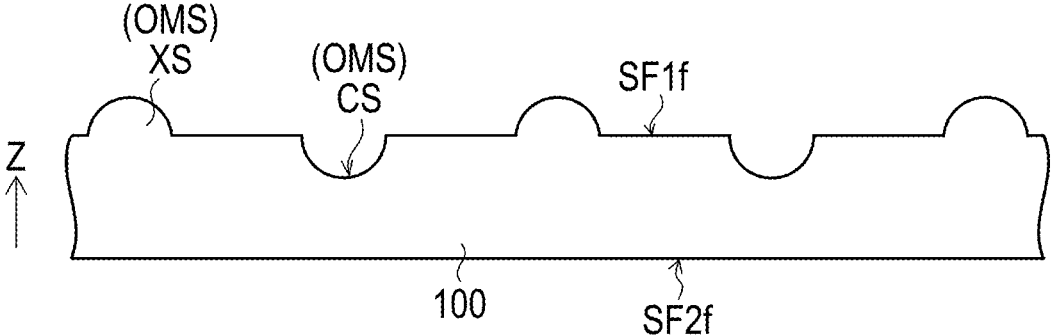
FIG. 1C to FIG. 1M are schematic cross-sectional views of some modified embodiments of a part of the light guide plate of the light source module according to the first embodiment of the invention.
Figure 1D:
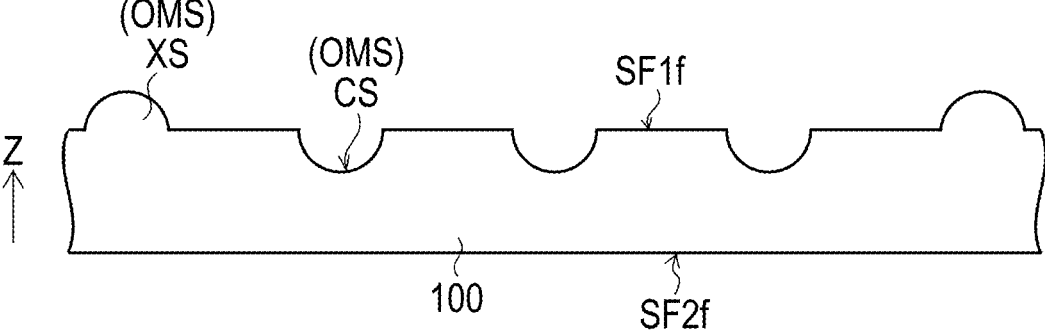
Figure 1E:
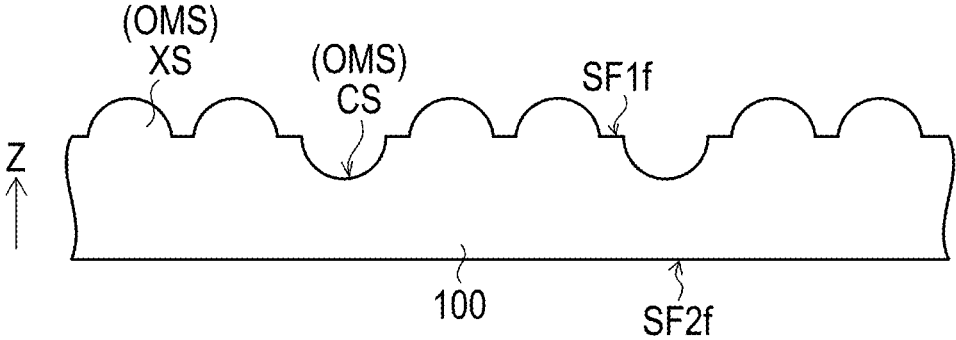
Figure 1F:
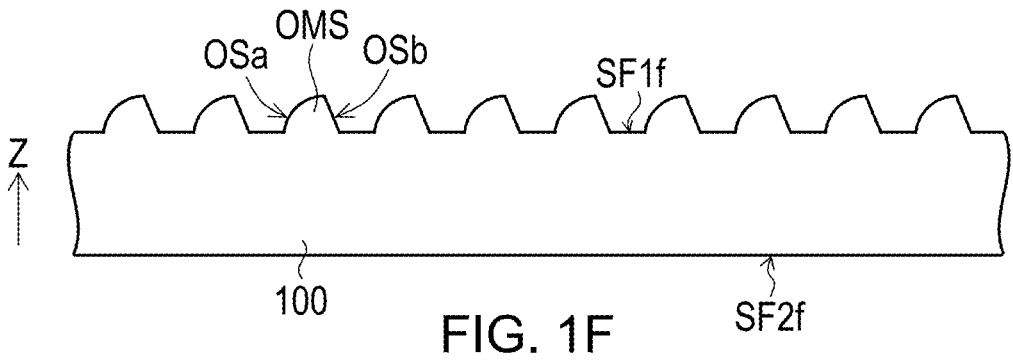
Figure 1G:
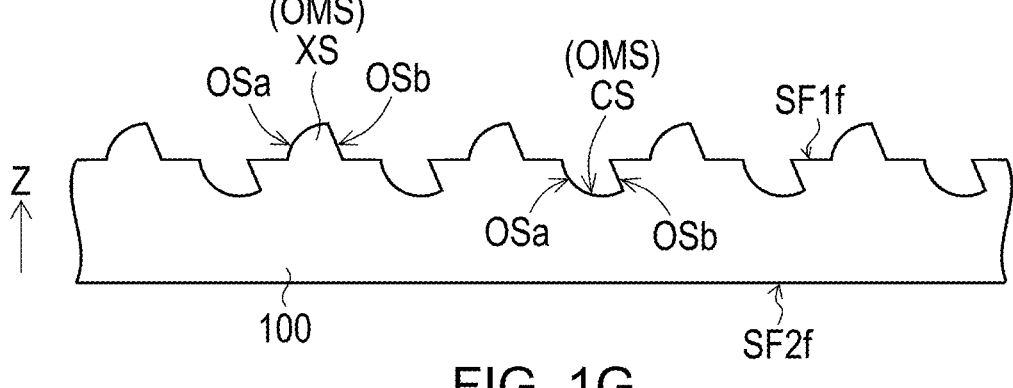
Figure 1H:
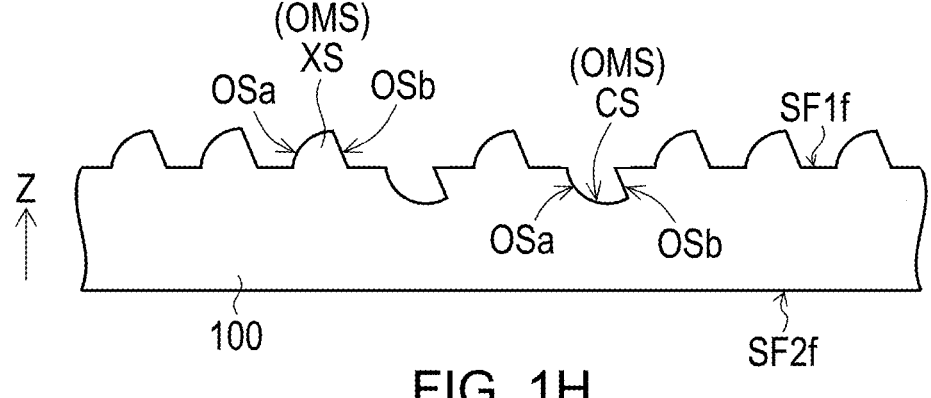
Figure 1I:
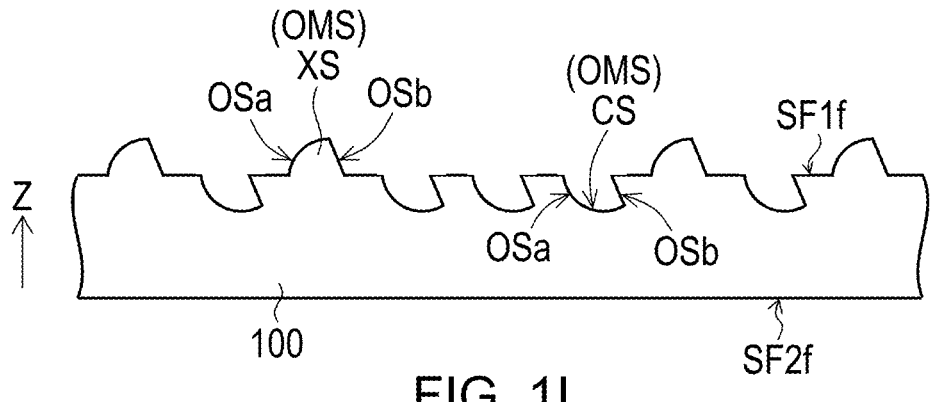
Figure 1J:
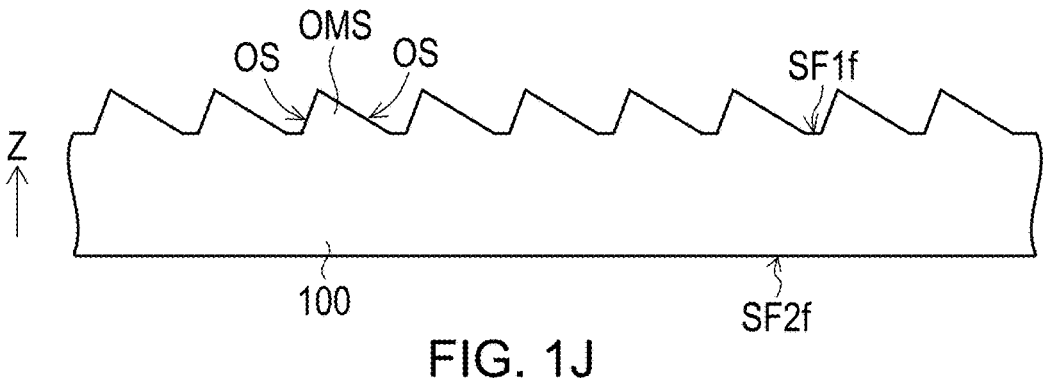
Figure 1K:
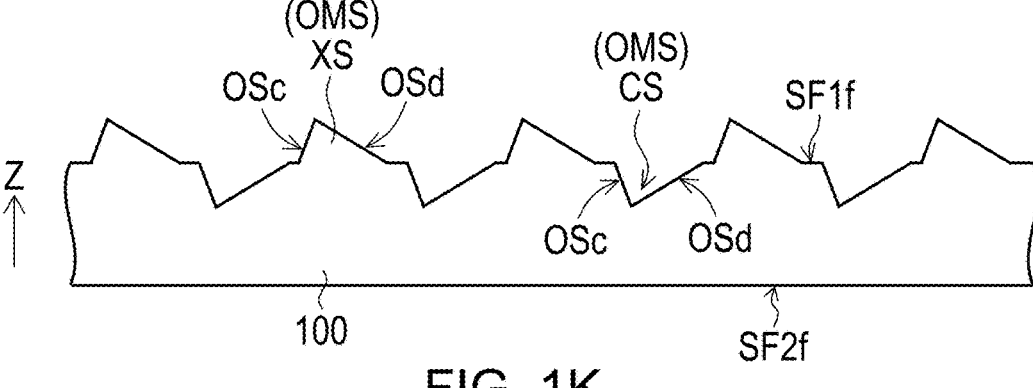
Figure 1L:
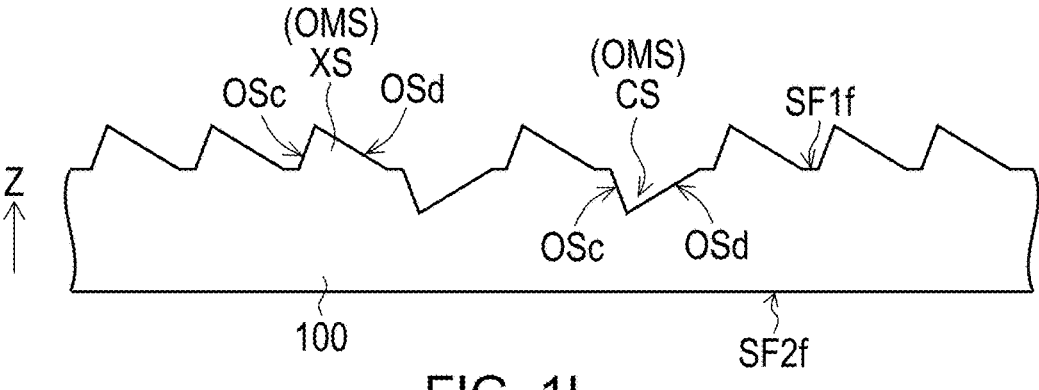
Figure 1M:
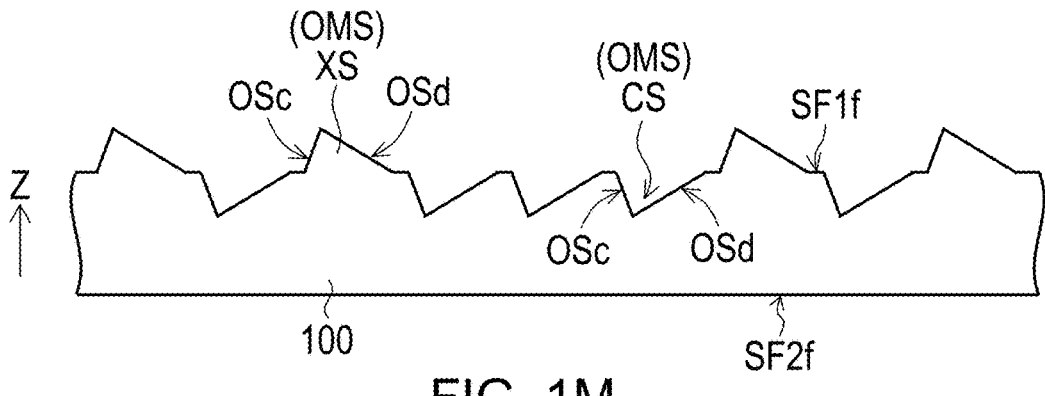
Figure 2A:
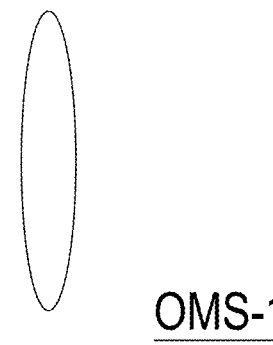
FIG. 2A to FIG. 2C are schematic top views of other modified embodiments of the optical microstructures of a light guide plate of FIG. 1B.
Figure 2B:
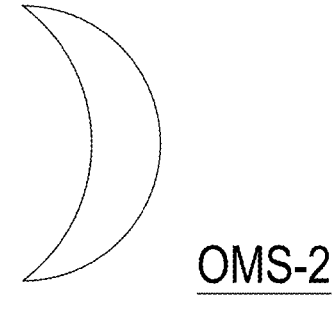
Figure 2C:
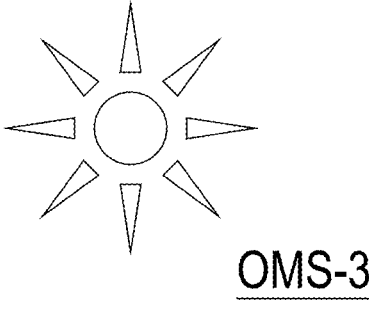

FIG. 1A is a schematic top view of a light source module according to a first embodiment of the invention. FIG. 1B is a schematic cross-sectional view of the light source module of FIG. 1A. FIG. 1C to FIG. 1M are schematic cross-sectional views of some modified embodiments of a part of the light guide plate of the light source module according to the first embodiment of the invention. FIG. 2A to FIG. 2C are schematic top views of other modified embodiments of the optical microstructures of a light guide plate of FIG. 1B. FIG. 3A to FIG. 3G and FIG. 4A to FIG. 4H are schematic top views of other modified embodiments of the light source module of FIG. 1A. FIG. 5 is a schematic cross-sectional view of a display apparatus according to a first embodiment of the invention.

Figure 3A:
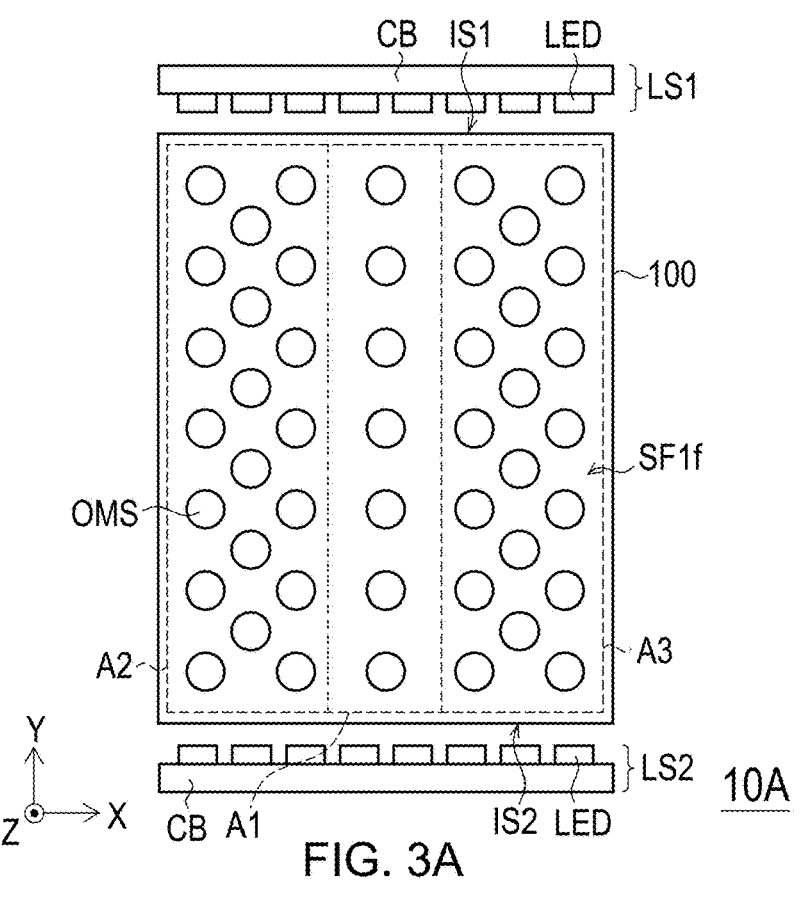
FIG. 3A to FIG. 3G and FIG. 4A to FIG. 4H are schematic top views of other modified embodiments of the light source module of FIG. 1A.
Figure 3B:
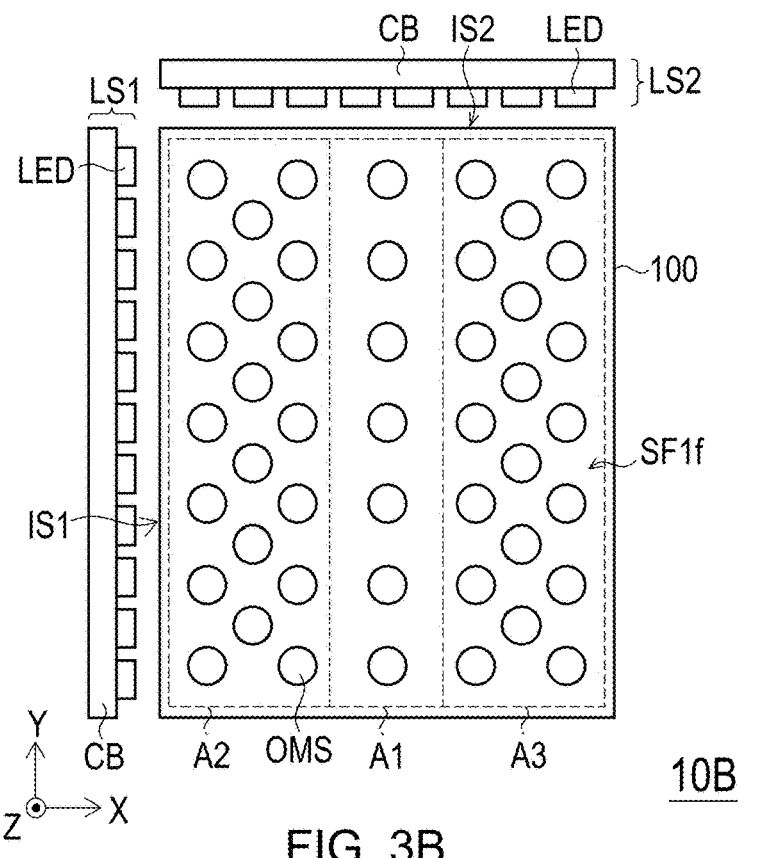

Referring to FIG. 1A and FIG. 1B, a light source module 10 includes a light guide plate 100, a first light source LS1 and a second light source LS2. The light guide plate 100 has a first surface SF1$f$ and a first light incident surface IS1, a second light incident surface IS2, a first side surface 100$s$1 and a second side surface 100$s$2 connected to the first surface SF1$f$. The first light source LS1 is disposed on one side of the first light incident surface IS1 of the light guide plate 100. The second light source LS2 is disposed on one side of the second light incident surface IS2 of the light guide plate 100. In the embodiment, the first light incident surface IS1 and the second light incident surface IS2 of the light guide plate 100 are opposite to each other, but the invention is not limited thereto. In a light source module 10A (as shown in FIG. 3A) of a modified embodiment, the first light source LS1 and the second light source LS2 may be respectively disposed on one side of the first side surface 100$s$1 and one side of the second side surface 100$s$2 of the light guide plate 100 of FIG. 1A (i.e., the first side surface 100$s$1 and the second side surface 100$s$2 serve as the first light incident surface IS1 and the second light incident surface IS2 respectively). In another modified embodiment of the light source module 10B (as shown in FIG. 3B), the first light incident surface IS1 and the second light incident surface IS2 of the light guide plate 100 may also be connected to each other, that is, the second light source LS2 is disposed on one side of the first side surface 100$s$1 of the light guide plate 100 in FIG. 1A (i.e., the first side surface 100$s$1 serves as the second light incident surface IS2), so the first light incident surface IS1 may be adjacent to the second light incident surface IS2.

For example, each of the first light source LS1 and the second light source LS2 may include a circuit board CB and a plurality of light emitting devices LED disposed on the circuit board CB. The light emitting devices LED is, for example, a light emitting diode, but the invention is not limited thereto. In the embodiment, the plurality of light emitting devices LED of the first light source LS1 may be arranged on the circuit board CB with a single pitch P along a direction (e.g., direction Y) parallel to the first light incident surface IS1, and the plurality of light emitting devices LED of the second light source LS2 may be arranged on the circuit board CB with a single pitch P along a direction (e.g., direction Y) parallel to the second light incident surface IS2, but the invention is not limited thereto. In another modified embodiment of the light source module, the plurality of light emitting devices LED of the first light source LS1 or the plurality of light emitting devices LED of the second light source LS2 may be arranged on the circuit board CB with different pitches along a direction (refer to the illustrations in FIG. 3E and FIG. 3G for example).

Furthermore, the light source module 10 further includes a plurality of optical microstructures OMS disposed on the first surface SF1f of the light guide plate 100. It should be noted first that the optical microstructures OMS are distributed unevenly on the first surface SF1f to improve the uniformity of light emission of the light source module 10 at large viewing angles. In the embodiment, each of the plurality of optical microstructures OMS may be a protruding structure protruded from the first surface SF1f of the light guide plate 100, but the invention is not limited thereto. In other modified embodiments of the light source module, the optical microstructure OMS may be a protruding structure (as shown in FIG. 1F and FIG. 1J) protruded from the first surface SF1f of the light guide plate 100 and having a cross-sectional profile different from that of FIG. 1B, the optical microstructure may be a recessed structure recessed from the first surface SF1f of the light guide plate 100, or the plurality of optical microstructures OMS may be a combination of at least one protruding structure XS and at least one recessed structure CS (as shown in FIGS. 1C, 1D, 1E, 1G, 1H, 1I, 1K, 1L and 1M). It is particularly noted that FIG. 1C to FIG. 1M only illustrate a partial cross-section of the light guide plate 100, and omit illustrating the light source disposed on one side of the light incident surface of the light guide plate 100. In the embodiment where the plurality of optical microstructures OMS are a combination of protruding structures XS and recessed structures CS, the arrangement of the plurality of optical microstructures OMS may be an alternating arrangement of the protruding structures XS and the recessed structures CS (as shown in FIGS. 1C, 1G and 1K), or an arrangement of the protruding structures XS and the recessed structures CS having different distribution densities in at least one area (as shown in FIGS. 1D, 1E, 1H, 1I, 1L and 1M). A cross-sectional profile of the optical microstructure OMS of each of FIG. 1B to FIG. 1E may be curvilinear (e.g., semicircular or semi-elliptical). The cross-sectional profiles of the two optical surface OSa and OSb of the optical microstructure OMS of each of FIG. 1F to FIG. 1I may be curvilinear and linear respectively. The cross-sectional profiles of the two optical surface OSc and OSd of the optical microstructure OMS of each of FIG. 1J to FIG. 1M may be both linear. However, the invention is not limited thereto. FIG. 1C to FIG. 1M illustrate embodiments of the optical microstructures OMS of the light guide plate 100 having different shapes, and the configuration of distribution density of these optical microstructures OMS in different areas of the first surface SF1f may refer to the embodiments of FIG. 1A, FIG. 1B and the subsequent FIG. 3A to FIG. 3G. In another unillustrated modified embodiment of the light source module, the plurality of optical microstructures OMS may be disposed on a second surface SF2f of the light guide plate 100 facing away from the first surface SF1f. In addition, the top view shape of the optical microstructure in FIG. 1A is circular as an example, but the invention is not limited thereto. In the light source module of other modified embodiments, the top view shape of the optical microstructure may be, for example, elliptical (e.g., the optical microstructure OMS-1 shown in FIG. 2A), crescent-shaped (e.g., the optical microstructure OMS-2 shown in FIG. 2B), circular with radiating rays (e.g., the optical microstructure OMS-3 as shown in FIG. 2C), or other suitable shapes. The top view shape of the optical microstructure of the invention is not limited to the illustrations of FIG. 1A and FIG. 2A to FIG. 2C.

In detail, in the embodiment, the first surface SF1f has a plurality of areas, such as a first area A1, a second area A2, and a third area A3, and these areas are arranged along a direction (e.g., the direction X) perpendicular to the first light incident surface IS1 or the second light incident surface IS2. That is, the arrangement direction of these areas is parallel to a normal direction of the first light incident surface IS1 or the second light incident surface IS2. The first area A1 is located between the second area A2 and the third area A3 along the direction X. More specifically, the second area A2 is adjacent to the first light incident surface IS1 and is located between the first area A1 and the first light incident surface IS1. The third area A3 is adjacent to the second light incident surface IS2 and is located between the first area A1 and the second light incident surface IS2.

In the embodiment, a distribution density of the plurality of optical microstructures OMS in the first area A1 is less than a distribution density of the plurality of optical microstructures OMS in the second area A2 and a distribution density of the plurality of optical microstructures OMS in the third area A3. Accordingly, the light leakage phenomenon of the light source module 10 in edge areas (e.g., the area adjacent to the first light incident surface IS1 and the area adjacent to the second light incident surface IS2) of the first surface SF1f of the light guide plate 100 at large viewing angles may be improved, thereby improving the uniformity of light emission of the light source module 10 at large viewing angles.

Specifically, in other unillustrated embodiments, the first surface of the light guide plate may have more than three (e.g., five) areas, and the distribution density of the plurality of optical microstructures OMS in these areas gradually decreases and then gradually increases along a direction away from the first light incident surface IS1 or the second light incident surface IS2. That is, the distribution density of the optical microstructure OMS in one area closest to the first light incident surface IS1 is higher than the distribution density of the optical microstructure OMS in another area next closest to the first light incident surface IS1, while the distribution density of the optical microstructure OMS in one area closest to the second light incident surface IS2 is higher than the distribution density of the optical microstructure OMS in another area next closest to the second light incident surface IS2. More specifically, the distribution density of the plurality of optical microstructures OMS gradually decreases and then gradually increases from the first light incident surface IS1 and along the normal direction of the first light incident surface IS1 (or from the second light incident surface IS2 and along a normal direction of the second light incident surface IS2).

Figure 3C:
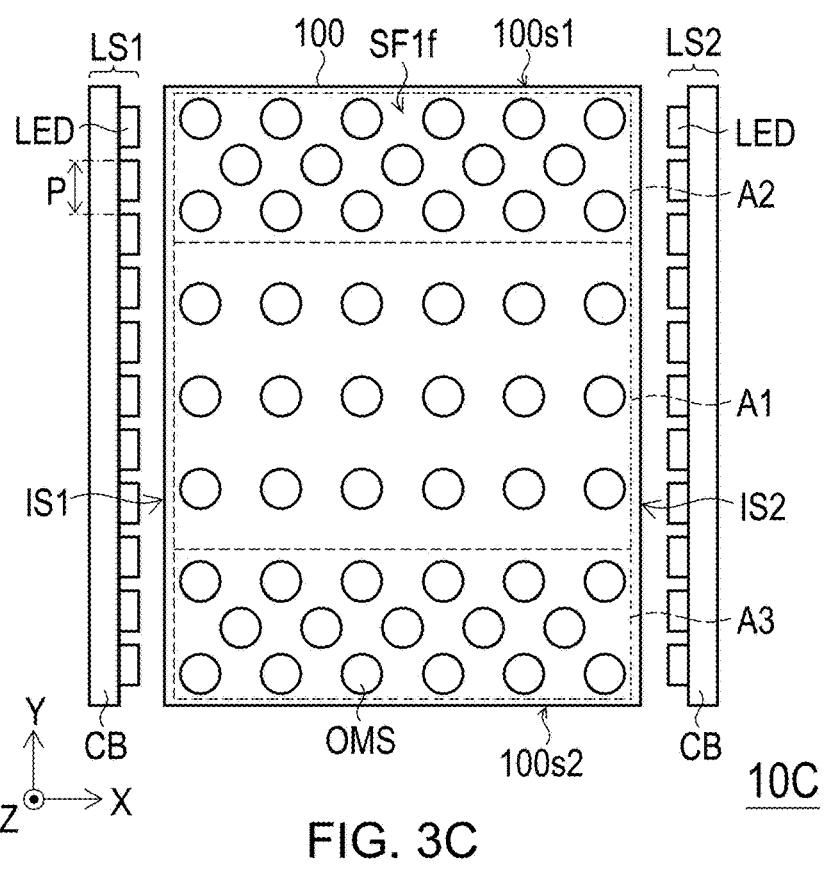

However, the invention is not limited thereto. Referring to FIG. 3C, in a light source module 10C of another modified embodiment, the first area A1, the second area A2 and the third area A3 of the first surface SF1f may be arranged along a direction (e.g., direction Y) parallel to the first light incident surface IS1 or the second light incident surface IS2. That is, the arrangement direction of these areas is not parallel to (e.g., perpendicular to) the normal direction of the first light incident surface IS1 or the second light incident surface IS2. More specifically, the light guide plate 100 further has a first side surface 100s1 and a second side surface 100s2 connected to the first light incident surface IS1 and the second light incident surface IS2 and opposite to each other. The second area A2 is adjacent to the first side surface 100s1 and is located between the first area A1 and the first side surface 100s1. The third area A3 is adjacent to the second side surface 100s2 and is located between the first area A1 and the second side surface 100s2.

The distribution density of the plurality of optical microstructures OMS in the first area A1 is less than the distribution density of the plurality of optical microstructures OMS in the second area A2 and the distribution density of the plurality of optical microstructures OMS in the third area A3. Accordingly, the light leakage phenomenon of the light source module 10B in edge areas (e.g., the area adjacent to the first side surface 100s1 and the area adjacent to the second side surface 100s2) of the first surface SF1f of the light guide plate 100 at large viewing angles may be improved, thereby improving the uniformity of light emission of the light source module 10B at large viewing angles.

Specifically, in other unillustrated embodiments, the first surface of the light guide plate may have more than three (e.g., five) areas, and the distribution density of the plurality of optical microstructures OMS in these areas gradually decreases and then increases along a direction away from the first side surface 100s1 or the second side surface 100s2. That is, the distribution density of the optical microstructure OMS in one area closest to the first side surface 100s1 is higher than the distribution density of the optical microstructure OMS in another area next closest to the first side surface 100s1, while the distribution density of the optical microstructure OMS in one area closest to the second side surface 100s2 is higher than the distribution density of the optical microstructure OMS in another area next closest to the second side surface 100s2. More specifically, the distribution density of the plurality of optical microstructures OMS gradually decreases and then gradually increases from the first side surface 100s1 and along a normal direction of the first side surface 100s1 (or from the second side surface 100s2 and along a normal direction of the second side surface 100s2).

Figure 3D:
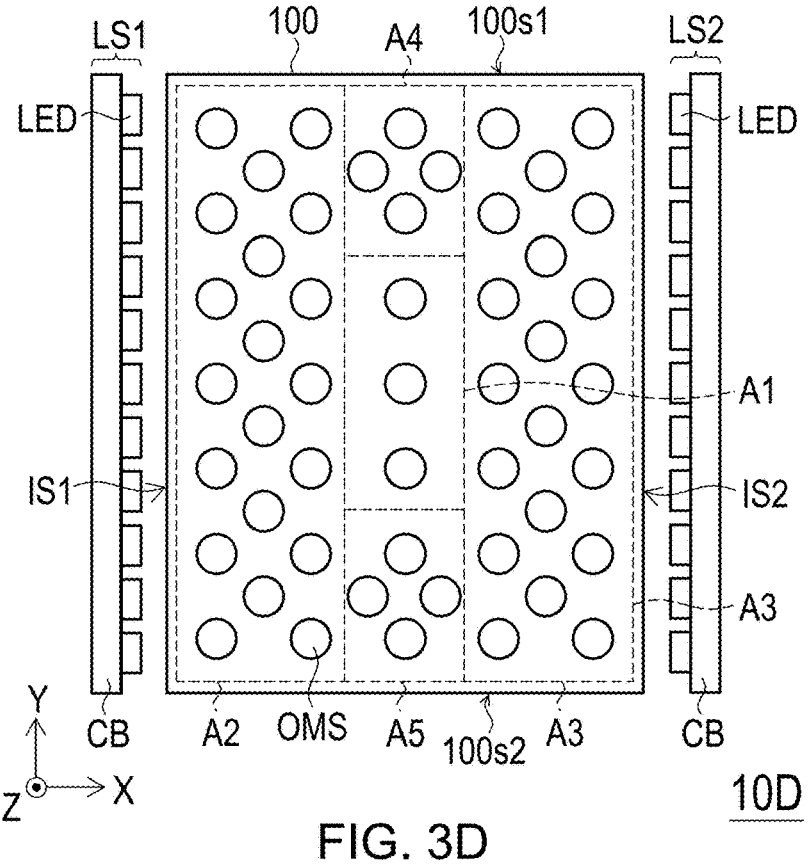

Referring to FIG. 3D, the difference between a light source module 10D of FIG. 3D and the light source module 10 of FIG. 1A lies in that the light guide plate 100 of the light source module 10D further has a fourth area A4 and a fifth area A5. The first area A1, the fourth area A4 and the fifth area A5 may be arranged along the normal direction (e.g. direction Y) of the first side surface 100s1 or the second side surface 100s2, and the first area A1 is located between the fourth area A4 and the fifth area A5. More specifically, the fourth area A4 is adjacent to the first side surface 100s1 and is located between the first area A1 and the first side surface 100s1. The fifth area A5 is adjacent to the second side surface 100s2 and is located between the first area A1 and the second side surface 100s2.

The distribution density of the plurality of optical microstructures OMS in the first area A1 is less than the distribution density of the plurality of optical microstructures OMS in any one of the second area A2, the third area A3, the fourth area A4, and the fifth area A5. More specifically, the distribution density of the optical microstructures OMS gradually decreases and then gradually increases from the first side surface 100s1 and along the normal direction of the first side surface 100s1 (or from the second side surface 100s2 and along the normal direction of the second side surface 100s2), and gradually decreases and then gradually increases from the first light incident surface IS1 and along the normal direction of the first light incident surface IS1 (or from the second light incident surface IS2 and along the normal direction of the second light incident surface IS2). Accordingly, the light leakage phenomenon of the light source module 10C in edge areas (e.g., the areas respectively adjacent to the first light incident surface IS1 and the second light incident surface IS2 and the areas respectively adjacent to the first side surface 100s1 and the second side surface 100s2) of the first surface SF1f of the light guide plate 100 at large viewing angles may be improved, thereby improving the uniformity of light emission of the light source module 10C at large viewing angles.

Other embodiments will be enumerated below to describe the present disclosure in detail, in which the same components will be denoted by the same symbols, and descriptions of the same technical content will be omitted. Please refer to the previous embodiments for the omitted parts, which will not be described again below.

Figure 3E:
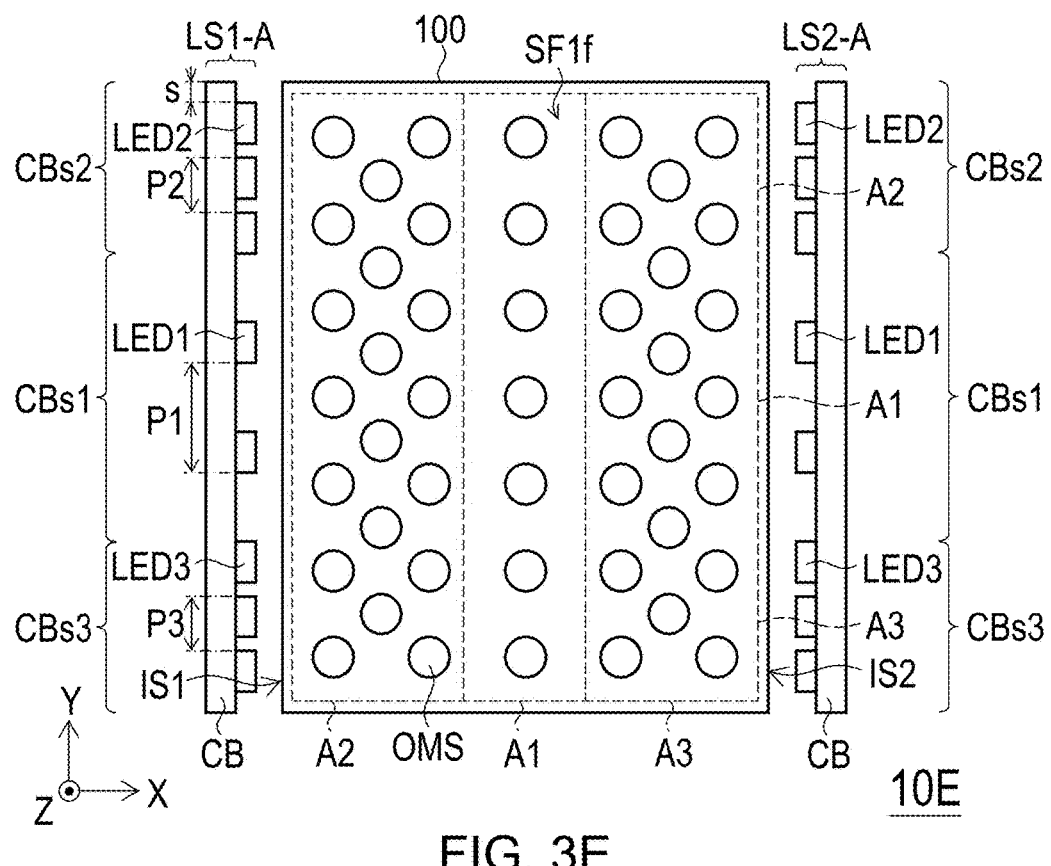

Referring to FIG. 3E, the difference between a light source module 10E of the embodiment and the light source module 10 of FIG. 1A lies in that the composition and configuration of the light sources are different. Specifically, in the light source module 10E of the embodiment, the circuit board CB of each of the first light source LS1-A and the second light source LS2-A may have a plurality of segments arranged along the direction Y, such as a first segment CBs1, a second segment CBs2 and a third segment CBs3, and the distribution density of the light emitting devices on these segments may be different.

For example, in the embodiment, the second segment CBs2 and the third segment CBs3 may be respectively disposed on two opposite sides of the first segment CBs1 along a direction (e.g., direction Y) parallel to the first light incident surface IS1 or the second light incident surface IS2, and each of the distribution densities of the light emitting devices respectively on the second segment CBs2 and the third segment CBs3 may be greater than the distribution density of the light emitting devices on the first segment CBs1. More specifically, each of the first light source LS1-A and the second light source LS2-A may include a plurality of light emitting devices LED1 provided on the first segment CBs1, a plurality of light emitting devices LED2 provided on the second segment CBs2, and a plurality of light emitting devices LED3 provided on the third segment CBs3.

The plurality of light emitting devices LED1 are arranged on the first segment CBs1 along the direction Y with a pitch P1. The plurality of light emitting devices LED2 are arranged on the second segment CBs2 along the direction Y with a pitch P2. The plurality of light emitting devices LED3 are arranged on the third segment CBs3 along the direction Y with a pitch P3. In the embodiment, the pitch P1 may be greater than each of the pitch P2 and the pitch P3, and the pitch P2 may be the same as or different from the pitch P3. For example, a ratio of pitch P1 to pitch P2 (or pitch P3) may be greater than 1 and less than or equal to 5, but the invention is not limited thereto. On the other hand, among the plurality of light emitting devices of each of the first light source LS1-A and the second light source LS2-A, the one closest to an edge of the circuit board CB has a spacing s from the edge. Preferably, the spacing s may be greater than or equal to 0 mm and less than or equal to 1.5 mm.

Figure 3F:
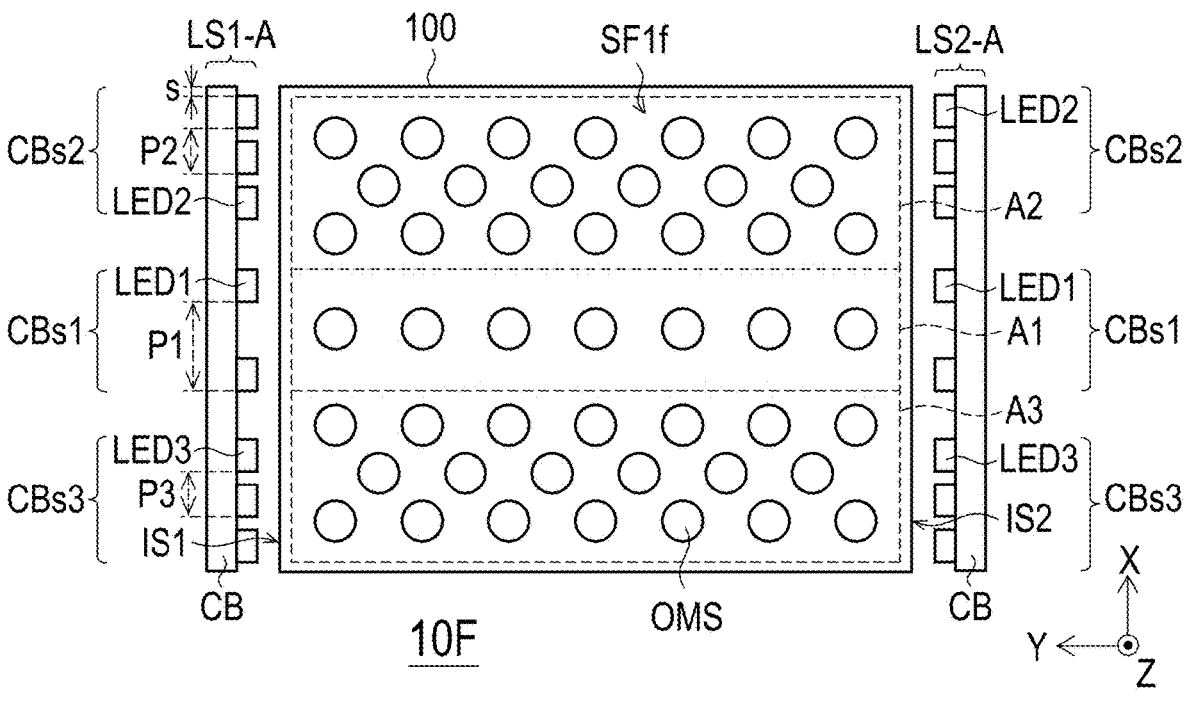

However, the invention is not limited thereto. In another unillustrated embodiment, each of the distribution densities of the light emitting devices respectively on the second and third segments may be less than the distribution density of the light emitting devices on the first segment. That is, the arrangement pitch of the light emitting devices LED1 may be less than the arrangement pitch of the light emitting devices LED2 and the arrangement pitch of the light emitting devices LED3. In a light source module 10F of a modified embodiment (as shown in FIG. 3F), the first light source LS1-A and the second light source LS2-A may be respectively disposed on one side of the first side surface 100s1 and one side of the second side surface 100s2 of the light guide plate 100 of FIG. 1A (i.e., the first side surface 100s1 and the second side surface 100s2 serve as the first light incident surface IS1 and the second light incident surface IS2 respectively).

In the embodiment, the distribution of the optical microstructures OMS on the first surface SF1f is similar to the distribution of the optical microstructures OMS on the first surface SF1f of FIG. 1A. Therefore, please refer to the relevant paragraphs of the foregoing embodiment for detailed description, and will not be described again here.

Figure 3G:
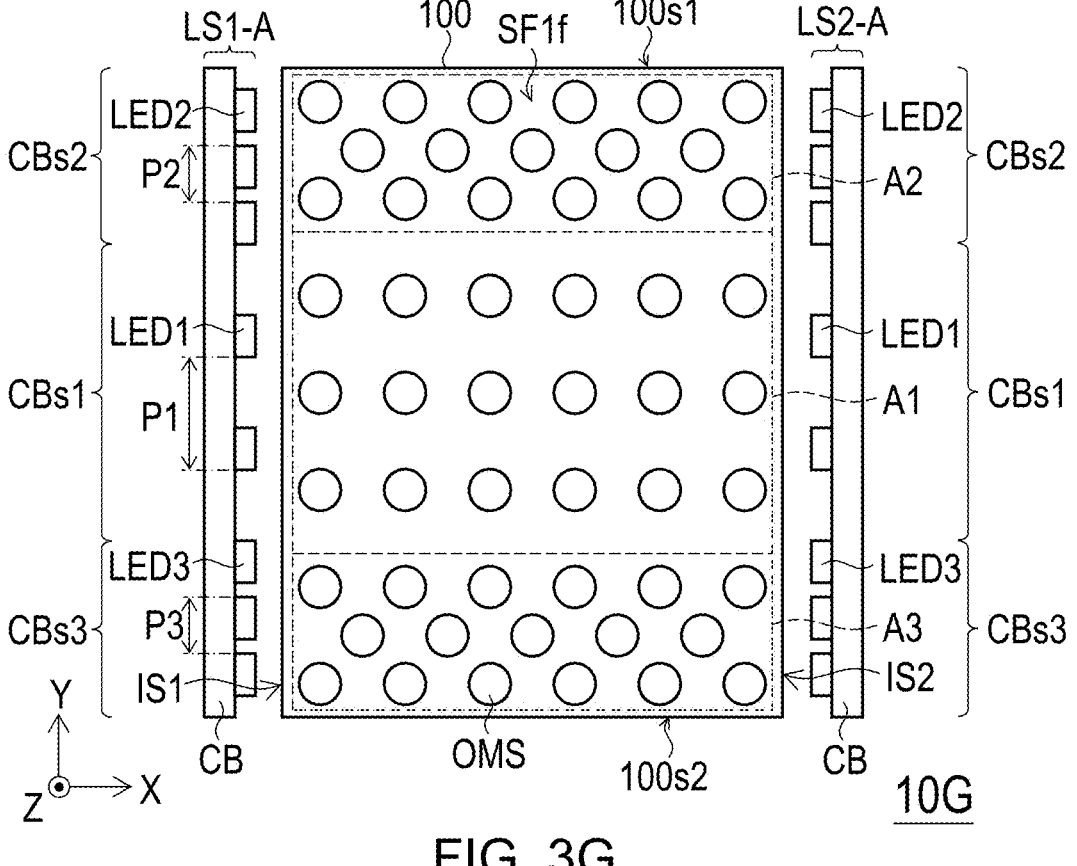

In the embodiment, the second area A2, the first area A1 and the third area A3 of the light guide plate 100 are arranged along the normal direction (e.g., direction X) of the first light incident surface IS1. The plurality of light emitting devices LED3, the plurality of light emitting devices LED1 and the plurality of light emitting devices LED2 of any one of the first light source LS1-A and the second light source LS2-A2 are arranged along a direction (e.g., direction Y) parallel to the first light incident surface IS1. However, the invention is not limited thereto. Referring to FIG. 3G, in the light source module 10G of another modified embodiment, the configuration of the first light source LS1-A and the second light source LS2-A is the same as that of the first light source LS1-A and the second light source LS2-A of FIG. 3E, but the distribution of its optical microstructure OMS on the first surface SF1f may adopt a configuration similar to the distribution of the optical microstructures OMS in FIG. 3C. It should be noted that the third area A3, the first area A1 and the second area A2 of the light guide plate 100 in FIG. 3G are arranged along a direction (e.g., direction Y) parallel to the first light incident surface IS1, and the first area A1, the second area A2 and the third area A3 may be respectively disposed correspond to the first segment CBs1, the second segment CBs2 and the third segment CBs3 of the circuit board CB along the normal direction (e.g., direction X) of the first light incident surface IS1 or the second light incident surface IS2.

In the embodiments of FIG. 1A and FIG. 3A to FIG. 3G, the light source modules are taken as examples having two light sources respectively disposed on two sides of the light guide plate, but the invention is not limited thereto. Next, multiple embodiments of the configurations of the light sources of the light source modules of the present invention will be described with reference to FIGS. 4A to 4H.

Figure 4A:
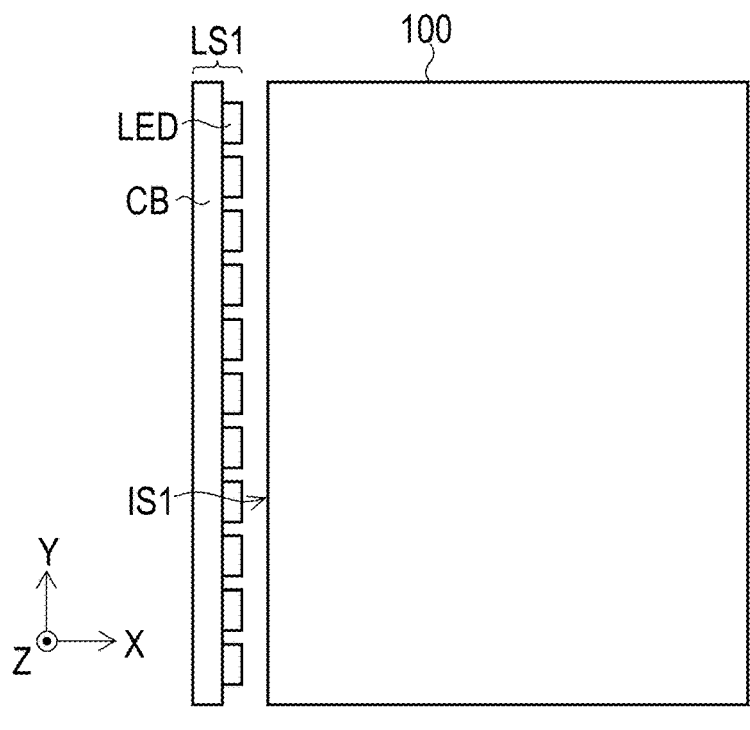
Figure 4B:
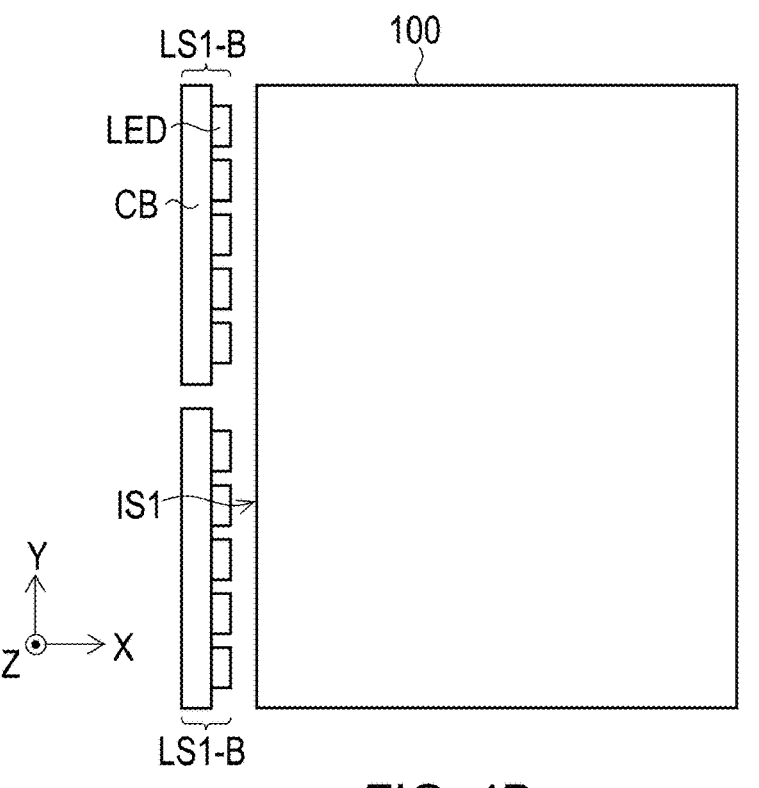

Referring to FIG. 4A, the difference between a light source module 10H of the embodiment and the light source module 10 of FIG. 1A lies in that the composition and configuration of the light sources are different. Specifically, the light source configuration of the light source module 10H of the embodiment is configured as a single-sided light source, i.e., at least one light source is disposed on one side of the light incident surface of the light guide plate. For example, as shown in FIG. 4A, in the light source module 10H of the embodiment, a first light source LS1 is provided on one side of the first light incident surface IS1 of the light guide plate 100, but the invention is not limited thereto. In a light source module 10I of a modified embodiment, as shown in FIG. 4B, two first light source LS1-B may be disposed on one side of the first light incident surface IS1 of the light guide plate 100. In other embodiments not shown, more than two first light sources may be disposed on one side of the first light incident surface IS1 of the light guide plate 100. It is particularly noted that the optical microstructures of the light guide plate 100 are omitted in FIG. 4A, FIG. 4B and subsequent FIG. 4C to FIG. 4H, and the pattern and configuration of the optical microstructure of the light guide plate 100 in FIG. 4A, FIG. 4B and subsequent FIG. 4C to FIG. 4H may be the same as or different from any of the above embodiments.

Figure 4C:
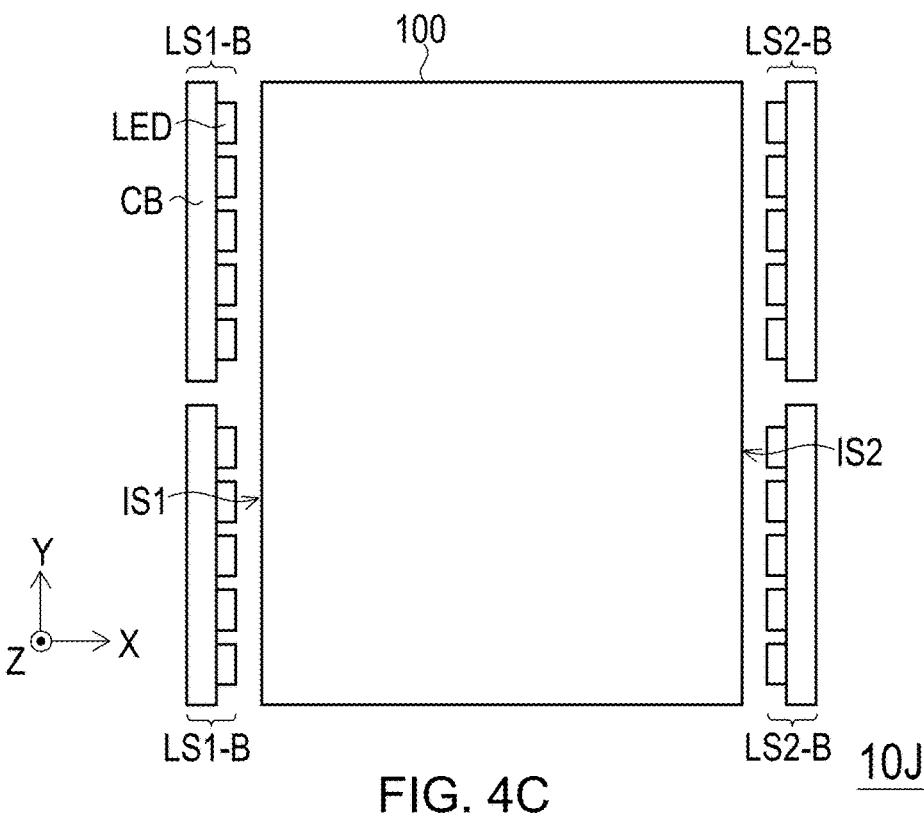
Figure 5:
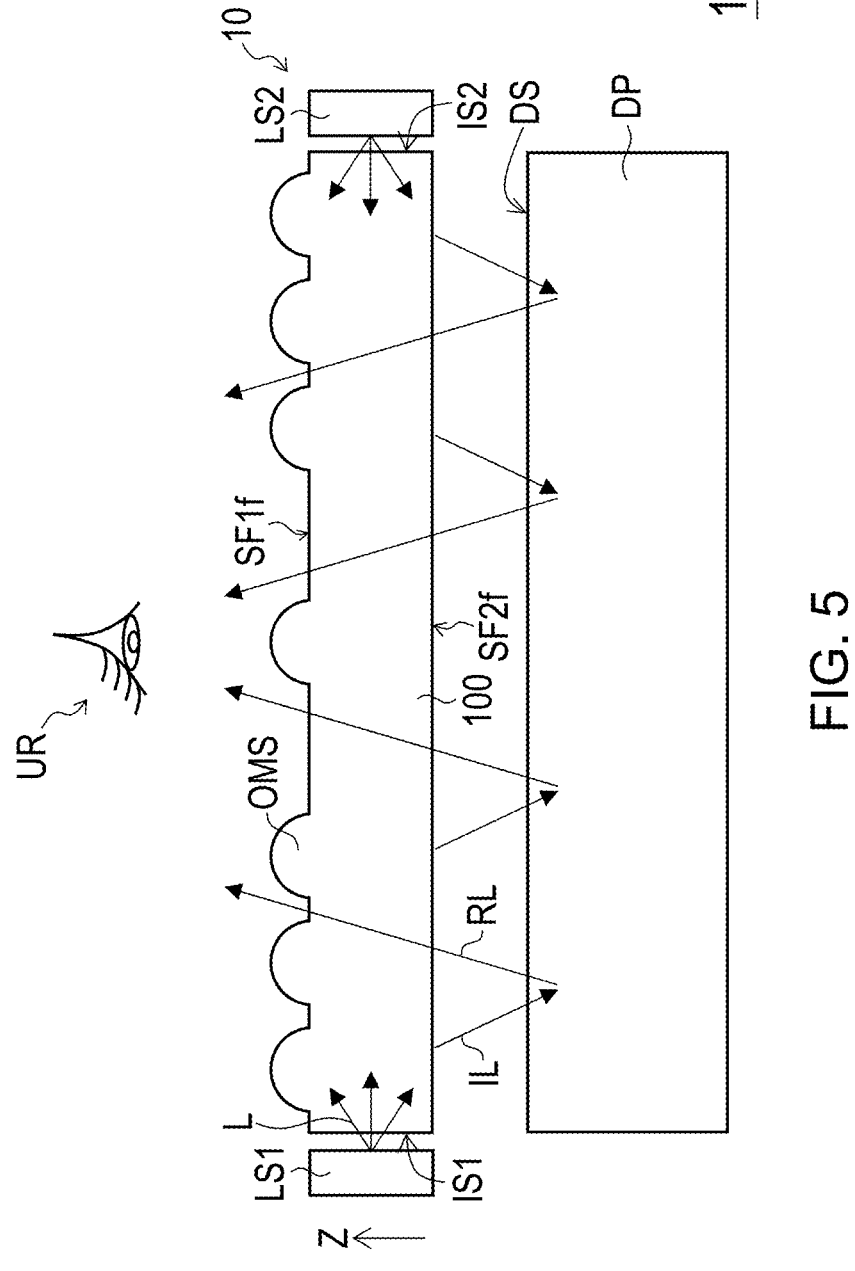
FIG. 5 is a schematic cross-sectional view of a display apparatus according to a first embodiment of the invention.

Referring to FIG. 4C, the difference between a light source module 10J of the embodiment and the light source module 10 of FIG. 1A lies in that the composition and configuration of the light sources are different. Specifically, the light source configuration of the light source module 10J of the embodiment is configured as a double-sided light source, and a plurality of light sources are provided on one side of the light incident surface of the light guide plate of the light source module of the embodiment. For example, as shown in FIG. 4C, in the light source module 10J of the embodiment, two first light sources LS1-B are provided on one side of the first light incident surface IS1 of the light guide plate 100, and two second light sources LS2-B are provided on one side of the second light incident surface IS2 of the light guide plate 100. In other embodiments not shown, more than two light sources may be disposed on one side of the light incident surface of the light guide plate 100.

Figure 4D:
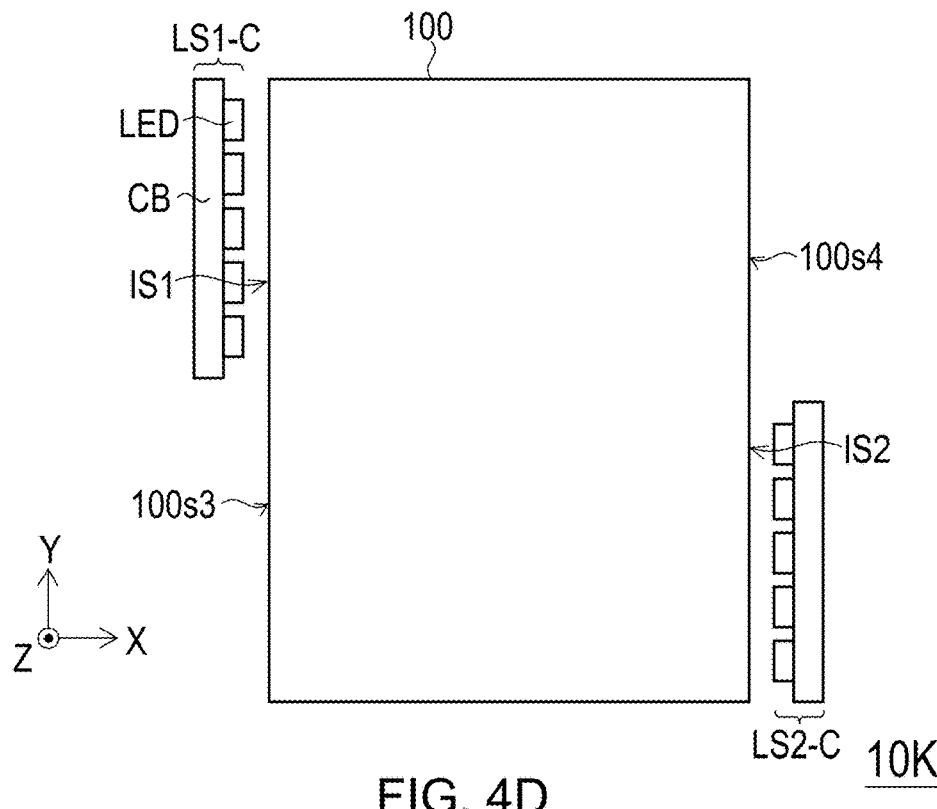

Referring to FIG. 4D, the difference between a light source module 10K of the embodiment and the light source module 10 of FIG. 1A lies in that the composition and configuration of the light sources are different. Specifically, the first light source LS1 and the second light source LS2 in FIG. 1A are arranged opposite to each other, however, the first light source LS1-C and the second light source LS2-C in FIG. 4D are arranged obliquely to each other. In addition, the first light source LS1-C is arranged corresponding to a part of a third side surface 100s3 of the light guide plate 100 (i.e., the part of the third side surface 100s3 serves as the first light incident surface IS1), and the second light source LS2-C is arranged corresponding to a part of a fourth side surface 100s4 of the light guide plate 100 (i.e., the part of the fourth side surface 100s4 serves as the second light incident surface IS2). Another part of the third side surface 100s3 of the light guide plate 100 that is not provided with the first light source LS1-C overlaps the second light source LS2-C in a direction parallel to the normal direction of the first light incident surface IS1, and another part of the fourth side surface 100s4 of the light guide plate 100 that is not provided with the second light source LS2-C overlaps the first light source LS1-C in a direction parallel to the normal direction of the second light incident surface IS2.

Figure 4E:
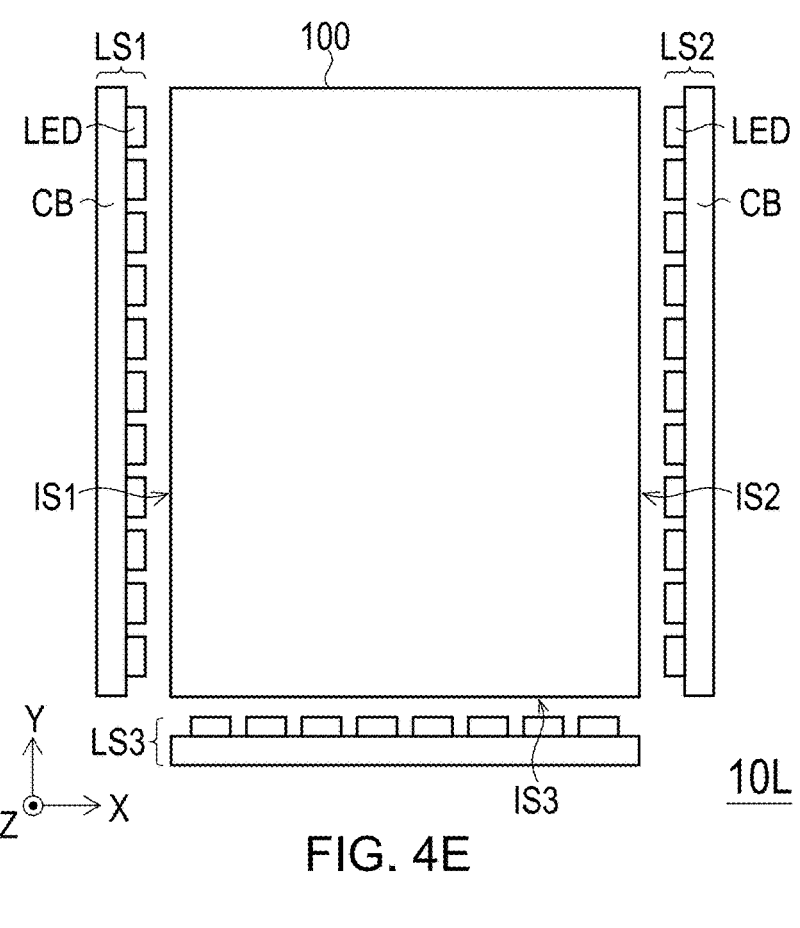
Figure 4F:
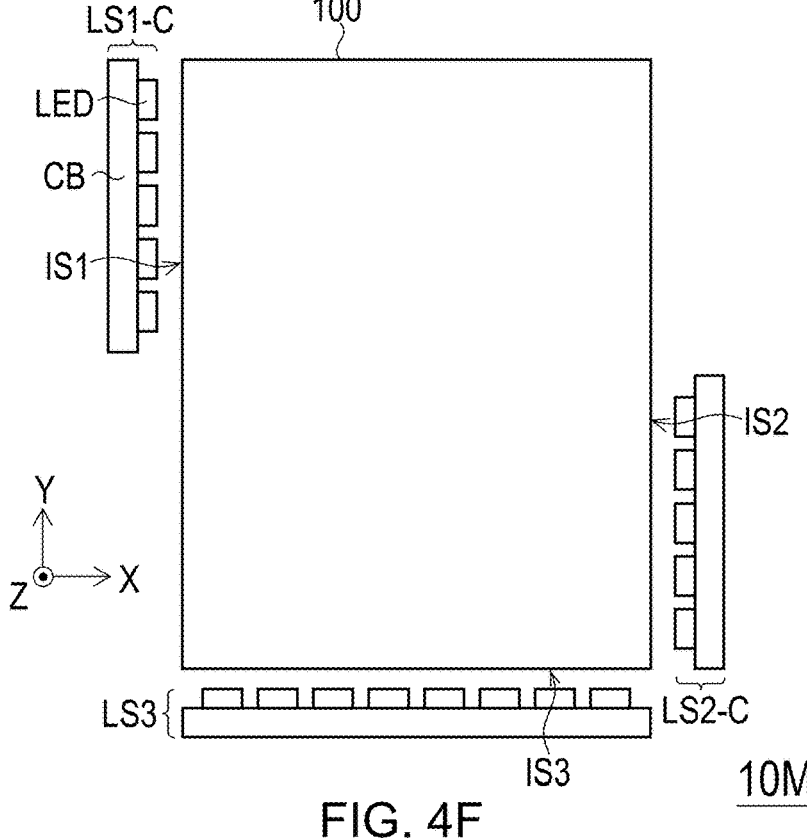
Figures 4G, 4H:
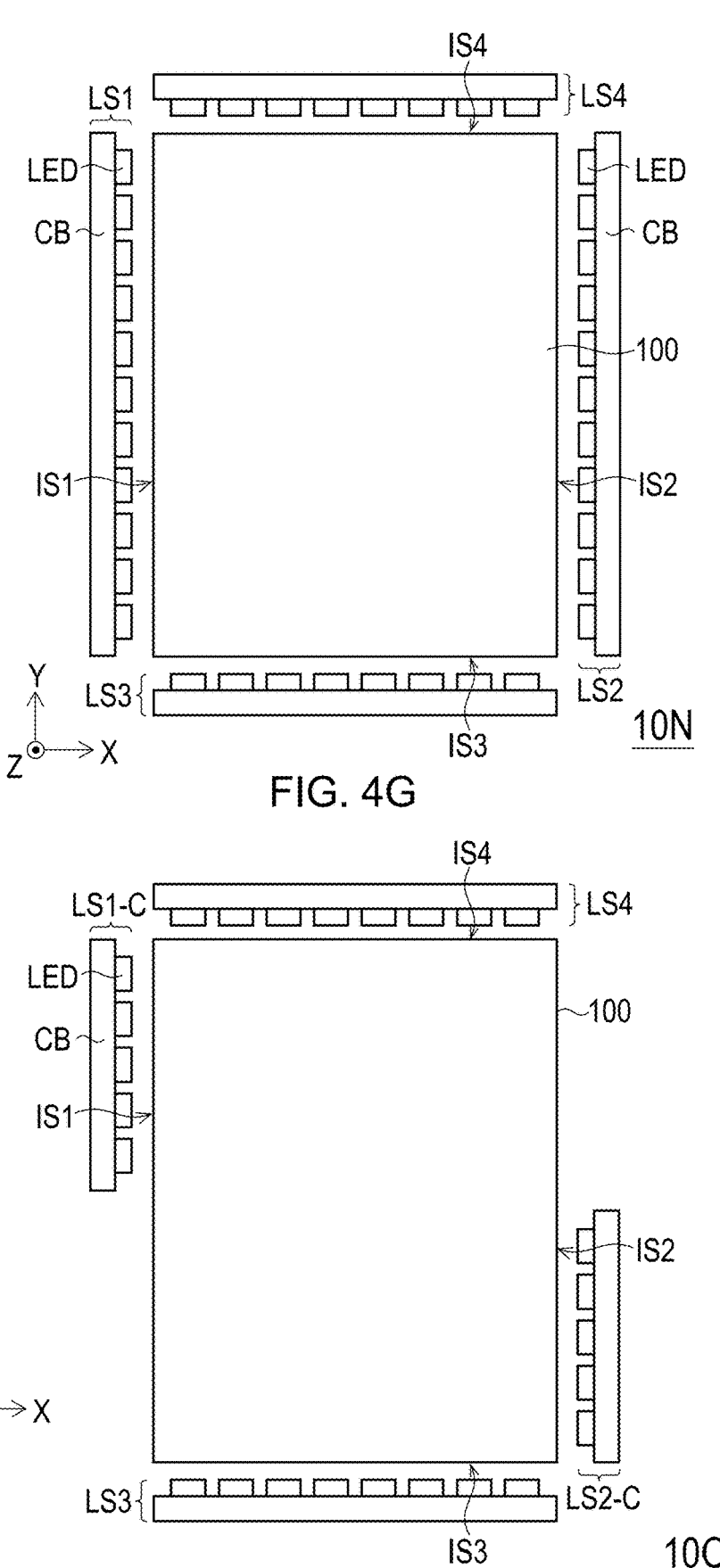

Referring to FIG. 4E and FIG. 4F, the difference between light source modules 10L, 10M of two embodiments and the light source modules 10 and 10K of FIG. 1A and FIG. 4D lies in that the composition and configuration of the light sources are different. Specifically, the light source configuration of each of the light source modules in FIG. 4E and FIG. 4F is configured as a three-sided light source, i.e., each of the light source modules 10L and 10M further includes a third light source LS3 disposed on one side of a third light incident surface IS3 of the light guide plate 100. Referring to FIG. 4G and FIG. 4H, the difference between light source modules 10N and 10O of two embodiments and the light source modules 10L and 10M of FIG. 4E and FIG. 4F lies in that the light source configuration of each of the light source module in FIG. 4G and FIG. 4H is configured as a four-sided light source, i.e., each of the light source modules 10N and 10O further includes a fourth light source LS4 disposed on one side of a fourth light incident surface IS4 of the light guide plate 100, and the third light incident surface IS3 and the fourth light incident surface IS4 are opposite to each other. In other modified embodiments, a plurality of light sources may be provided on the side of the third light incident surface IS3 or the fourth light incident surface IS4 in FIG. 4E to FIG. 4H.

Specifically, the distribution of the aforementioned plurality of light emitting devices on the circuit board, the distribution of the plurality of optical microstructures on the first surface of the light guide plate, structures and positions of the plurality of light sources, and the relationship between the light emitting devices and the optical microstructures may also be adjusted according to the size of the display product, the brightness of the light sources and the quality requirements of the display image, and is not limited by the invention.

Furthermore, the light source module of each of the foregoing embodiments is adapted to serve as an illumination source for non-self-luminous display panels. Referring to FIG. 1A, FIG. 1B and FIG. 5, a display apparatus 1 includes a display panel DP and the light source module 10. The light guide plate 100 further has a second surface SF2$f$ facing away from the first surface SF1$f$, and the display panel DP is disposed on one side of the second surface SF2$f$ of the light guide plate 100. The display panel DP is, for example, a reflective liquid crystal display panel, a transflective liquid crystal display panel or an electrophoretic display panel, and its display surface DS is disposed toward the second surface SF2$f$ of the light guide plate 100. That is, the light source module 10 can be used as a front light module of the display apparatus 1, and light L from the first light source LS1 and the second light source LS2 may enter the light guide plate 100 through the first light incident surface IS1 and the second light incident surface IS2 respectively, and then the direction of the light L is adjusted through the optical microstructure OMS to generate incident light IL toward the display panel DP. The incident light IL is reflected by the display panel DP (for example, reflected by a light reflection layer in the reflective or transflective liquid crystal display panel or reflected by the electrophoretic particles in the electrophoretic display panel) to form reflected light RL, and the reflected light RL reaches the eyes of the user UR so that the user UR can see a corresponding picture. In the embodiment, the light source module 10 serves as an auxiliary light source of the display panel DP, i.e., when the ambient light is insufficient, the light source module 10 may be activated to improve the visibility of the display screen of the display panel DP. Therefore, the brightness of the incident light IL may be less than or equal to 50 nits, and preferably less than or equal to 30 nits to achieve the best visual effect. For example, in the double-sided light source of the light source module 10 of FIG. 1A, the brightness of each of the first light source LS1 and the second light source LS2 may be about 15 nits. It should be noted that although the light source module of the display apparatus 1 of FIG. 5 is exemplified by the aforementioned light source module 10, but the invention is not limited thereto. The light source module of the display apparatus 1 may be any light source module in the foregoing or subsequent embodiments. Since the light source module as the front light module is located on one side of the display surface of the display panel, the light source module is close to the user, and the optical defects of the light source module (such as light leakage in the edge area of the light guide plate of the light source module) are easily observed by the user, so the light source module of the invention is particularly suitable as a front light module to solve the light leakage phenomenon in the edge area of the light guide plate of the light source module at large viewing angles. However, the invention is not limited thereto. In other implementations, the display panel may also be, for example, a transmissive liquid crystal display panel, and any one of the aforementioned light source modules may be used as a backlight module of the transmissive liquid crystal display panel. That is, the light source module is disposed on one side of the display panel facing away from the display surface to serve as a backlight module.

Figure 6A:
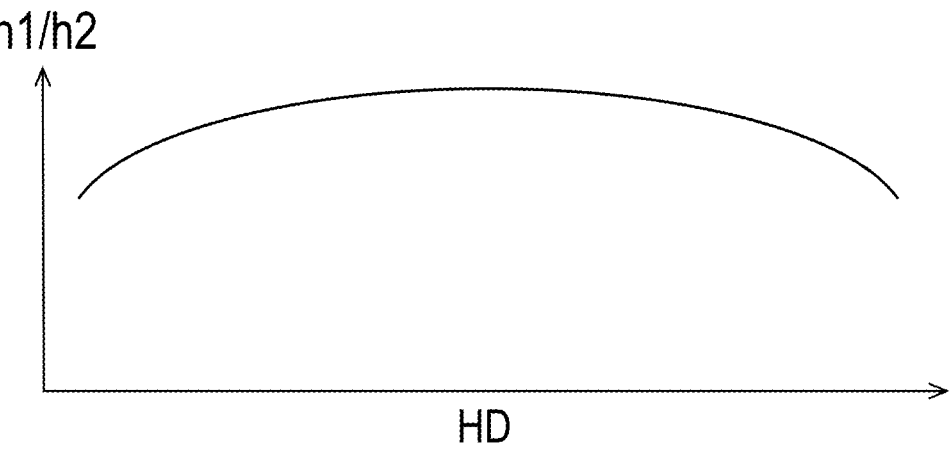
FIG. 6A is a schematic diagram of a distribution of structural height of optical microstructures of a light guide plate of a light source module according to a second embodiment of the invention.
Figure 6B:
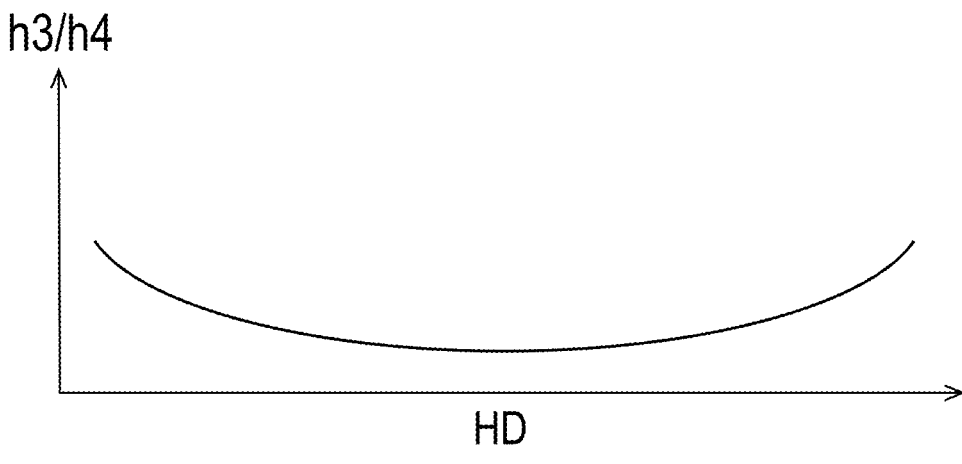
FIG. 6B is a schematic diagram of a modified embodiment of the distribution of structural height of optical microstructures of the light guide plate of the light source module according to the second embodiment of the invention.
Figure 6C:
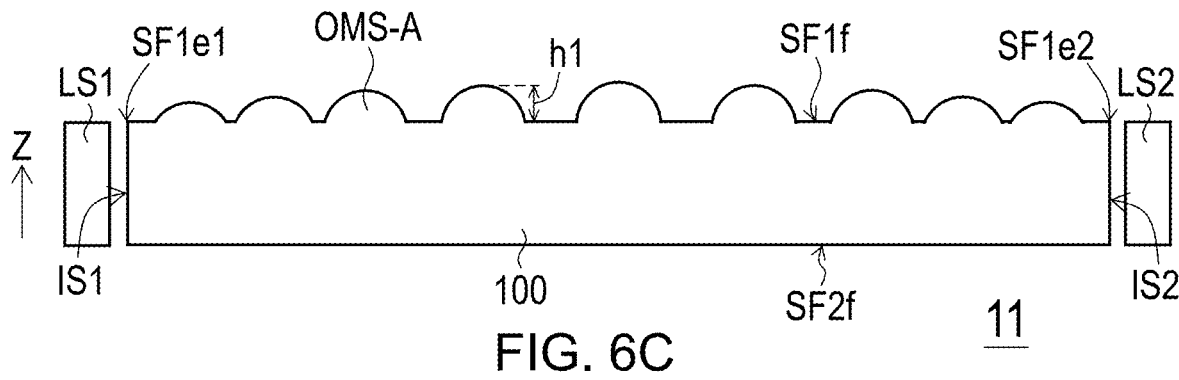
FIG. 6C to FIG. 6D are schematic cross-sectional views of light source modules according to a second embodiment of the invention.
Figure 6D:
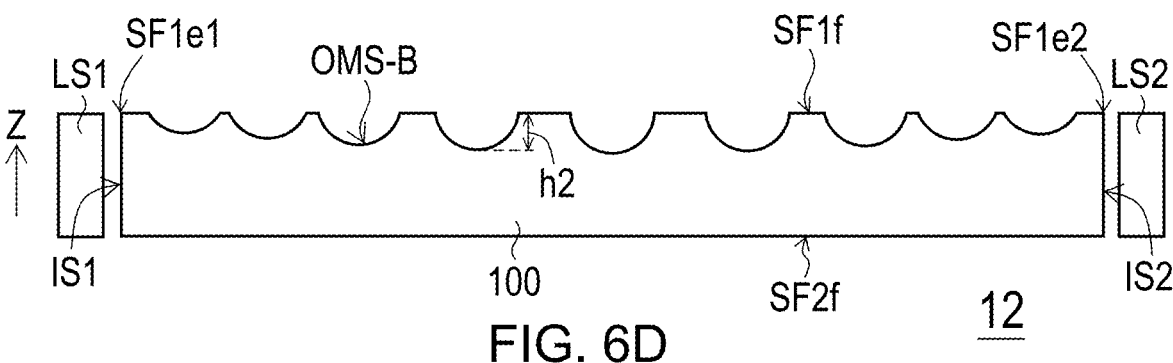
Figure 6E:
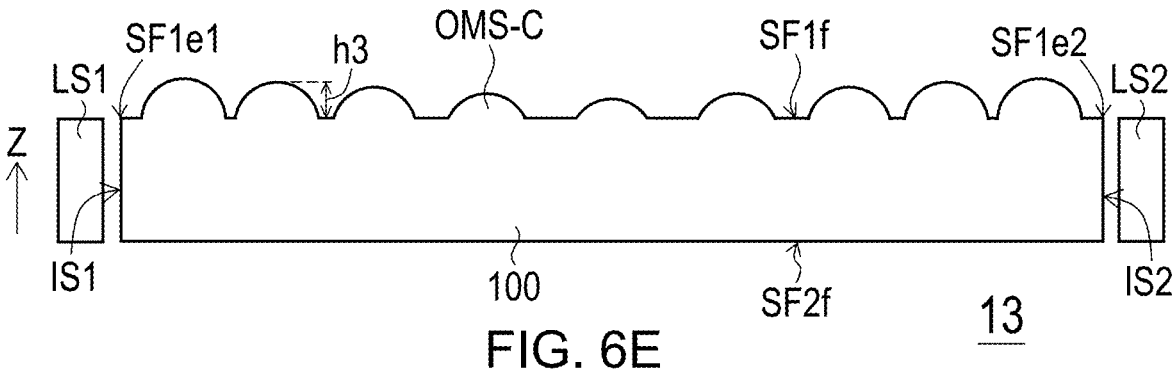
FIG. 6E to FIG. 6F are schematic cross-sectional views of other modified embodiments of the light source modules.
Figure 6F:
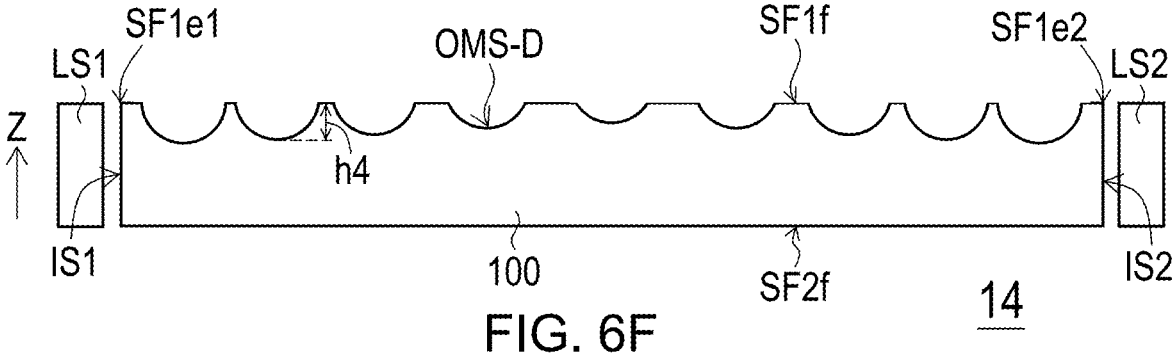

FIG. 6A is a schematic diagram of a distribution of structural height of optical microstructures of a light guide plate of a light source module according to a second embodiment of the invention. FIG. 6B is a schematic diagram of a modified embodiment of the distribution of structural height of optical microstructures of the light guide plate of the light source module according to the second embodiment of the invention. FIG. 6C and FIG. 6D are schematic cross-sectional views of light source modules according to a second embodiment of the invention. FIG. 6E to FIG. 6F are schematic cross-sectional views of other modified embodiments of the light source modules. Referring to FIG. 6A and FIG. 6C, the only difference between a light source module 11 of the embodiment and the light source module 10 of FIG. 1B lies in that the arrangement of the optical microstructures on the first surface is different. It is particularly noted that the symbol h1/h2 of the vertical axis in FIG. 6A represents h1 or h2, and the symbol h3/h4 of the vertical axis in FIG. 6B represents h3 or h4. As shown in FIG. 6A and FIG. 6C, each of the plurality of optical microstructures OMS-A has a structural height h1 along the normal direction (e.g., direction Z) of the first surface SF1$f$, and the structural heights h1 of the plurality of optical microstructures OMS-A gradually increase and then gradually decrease along a horizontal direction HD (i.e., a direction perpendicular to the direction Z, for example, a direction on the plane formed by the direction X and the direction Y). More specifically, in the embodiment, the structural heights h1 of the plurality of optical microstructures OMS-A gradually increase and then gradually decrease along a direction away from an edge of the first surface SF1$f$. That is, the structural heights h1 of the plurality of optical microstructures OMS-A gradually increase and then decrease along the normal direction of the first light incident surface IS1 or the second light incident surface IS2.

For example, the light guide plate 100 may have an edge SF1$e$1 adjacent to the first light source LS1 and another edge SF1$e$2 adjacent to the second light source LS2, and the structural heights h1 of the plurality of optical microstructures OMS-A gradually increase and then gradually decrease along a direction away from the edge SF1$e$1 (or the edge SF1$e$2). That is, at least one of the optical microstructure OMS-A closest to the edge SF1$e$1 and the optical microstructure OMS-A closest to the edge SF1$e$2 has the smallest structural height h1, and the optical microstructure OMS-A having a maximum structural height h1 is located between the optical microstructure OMS-A closest to the edge SF1$e$1 and the optical microstructure OMS-A closest to the edge SF1$e$2.

Through the above configuration, the uniformity of light emission of the light source module 11 a large viewing angles may be further improved, and the display apparatus adopting the light source module 11 may have better display contrast at large viewing angles.

However, the invention is not limited thereto. Referring to FIG. 6A and FIG. 6D, in a light source module 12 of a modified embodiment, each of the plurality of optical microstructures OMS-B may be a recessed structure recessed from the first surface SF1$f$ and has a structural height h2 (or depth h2) along the normal direction of the first surface SF1$f$, and the structural heights h2 of the plurality of optical microstructures OMS-B gradually increase and then gradually decrease along the horizontal direction HD. More specifically, in the embodiment, the structural heights h2 of the plurality of optical microstructures OMS-B gradually increase and then gradually decrease along a direction away from the edge SF1$e$1 (or the edge SF1$e$2) of the first surface SF1$f$. That is, the structural heights h2 of the plurality of optical microstructures OMS-B gradually increase and then decrease along the normal direction of the first light incident surface IS1 or the second light incident surface IS2. More specifically, at least one of the optical microstructure OMS-B closest to edge SF1$e$1 and the optical microstructure OMS-B closest to edge SF1$e$2 has a minimum structural height h2, and the optical microstructure OMS having a maximum structural height h2 is located between the optical microstructure OMS-B closest to the edge SF1$e$1 and the optical microstructure OMS-B closest to the edge SF1$e$2. Referring to FIG. 6B and FIG. 6E, in a light source module 13 of another modified embodiment, each of the plurality of optical microstructures OMS-C may be a protruding structure protruded from the first surface SF1$f$ and has a structural height h3 along the normal direction of the first surface SF1$f$, and the structural heights h3 of the plurality of optical microstructures OMS-C gradually decrease and then gradually increase along the horizontal direction HD. More specifically, in the embodiment, the structural heights h3 of the plurality of optical microstructures OMS-C gradually decrease and then increase along a direction away from the edge SF$e$1 (or the edge SF1$e$2) of the first surface SF1$f$. That is, the structural heights h3 of the plurality of optical microstructures OMS-C gradually decrease and then gradually increase along the normal direction of the first light incident surface IS1 or the second light incident surface IS2. More specifically, at least one of the optical microstructure OMS-C closest to the edge SF1$e$1 and the optical microstructure OMS-C closest to the edge SF1$e$2 has a maximum structural height h3, and the optical microstructure OMS-C having a minimum structural height h3 is located between the optical microstructure OMS-C closest to the edge SF1$e$1 and the optical microstructure OMS-C closest to the edge SF1$e$2. Referring to FIG. 6B and FIG. 6F, in a light source module 14 of still another modified embodiment, each of the plurality of optical microstructures OMS-D may be a recessed structure recessed from the first surface SF1$f$ and has a structural height h4 (or depth h4) along the normal direction of the first surface SF1$f$, and the structural heights h4 gradually decrease and then gradually increase along the horizontal direction HD. More specifically, in the embodiment, the structural heights h4 of the plurality of optical microstructures OMS-D gradually decrease and then gradually increase along a direction away from the edge SF1$e$1 (or the edge SF1$e$2) of the first surface SF1$f$. That is, the structural heights h4 of the plurality of optical microstructures OMS-D gradually decrease and then gradually increase along the normal direction of the first light incident surface IS1 or the second light incident surface IS2. More specifically, at least one of the optical microstructure OMS-D closest to edge SF1$e$1 and the optical microstructure OMS-D closest to edge SF1$e$2 has a maximum structural height h4, and the optical microstructure OMS-D having a minimum structural height h4 is located between the optical microstructure OMS-D closest to the edge SF1$e$1 and the optical microstructure OMS-D closest to the edge SF1$e$2. It is particularly noted that FIG. 6C to FIG. 6F each illustrate a light source module including a first light source LS1 and a second light source LS2 that are opposite to each other as an example, but the invention is not limited thereto. The invention does not limit the number and the location of the light sources of the light source module having the structural height of the optical microstructure of FIG. 6A or FIG. 6B.

Figures 7A, 7B, 7C, 7D:
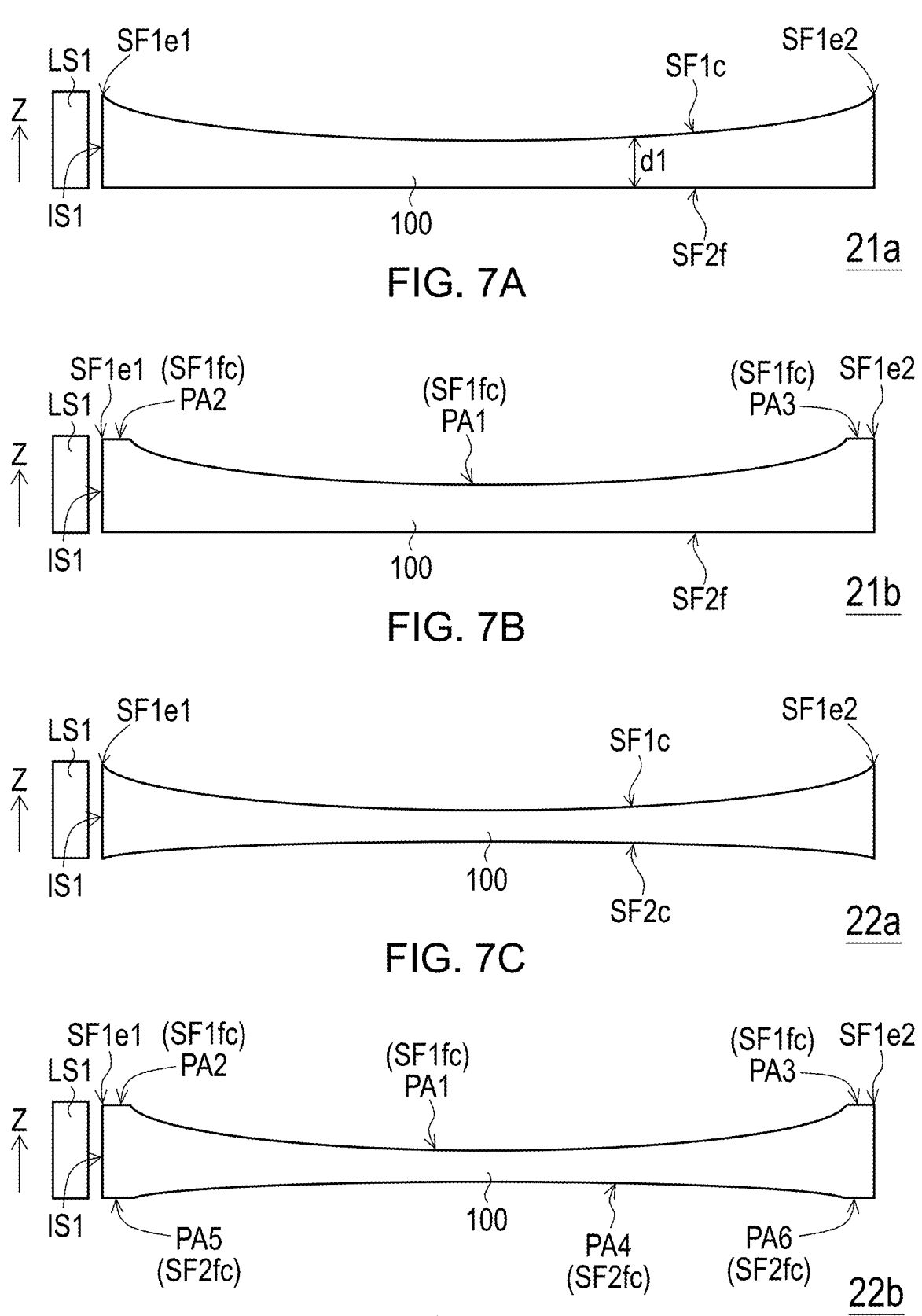
FIG. 7A is a schematic cross-sectional view of a light source module according to a third embodiment of the invention.
FIG. 7B to FIG. 7F are schematic cross-sectional views of other modified embodiments of the light source module of FIG. 7A.

FIG. 7A is a schematic cross-sectional view of a light source module according to a third embodiment of the invention. FIG. 7B to FIG. 7F are schematic cross-sectional views of other modified embodiments of the light source module of FIG. 7A. Referring to FIG. 7A, the difference between a light source module 21$a$ of the embodiment and the light source module 10 of FIG. 1B lies in that the configuration of the first surface of the light guide plate is different. Specifically, in the light source module 21$a$ of the embodiment, the first surface SF1$c$ of the light guide plate 100 may be a curved surface that is concave toward the inside of the light guide plate 100 (i.e., a concave curved surface), and the second surface SF2$f$ may be a plane.

From another point of view, a distance d1 between the first surface SF1$c$ and the second surface SF2$f$ of the light guide plate 100 gradually decreases and then gradually increases along a direction away from the edge SF1$e$1 (or the edge SF1$e$2) of the first surface SF1$c$. That is, the distance d1 between the first surface SF1$c$ and the second surface SF2$f$ of the light guide plate 100 gradually decreases and then gradually increases along the normal direction of the first light incident surface IS1 or the second light incident surface IS2. The aforementioned distance d1 is, for example, an interval distance between the first surface SF1$c$ and the second surface SF2$f$ along the normal direction (e.g., the direction Z) of the second surface SF2$f$.

In the embodiment, since the first surface SF1$c$ is a concave curved surface, the ambient light from the side of the first surface SF1$c$ of the light guide plate 100 may be effectively directed to a display panel (not shown) located on one side of the second surface SF2$f$ of the light guide plate 100, helping to improve the overall display brightness.

Referring to FIG. 7B, the difference between a light source module 21$b$ and the light source module 21$a$ lies in that the configuration of the first surface of the light guide plate is different. Specifically, in the light source module 21$b$ of the embodiment, the first surface SF1$fc$ of the light guide plate 100 includes a first part PA1 and a second part PA2. The second part PA2 is adjacent to the first light source LS1, that is, two opposite ends of the second part PA2 are respectively coupled to the edge SF1$e$1 of the first surface SF1$fc$ and the first part PA1. The first part PA1 may be a curved surface that is concave toward the inside of the light guide plate 100 (i.e., a concave curved surface), and the second part PA2 may be a plane. Besides, the first surface SF1$fc$ of the light guide plate 100 further includes a third part PA3. Two opposite ends of the third part PA3 are respectively coupled to the edge SF1$e$2 of the first surface SF1$fc$ and the first part PA1, and the third part PA3 may be a plane.

However, the invention is not limited thereto. Referring to FIG. 7C, in a light source module 22$a$ of a modified embodiment, the second surface SF2c of the light guide plate 100 may also be a curved surface that is concave toward the inside of the light guide plate 100. That is, the light guide plate 100 of the light source module 22a has a first surface SF1c and a second surface SF2c that are recessed toward each other. Since the second surface SF2c is a concave curved surface of the light guide plate 100, the light reflected by the display panel (not shown) located on one side of the second surface SF2c of the light guide plate 100 may be directed to a larger viewing angle range through the second surface SF2c, which helps to improve the visibility of the display screen at large viewing angles.

Referring to FIG. 7D, the difference between a light source module 22b of the embodiment and the light source module 21b lies in that the configuration of the second surface of the light guide plate is different. Specifically, in the light source module 22b of the embodiment, the second surface SF2fc of the light guide plate 100 includes a fourth part PA4 and a fifth part PA5. The fifth part PA5 is adjacent to the first light source LS1 (or the first light incident surface IS1), that is, two opposite ends of the fifth part PA5 are respectively coupled to the edge SF1e1 and the fourth part PA4. The fourth part PA4 may be a curved surface that is concave toward the inside of the light guide plate 100 (i.e., a concave curved surface), and the fifth part PA5 may be a plane. Besides, the second surface SF2fc of the light guide plate 100 may further include a sixth part PA6. Two opposite ends of the sixth part PA6 are respectively coupled to the edge SF1e2 of the first surface SF1fc and the fourth part PA4, and the sixth part PA6 may be a plane.

Figures 7E, 7F, 7G, 7H:
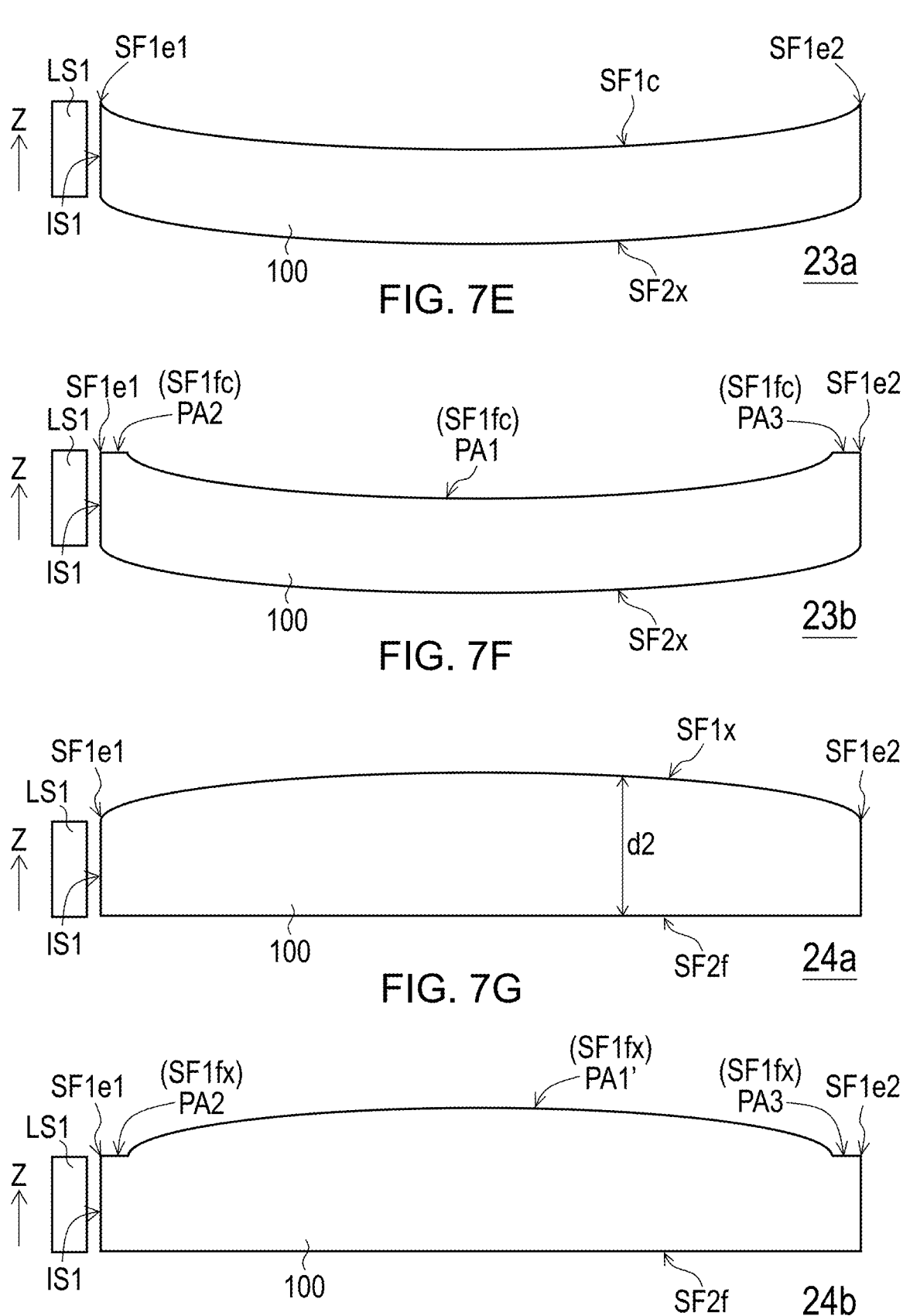
FIG. 7G is a schematic cross-sectional view of a light source module according to a fourth embodiment of the invention.
FIG. 7H to FIG. 7L are schematic cross-sectional views of other modified embodiments of the light source module of FIG. 7G.

Referring to FIG. 7E and FIG. 7F, in a light source module 23a and a light source module 23b of another two modified embodiments, the second surface SF2x of the light guide plate 100 may be a curved surface protruded toward the outside of the light guide plate 100 (i.e., a convex curved surface). It should be particularly noted that the first surface SF1c (or the first part PA1 of the first surface SF1fc), which is a concave curved surface, may effectively guide the ambient light from the side of the first surface SF1c (or the first part PA1 of the first surface SF1fc) of the light guide plate 100 to the display panel (not shown) located on the side of the second surface SF2x of the light guide plate 100, and the light reflected by the display panel may be concentratedly directed to a viewable area through the second surface SF2x, which is a convex curved surface, helping to further enhance the overall display brightness.

FIG. 7G is a schematic cross-sectional view of a light source module according to a fourth embodiment of the invention. FIG. 7H to FIG. 7L are schematic cross-sectional views of other modified embodiments of the light source module of FIG. 7G. Referring to FIG. 7G, the difference between a light source module 24a of the embodiment and the light source module 10 of FIG. 1B lies in that the configuration of the first surface of the light guide plate is different. Specifically, in the light source module 24a of the embodiment, the first surface SF1x of the light guide plate 100 may be a curved surface protruded toward the outside of the light guide plate 100 (i.e., a convex curved surface), and the second surface SF2f may be a plane.

From another point of view, a distance d2 between the first surface SF1x and the second surface SF2f of the light guide plate 100 gradually increases and then gradually decreases along a direction away from the edge SF1e1 (or the edge SF1e2) of the first surface SF1x. That is, the distance d2 between the first surface SF1x and the second surface SF2f of the light guide plate 100 gradually increases and then gradually decreases along the normal direction of the first light incident surface IS1 or the second light incident surface IS2. The aforementioned distance d2 is, for example, an interval distance between the first surface SF1x and the second surface SF2f along the normal direction (e.g., the direction Z) of the second surface SF2f.

In the embodiment, since the first surface SF1x is a convex curved surface, when at least one of the first light source LS1 and the second light source LS2 is turned on, the light collection property of the light emitted by the light source may be improved by the deflection of the first surface SF1x. In other words, it can inhibit the generation of stray light at large angles, and thereby improving the overall display brightness.

Referring to FIG. 7H, the difference between a light source module 24b of the embodiment and the light source module 24a lies in that the configuration of the first surface of the light guide plate is different. Specifically, in the light source module 24b of the embodiment, the first surface SF1fx of the light guide plate 100 includes a first part PA1' and a second part PA2. Two opposite ends of the second part PA2 are respectively coupled to the edge SF1e1 of the first surface SF1fc and the first part PA1'. The first part PA1' may be a convex curved surface, and the second part PA2 may be a plane. Besides, the first surface SF1fx of the light guide plate 100 may further include a third part PA3. Two opposite ends of the third part PA3 are respectively coupled to the edge SF1e2 of the first surface SF1fx and the first part PA1', and the third part PA3 may be a plane.

Figures 7I, 7J, 7K, 7L:
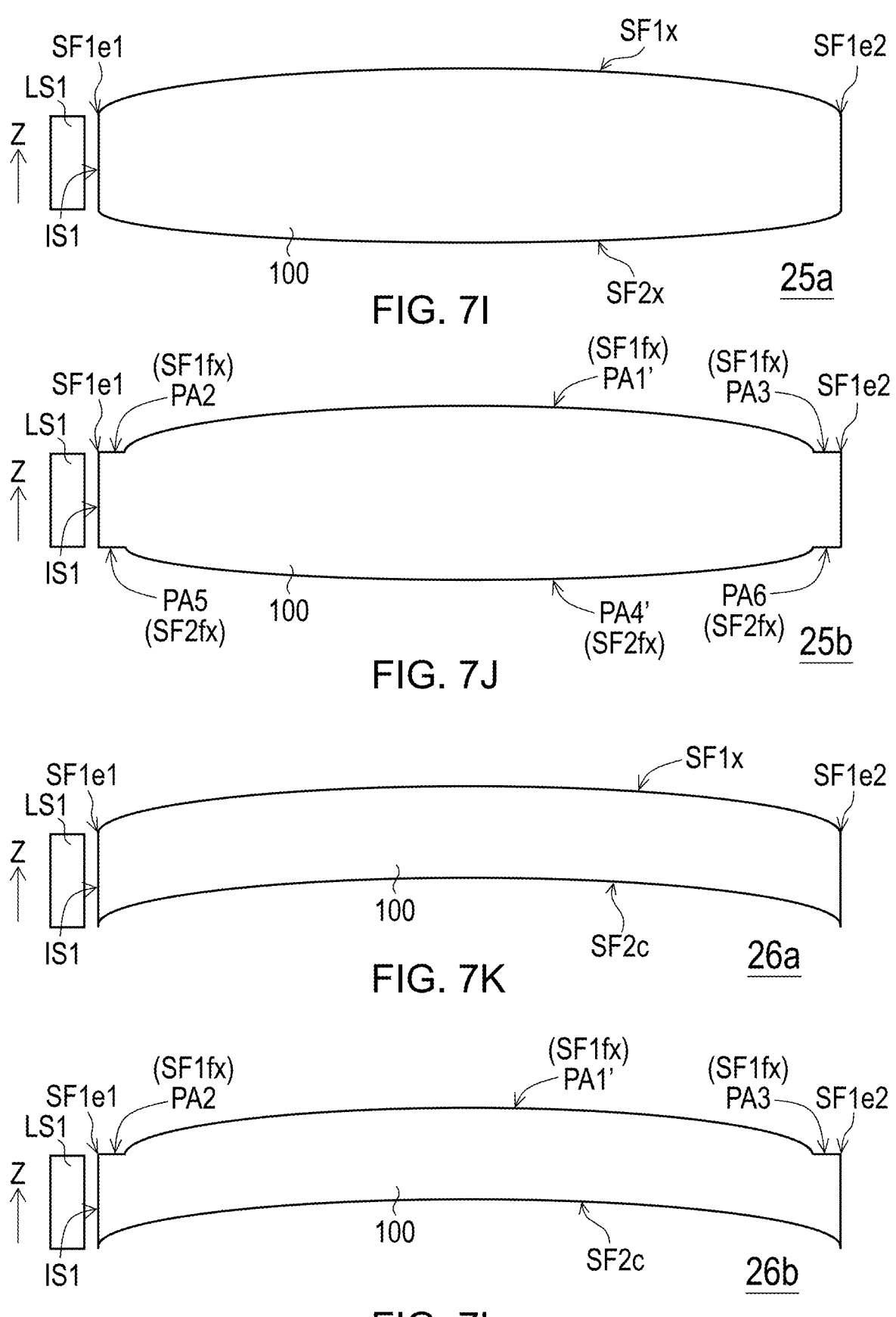
Figure 8A:
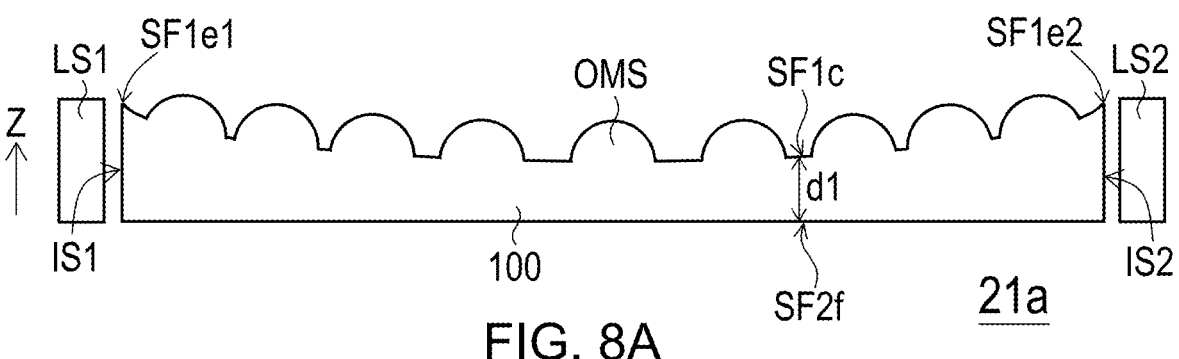
FIG. 8A to FIG. 8F are schematic cross-sectional views of light source modules according to the third embodiment, the fourth embodiment and other modified embodiments of the invention.
Figure 8B:
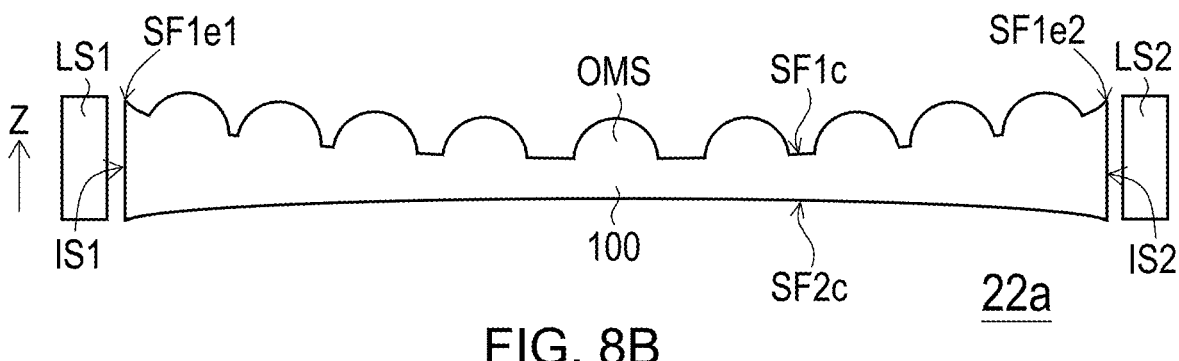
Figure 8C:
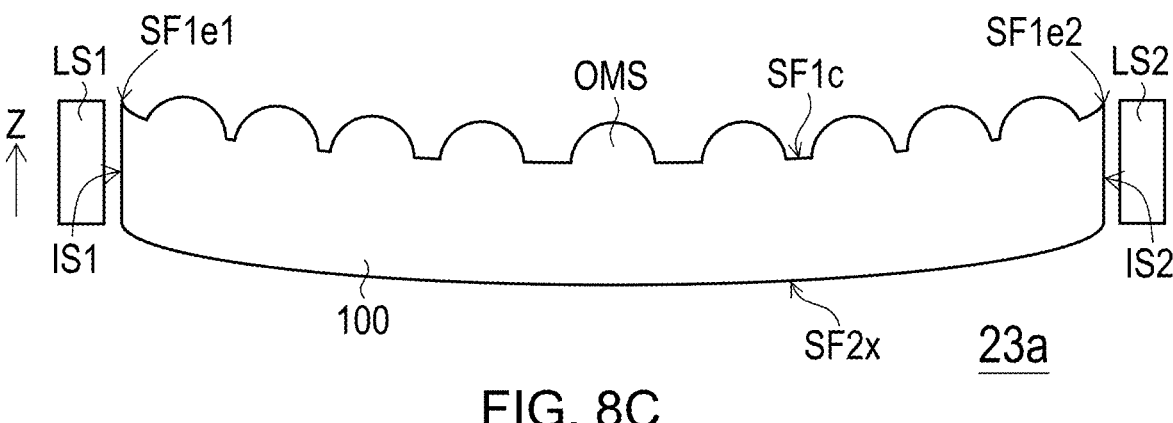
Figure 8D:
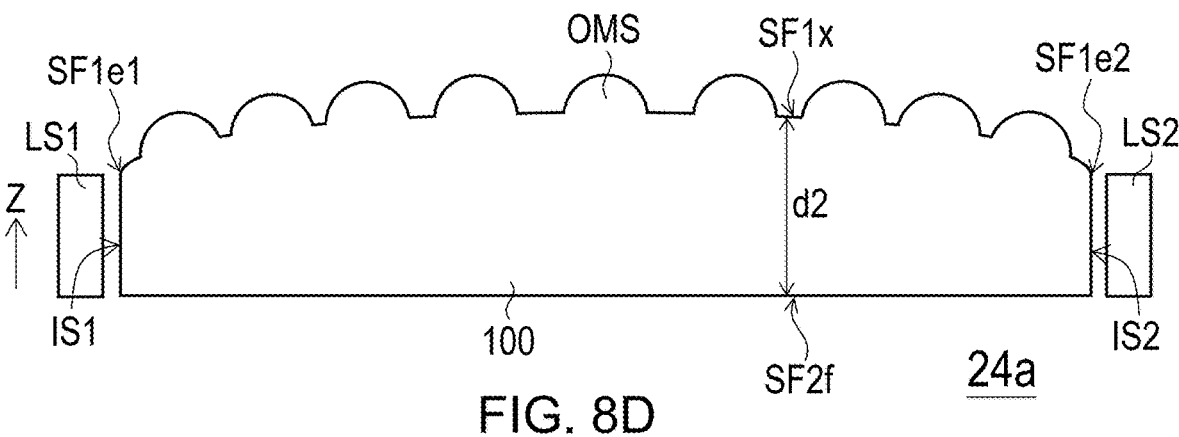
Figure 8E:
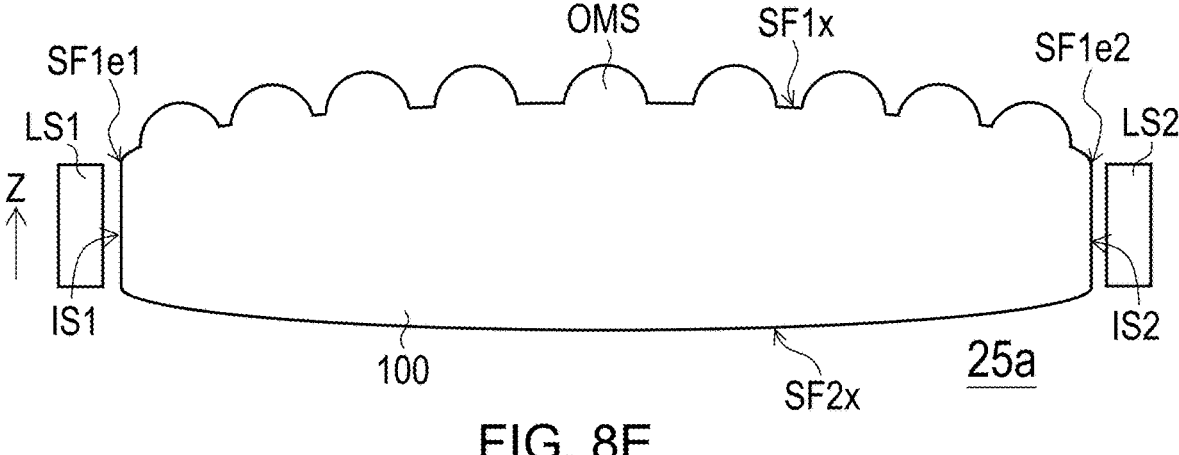
Figure 8F:
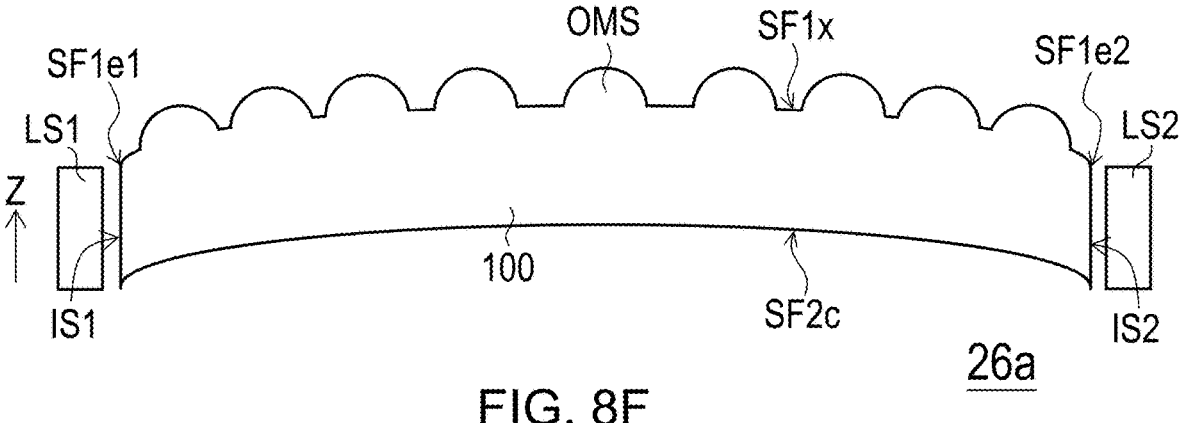

However, the invention is not limited thereto. Referring to FIG. 7I, in a light source module 25a of a modified embodiment, the second surface SF2x of the light guide plate 100 may be a curved surface protruded toward the outside of the light guide plate 100. That is, the light guide plate 100 of the light source module 25a has the first surface SF1x and the second surface SF2x protruding away from each other. Since the second surface SF2x is a convex curved surface of the light guide plate 100, the light reflected by the display panel (not shown) located on the side of the second surface SF2x of the light guide plate 100 may be concentratedly directed to a viewable area through the second surface SF2x, which is a convex curved surface, and thereby further improving the overall display brightness.

Referring to FIG. 7J, the difference between a light source module 25b and the light source module 24b lies in that the configuration of the second surface of the light guide plate is different. Specifically, in the light source module 25b of the embodiment, the second surface SF2fx of the light guide plate 100 includes a fourth part PA4', a fifth part PA5 and a sixth part PA6. The fourth part PA4' may be a convex curved surface, and each of the fifth part PA5 and the sixth part PA6 may be a plane.

Referring to FIG. 7K and FIG. 7L, in a light source module 26a and a light source module 26b of another two modified embodiments, the second surface SF2c of the light guide plate 100 may be a curved surface that is concave toward the inside of the light guide plate 100 (i.e., a concave curved surface). The light reflected by the display panel (not shown) located on the side of the second surface SF2c of the light guide plate 100 may be directed to a larger viewing angle range through the second surface SF2c, which is a concave curved surface, and thereby helping to improve the visibility of the display screen at large viewing angles.

FIG. 8A to FIG. 8F are schematic cross-sectional views of light source modules provided with optical microstructures disposed on the first surface of the light guide plate according to the light source modules 21a, 22a, 23a, 24a, 25a, 26a of FIGS. 7A, 7C, 7E, 7G, 7I and 7K. It is particularly noted that in order to be compared with the light source module 10 of FIG. 1B, FIG. 8A to FIG. 8F each illustrate a light source module including a first light source LS1 and a second light source LS2 that are opposite to each other as an example, but the invention is not limited thereto. The invention does not limit the number and the location of the light sources of the light source module having the shapes of the first surface and the second surface of each of the light guide plates of FIG. 7A to FIG. 7L and FIG. 8A to FIG. 8F. Besides, in any one of the light source modules shown in FIGS. 6C to 8F, the top-view position distribution of the optical microstructures on the first surface may be adjusted according to the size of the display product, the brightness of the light source, and the quality requirements of the display image. The invention is not limited thereto.

Figure 9:
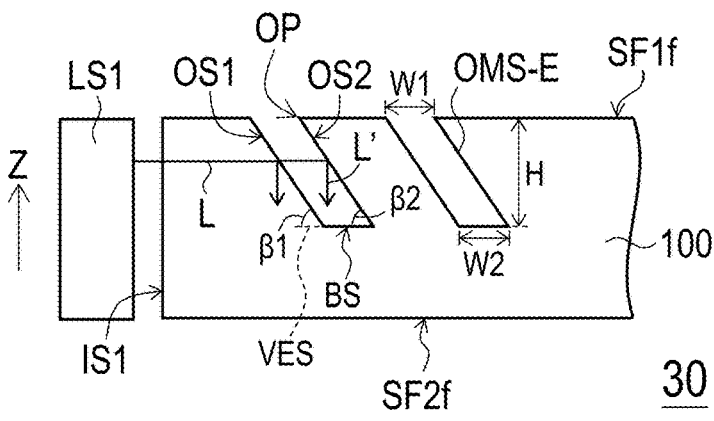
FIG. 9 is a schematic cross-sectional view of a light source module according to a fifth embodiment of the invention.

FIG. 9 is a schematic cross-sectional view of a light source module according to a fifth embodiment of the invention. FIG. 10A to FIG. 10D are schematic cross-sectional views of other modified embodiments of the light source module of FIG. 9. Referring to FIG. 9, the main difference between a light source module 30 of the embodiment and the light source module 10 of FIG. 2 lies in that the configuration of the optical microstructure is different. Specifically, in the light source module 30 of the embodiment, the optical microstructure OMS-E may be a recessed structure recessed from the first surface SF1*f* of the light guide plate 100, and has a first optical surface OS1, a second optical surface OS2 and a bottom surface BS connecting the first optical surface OS1 and the second optical surface OS2.

For example, in the embodiment, a cross-sectional profile of each of the first optical surface OS1 and the second optical surface OS2 may be linear. The aforementioned cross-section is, for example, a plane perpendicular to the first light incident surface IS1 and the first surface SF1*f*. In detail, the first surface SF1*f* has a plurality of openings OP each defining a corresponding one of the plurality of optical microstructures OMS-E. The first optical surface OS1 and the second optical surface OS2 each extend from an edge of the opening OP to an edge of the bottom surface BS, and the opening OP and the bottom surface BS respectively has a width W1 and a width W2 along the normal direction of the first light incident surface IS1. Preferably, the width W1 may be greater than or equal to the width W2. For example, the width W1 and the width W2 may each be greater than 0 μm and less than or equal to 20 μm, but the invention is not limited thereto.

On the other hand, a height H of the optical microstructure OMS-E along the normal direction (e.g., direction Z) of the first surface SF1*f* may be greater than or equal to 0.1 μm and less than or equal to 10 μm, but the invention is not limited thereto. A first included angle β1 is provided between the first optical surface OS1 and a virtual extension surface VES of the bottom surface BS. A second included angle β2 is provided between the second optical surface OS2 and the bottom surface BS. The second included angle β2 is greater than or equal to the first included angle α1. Preferably, each of the first included angle β1 and the second included angle β2 may be greater than or equal to 40 degrees and less than or equal to 50 degrees.

In the embodiment, the light source module 30 may include a first light source LS1. The first optical surface OS1 is located between the first light incident surface IS1 and the second optical surface OS2. The configuration of the first optical surface OS1 may reflect the light L from the first light source LS1 toward the second surface SF2*f*. The configuration of the second optical surface OS2 may reflect part of the light L' penetrating the first optical surface OS1 toward the second surface SF2*f*. Through the design of these two optical surfaces, the light source utilization rate of the light source module 30 may be greatly improved. In other words, the output power consumption of the light source module 30 may be reduced.

Figure 10A:
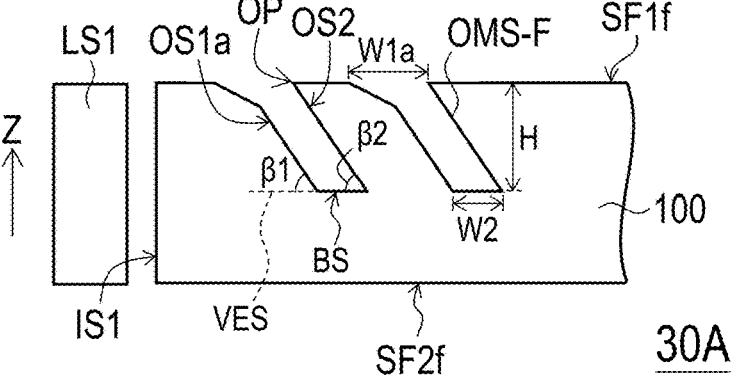
FIG. 10A to FIG. 10D are schematic cross-sectional views of other modified embodiments of the light source module of FIG. 9.
Figure 10B:
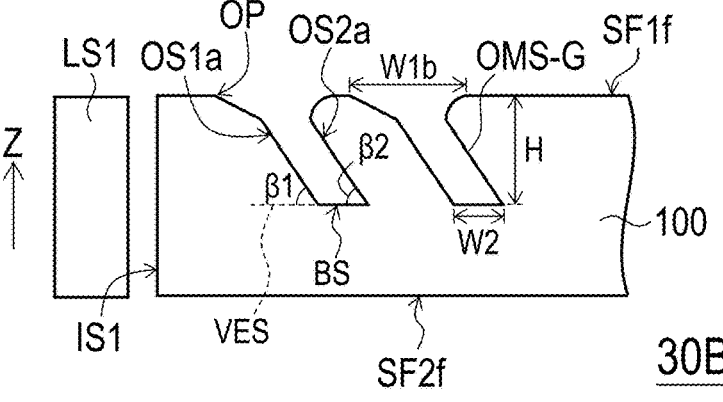
Figure 10C:
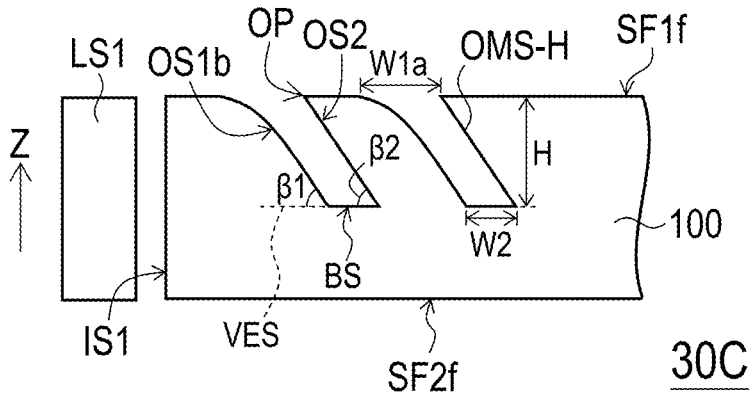
Figure 10D:
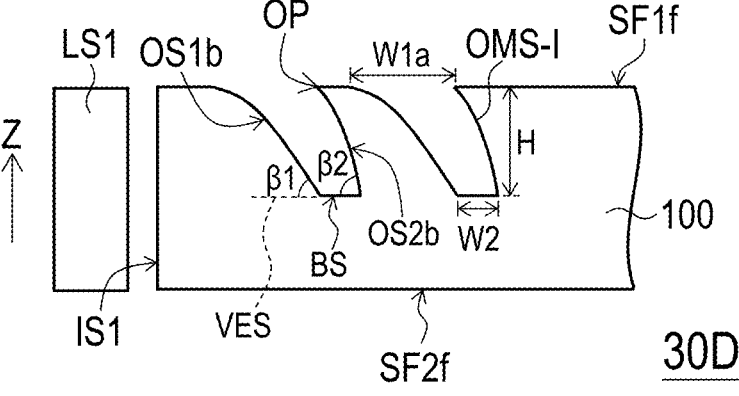

However, the invention is not limited thereto. Referring to FIG. 10A, in a light source module 30A of a first modified embodiment, the cross-sectional profile of the first optical surface OS1*a* of the optical microstructure OMS-F may be a polyline (for example, a broken line formed by two straight lines having two different extension directions in FIG. 10A), and the width W1*a* of the opening OP is greater than the width W2 of the bottom surface BS. Referring to FIG. 10B, in a light source module 30B of a second modified embodiment, the cross-sectional profile of the first optical surface OS1*a* of the optical microstructure OMS-G is a polyline, and the cross-sectional profile of second optical surface OS2*a* thereof may be a combination of linear and curvilinear. The width W1*b* of the opening OP is greater than the width W2 of the bottom surface BS. In other modified embodiments, the cross-sectional profile of the second optical surface OS2*a* may be a combination of a curvilinear and a polyline. Referring to FIG. 10C, in a light source module 30C of a third modified embodiment, the cross-sectional profile of the first optical surface OS1*b* of the optical microstructure OMS-H may be curvilinear. Referring to FIG. 10D, in a light source module 30D of a fourth modified embodiment, the cross-sectional profile of each of the first optical surface OS1*b* and the second optical surface OS2*b* of the optical microstructure OMS-I may be curvilinear.

Figure 11A:
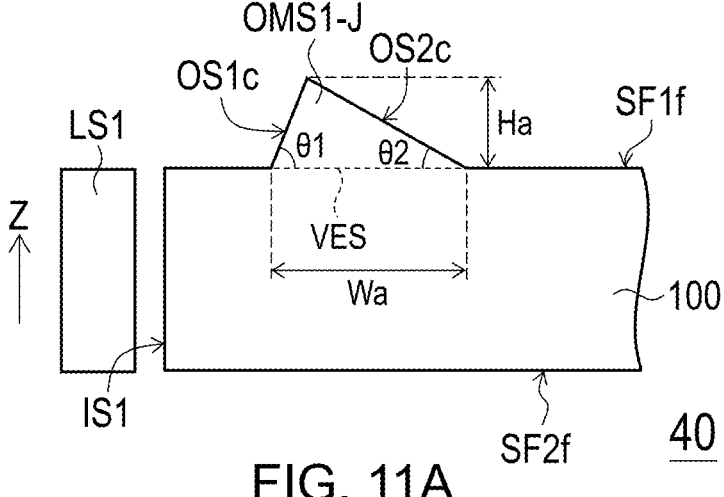
FIG. 11A is a schematic cross-sectional view of a light source module according to a sixth embodiment of the invention.
Figure 11B:
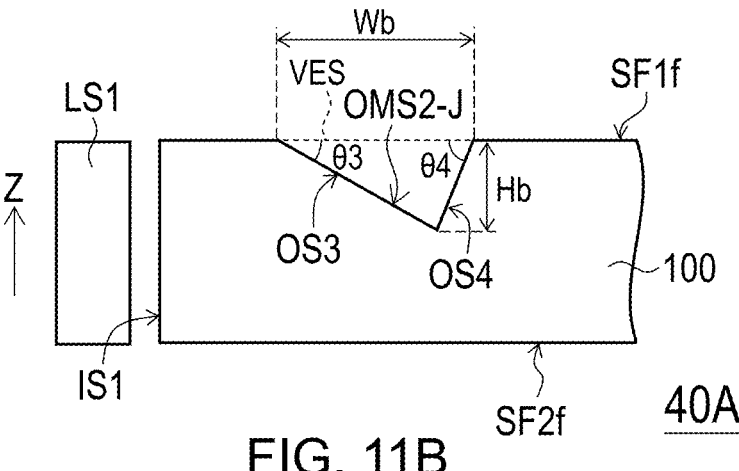
FIG. 11B is a schematic cross-sectional view of another modified embodiment of the light source module of FIG. 11A.

FIG. 11A is a schematic cross-sectional view of a light source module according to a sixth embodiment of the invention. FIG. 11B is a schematic cross-sectional view of another modified embodiment of the light source module of FIG. 11A. Referring to FIG. 11A, the main difference between a light source module 40 of the embodiment and the light source module 30 of FIG. 9 lies in that the configuration of the optical microstructure is different. Specifically, in the light source module 40 of the embodiment, the optical microstructure OMS1-J may be a protruding structure protruded from the first surface SF1*f* of the light guide plate 100, and has a first optical surface OS1*c* and a second optical surface OS2*c* connected to each other. The first optical surface OS1*c* is located between the first light incident surface IS1 and the second optical surface OS2*c*.

In the embodiment, the cross-sectional profile of the optical microstructure OMS1-J may be triangular, that is, the cross-sectional profiles of the first optical surface OS1*c* and the second optical surface OS2*c* are both linear. More specifically, the optical microstructure OMS1-J of the embodiment may be a directional mesh dot disposed on the light guide plate 100. In detail, a first included angle θ1 is provided between the first optical surface OS1*c* and a virtual extension surface VES of the first surface SF1*f*. A second included angle θ2 is provided between the second optical surface OS2*c* and the virtual extension surface VES of the first surface SF1*f*. It is particularly important to note that the first included angle θ1 of the optical microstructure OMS1-J is greater than the second included angle θ2. Preferably, the first included angle θ1 is greater than or equal to 65 degrees and less than or equal to 85 degrees, and the second included angle θ2 is greater than or equal to 35 degrees and less than or equal to 55 degrees, but the invention is not limited thereto.

On the other hand, the optical microstructure OMS1-J has a height Ha along the normal direction (e.g., the direction Z) of the first surface SF1*f*, and has a width Wa along the normal direction of the first light incident surface IS1. Preferably, the height Ha of the optical microstructure OMS1-J may be greater than or equal to 0.1 μm and less than or equal to 10 μm, and its width Wa may be greater than or equal to 5 μm and less than or equal to 30 μm, but the invention is not limited thereto. For example, a ratio of the width Wa to the height Ha of the optical microstructure OMS1-J may be greater than or equal to 2 and less than or equal to 7.

However, the invention is not limited thereto. Referring to FIG. 11B, in a light source module 40A of a modified embodiment, the optical microstructure OMS2-J may be a recessed structure recessed from the first surface SF1*f* of the light guide plate 100 and has a third optical surfaces OS3 and a fourth optical surface OS4 connected to each other. The third optical surface OS3 is located between the first light incident surface IS1 and the fourth optical surface OS4. The cross-sectional profile of the optical microstructure OMS1-J may be triangular, that is, the cross-sectional profiles of the third optical surface OS3 and the fourth optical surface OS4 are both linear. More specifically, the optical microstructure OMS2-J of the modified embodiment may be a directional mesh dot disposed on the light guide plate 100. In detail, a third included angle θ3 is provided between the third optical surface OS3 and the virtual extension surface VES of the first surface SF1*f*. A fourth included angle θ4 is provided between the fourth optical surface OS4 and the virtual extension surface VES of the first surface SF1*f*. It is particularly important to note that the third included angle θ3 of the optical microstructure OMS2-J is less than the fourth included angle θ4. Preferably, the third included angle θ3 is greater than or equal to 35 degrees and less than or equal to 55 degrees, and the fourth included angle θ4 is greater than or equal to 65 degrees and less than or equal to 85 degrees, but the invention is not limited thereto.

On the other hand, the optical microstructure OMS2-J has a height Hb along the normal direction (e.g., the direction Z) of the first surface SF1*f*, and has a width Wb along the normal direction of the first light incident surface IS1. Preferably, the height Hb of the optical microstructure OMS2-J may be greater than or equal to 0.1 μm and less than or equal to 10 μm, and its width Wb may be greater than or equal to 5 μm and less than or equal to 30 μm, but the invention is not limited thereto. For example, a ratio of the width Wb to the height Hb of the optical microstructure OMS2-J may be greater than or equal to 2 and less than or equal to 7.

Figure 12:
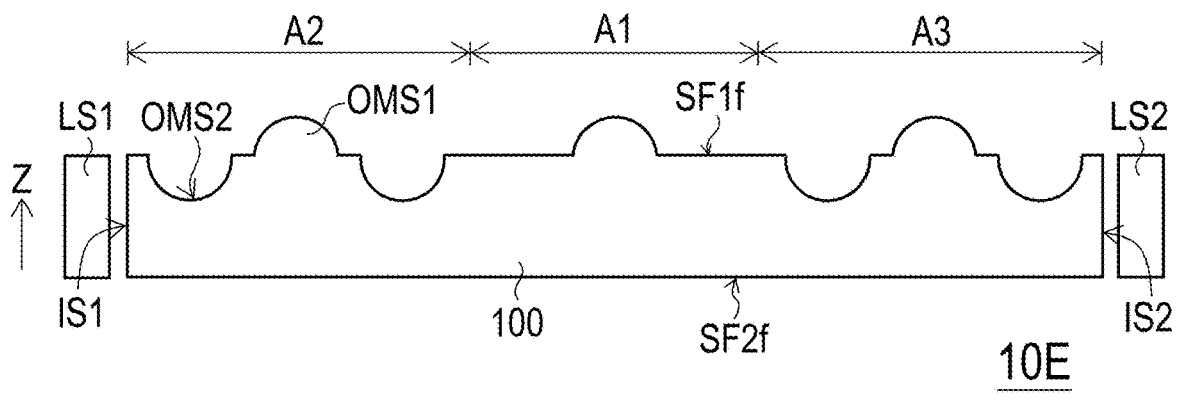
FIG. 12 is a schematic cross-sectional view of a light source module according to a seventh embodiment of the invention.
Figure 13A:
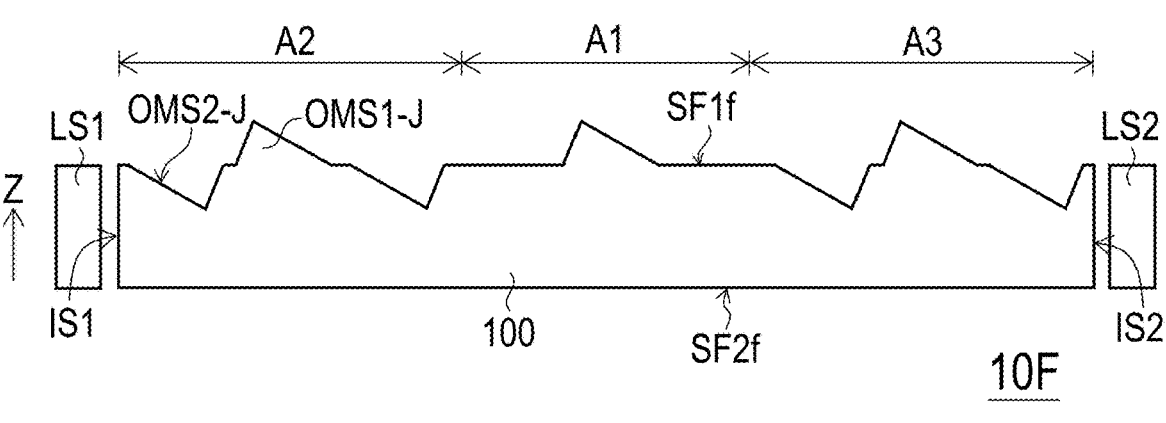
FIG. 13A is a schematic cross-sectional view of another modified embodiment of the light source module of FIG. 12.
Figure 13B:
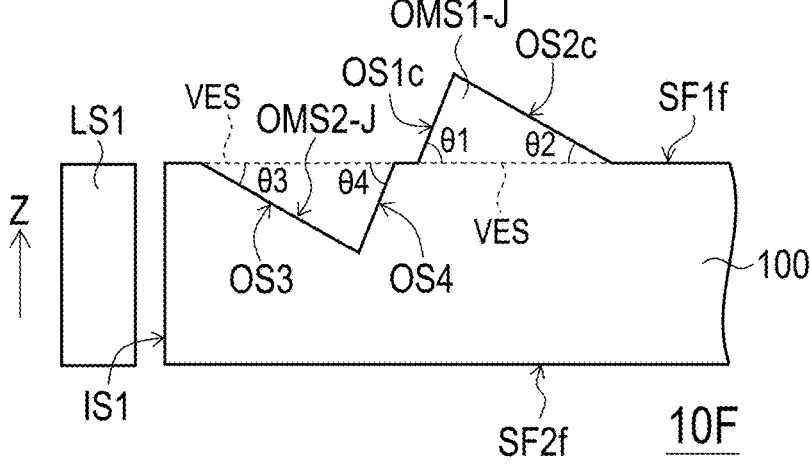
FIG. 13B is an enlarged schematic diagram of a partial area of the light source module of FIG. 13A.

FIG. 12 is a schematic cross-sectional view of a light source module according to a seventh embodiment of the invention. FIG. 13A is a schematic cross-sectional view of another modified embodiment of the light source module of FIG. 12. FIG. 13B is an enlarged schematic diagram of a partial area of the light source module of FIG. 13A.

Referring to FIG. 12, the difference between a light source module 10E of the embodiment and the light source module 10 of FIG. 1B lies in that the configuration of the optical microstructures is different. Specifically, in the embodiment, the light source module 10E may include a plurality of optical microstructures OMS1 protruding from the first surface SF1*f* of the light guide plate 100 and a plurality of optical microstructures OMS2 recessed from the first surface SF1*f* of the light guide plate 100. The optical microstructures OMS1 are spaced apart from the optical microstructures OMS2. That is, an interval distance is provided between the optical microstructure OMS1 and the optical microstructure OMS2 adjacent to each other in the normal direction of the first light incident surface IS1 (part of the first surface SF1*f* is located between the optical microstructure OMS1 and the optical microstructure between OMS2 adjacent to each other).

Specifically, the configuration of the optical microstructure OMS1 and the optical microstructure OMS2 may improve the light emission brightness of the light source module 10E on the side of the second surface SF2*f*, and the design of the optical microstructure OMS1 may reduce the impact of the overall optical microstructure on visual quality of the display screen.

For example, in the embodiment, the optical microstructures OMS1 and the optical microstructures OMS2 may be alternately arranged on the first surface SFf along the normal direction of the first light incident surface IS1. However, the invention is not limited thereto. In other unillustrated embodiments, the number and the alternating arrangement method of the optical microstructures OMS1 and the optical microstructures OMS2 may be adjusted according to different optical performance requirements.

In another modified implementation, the optical microstructure OMS1 and the optical microstructure OMS2 of FIG. 12 may be replaced by the optical microstructure OMS1-J of FIG. 11A and the optical microstructure OMS2-J of FIG. 11B respectively to obtain, for example, a light source module 10F shown in FIG. 13A and FIG. 13B.

Figure 14:
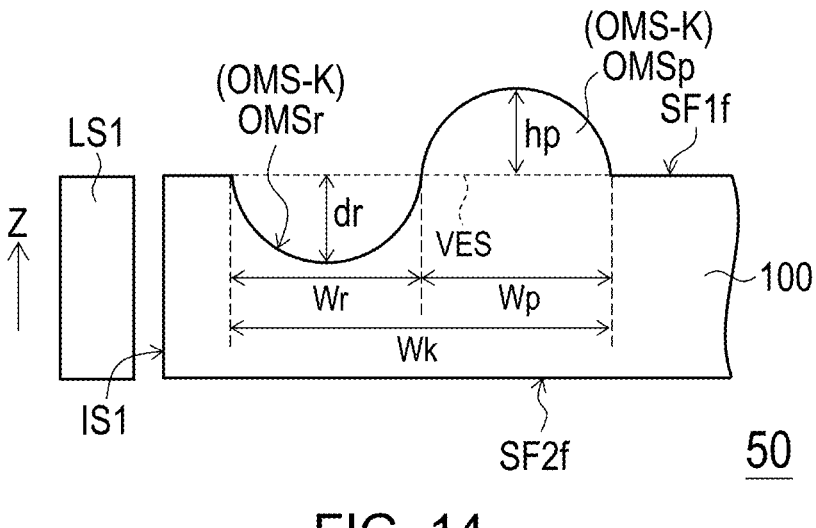
FIG. 14 is a schematic cross-sectional view of a light source module according to an eighth embodiment of the invention.

FIG. 14 is a schematic cross-sectional view of a light source module according to an eighth embodiment of the invention. Referring to FIG. 14, the main difference between a light source module 50 of the embodiment and the light source module 10E of FIG. 12 lies in that the configuration of the optical microstructure is different. Specifically, in the embodiment, each of the plurality of optical microstructures OMS-K of the light source module 50 may have a recessed portion OMSr recessed from the first surface SF1*f* and a protruding portion OMSp protruded from the first surface SF1*f*. It is particularly noteworthy that unlike the optical microstructure OMS1 and the optical microstructure OMS2 in FIG. 12 which are arranged at intervals, the recessed portion OMSr and the protruding portion OMSp of the optical microstructure OMS-K of the embodiment are arranged closely adjacent to each other. That is, there is no interval distance between the recessed portion OMSr and the protruding portion OMSp, and a single mesh dot having a concave and convex structure is formed.

In detail, the recessed portion OMSr and the protruding portion OMSp respectively have a depth dr and a height hp along the normal direction of the first surface SF1*f*. Preferably, the depth dr of the recessed portion OMSr is greater than or equal to the height hp of the protruding portion OMSp, and the depth dr is less than or equal to 10 μm. On the other hand, the optical microstructure OMS-K has a width Wk along the normal direction of the first light incident surface IS1, and the recessed portion OMSr and the protruding portion OMSp respectively have a width Wr and a width Wp along the normal direction of the first light incident surface IS1. The width Wr of the recessed portion OMSr and the width Wp of the protruding portion OMSp may be equal to or different from each other. Preferably, the width Wk of the optical microstructure OMS-K may be less than or equal to 60 μm, and a ratio of the width Wk to the depth dr may be greater than or equal to 1 and less than or equal to 60.

Figure 15:
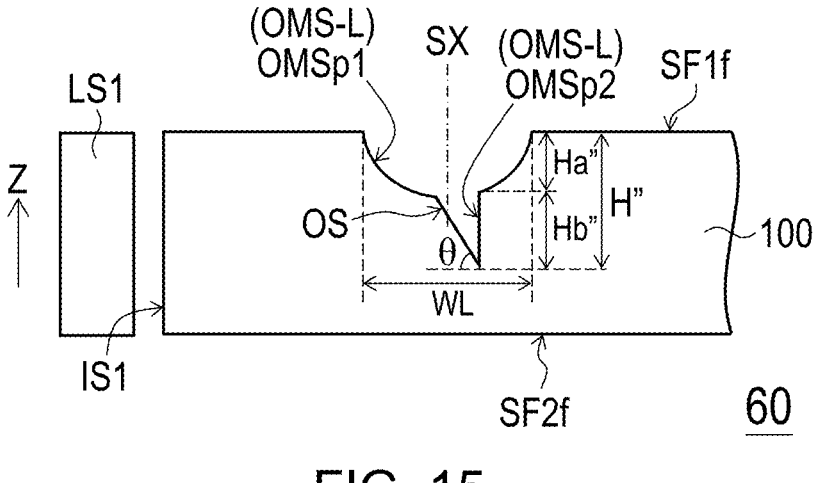
FIG. 15 is a schematic cross-sectional view of a light source module according to a ninth embodiment of the invention.

FIG. 15 is a schematic cross-sectional view of a light source module according to a ninth embodiment of the invention. Referring to FIG. 15, the difference between a light source module 60 of the embodiment and the light source module 10 of FIG. 1B lies in that the configuration of the optical microstructure is different. Specifically, in the light source module 60 of the embodiment, each of the plurality of optical microstructures OMS-L has a first part OMSp1 and a second part OMSp2. The optical microstructure OMS-L is composed of the first part OMSp1 and the second part OMSp2 stacked along the normal direction (e.g., the direction Z) of the first surface SF1$f$. More specifically, the first part OMSp1 connects the first surface SF1$f$ and the second part OMSp2.

It is particularly noted that the first part OMSp1 is symmetrically arranged about an axis of symmetry SX perpendicular to the first surface SF1$f$, and the second part OMSp2 is asymmetrically arranged about the axis of symmetry SX. For example, in the embodiment, the first part OMSp1 may be a semicircular or semicircular-like symmetrical mesh dot, and the second part OMSp2 may be a directional mesh dot. In detail, the optical microstructure OMS-L has a height H" along the normal direction of the first surface SF1$f$, and the first part OMSp1 and the second part OMSp2 thereof respectively have a height Ha" and a height Hb" along the normal direction of the first surface SF1$f$. Preferably, the height H" of the optical microstructure OMS-L may be greater than or equal to 0.1 μm and less than or equal to 10 μm, and a ratio of the height Ha" of the first part OMSp1 to the height Hb" of the second part OMSp2 may be greater than or equal to 0.1 and less than or equal to 1.

On the other hand, the second part OMSp2 has an optical surface OS facing the first light incident surface IS1, and an included angle θ is provided between the optical surface OS and a virtual plane parallel to the first surface SF1$f$. Preferably, the included angle θ may be greater than or equal to 35 degrees and less than or equal to 55 degrees. The optical microstructure OMS-L has a width WL along the normal direction of the first light incident surface IS1, and the width WL may be greater than or equal to 5 μm and less than or equal to 30 μm.

Figure 16E:
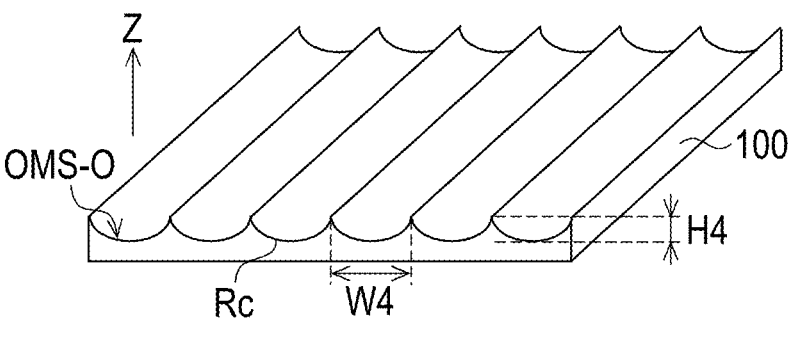

FIG. 16A is a three-dimensional schematic diagram of a light source module according to an embodiment of the invention. FIG. 16B to FIG. 16J are three-dimensional schematic diagrams of other modified embodiments of the light source module of FIG. 16A. It is particularly noted that FIG. 16A to FIG. 16J only illustrate the light guide plate of the light source module and the optical microstructures disposed on a surface of the light guide plate, and omit illustrating the light source of the light source module. Referring to FIG. 16A to FIG. 16C, the optical microstructure is disposed on a surface of the light guide plate, and the optical microstructure may be strip-shaped convex curved surface (e.g., the optical microstructure OMS-M in FIG. 16A), point-shaped convex curved surface (e.g., the optical microstructure OMS-N in FIG. 16B) or a combination of the two (e.g., the optical microstructures OMS-M and OMS-N). For example, the curved surfaces in FIG. 16A to FIG. 16C may be arc-shaped curved surfaces. As shown in FIG. 16A, the curvature radius of the curved surface Rx of the optical microstructure OMS-M may be greater than or equal to 30 μm and less than or equal to 100 μm. A height H3 of the optical microstructure OMS-M may be greater than or equal to 3 μm and less than or equal to 40 μm, and a ratio of the height H3 to a width W3 of the optical microstructure OMS-M may be greater than or equal to 0.1 and less than or equal to 0.5. As shown in FIG. 16B, the curvature radius of the curved surface of the optical microstructure OMS-N may be greater than or equal to 30 μm and less than or equal to 100 μm. A diameter of the orthographic projection profile of the optical microstructures OMS-N on the first surface SF1$f$ may be greater than or equal to 3 μm and less than or equal to 10 μm, and the arrangement pitch of the plurality of optical microstructures OMS-N may be greater than or equal to 10 μm and less than or equal to 40 μm. It is particularly noted that the plurality of optical microstructures OMS-N may be spaced apart, or any two adjacent optical microstructures OMS-N partially overlap each other (as shown in FIG. 16D). In the embodiment of FIG. 16D, the overlap ratio may be greater than or equal to 10% and less than or equal to 60%. As shown in FIG. 16C, the light guide plate 100 has a plurality of optical microstructures OMS-M and a plurality of optical microstructures OMS-N overlapping each other. For example, the point-shaped optical microstructures OMS-N may be disposed on the strip-shaped optical microstructures OMS-M.

Figure 16F:
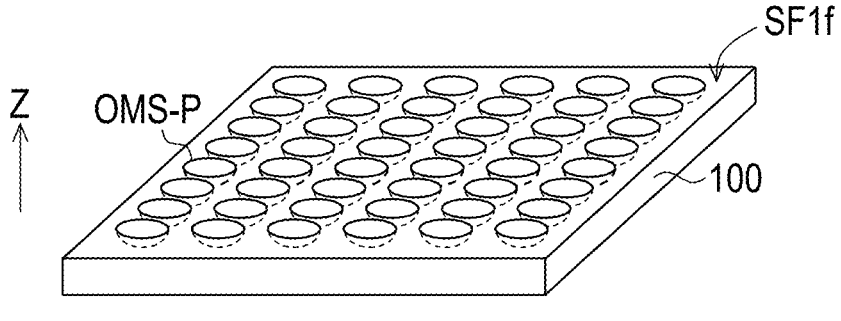
Figure 16G:
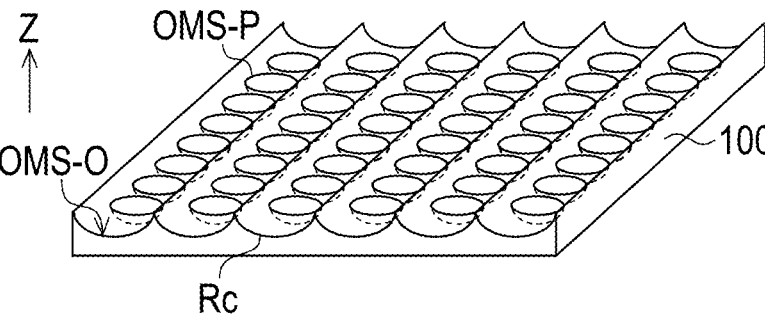

Referring to FIG. 16E to FIG. 16G, the difference between the light source module of the embodiment and the light source module of FIG. 16A lies in that the configuration of the optical microstructure is different. Specifically, in the light source module of the embodiment, the optical microstructures are disposed on the surface of the light guide plate, and the optical microstructure may be a strip-shaped concave curved surface (e.g., the optical microstructure OMS-O in FIG. 16E), a point-shaped concave curved surface (e.g., the optical microstructure OMS-P in FIG. 16F) or a combination of the two (e.g., the optical microstructures OMS-O and OMS-P in FIG. 16G). For example, the curved surface in each of FIG. 16E to FIG. 16G may be an arc-shaped curved surface. Ranges of curvature radius, a height H4 and a ratio of the height H4 to a width W4 of the curved surface Rc of the optical microstructure OMS-O are respectively similar to the ranges of the curvature radius, the height H3 and the ratio of the height H3 to the width W3 of the curved surface Rx of the optical microstructure OMS-M. The ranges of curvature radius, diameter of the orthographic projection profile, height and arrangement pitch of the optical microstructure OMS-P are respectively similar to the ranges of curvature radius, diameter of the orthographic projection profile, height and arrangement pitch of optical microstructure OMS-N. Therefore, please refer to the relevant paragraphs of the foregoing embodiment for detailed description, and will not be described again here. Besides, similar to the optical microstructure OMS-N, the plurality of optical microstructures OMS-P may be spaced apart, or any two adjacent optical microstructures OMS-P partially overlap each other (as shown in FIG. 16D). It is particularly noted that the symbol OMS-N/OMS-P in FIG. 16D represents the optical microstructure in FIG. 16D may be the optical microstructure OMS-N or the optical microstructure OMS-P.

Figure 16H:
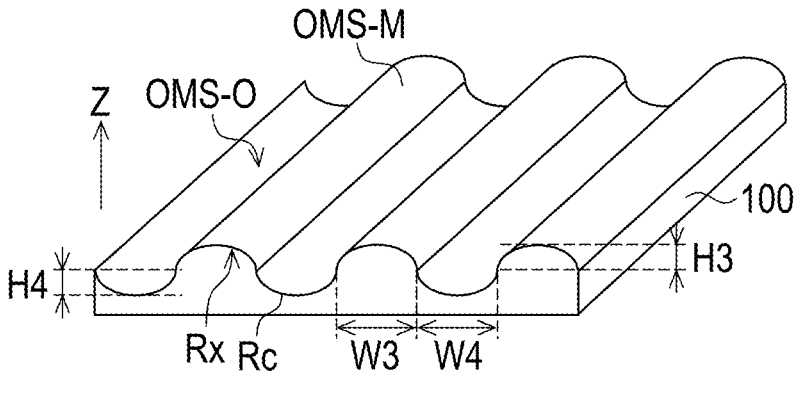
Figure 16I:
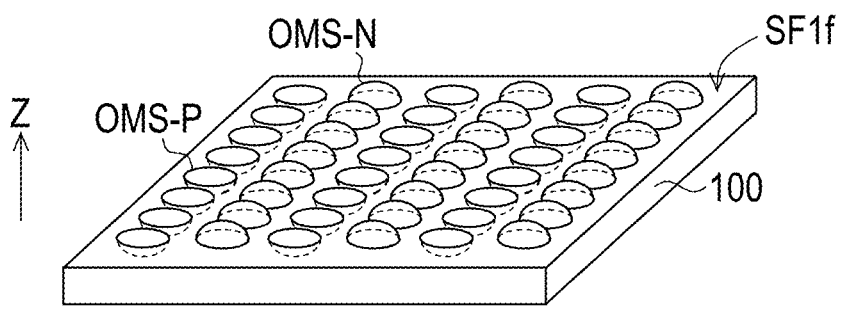
Figure 16J:
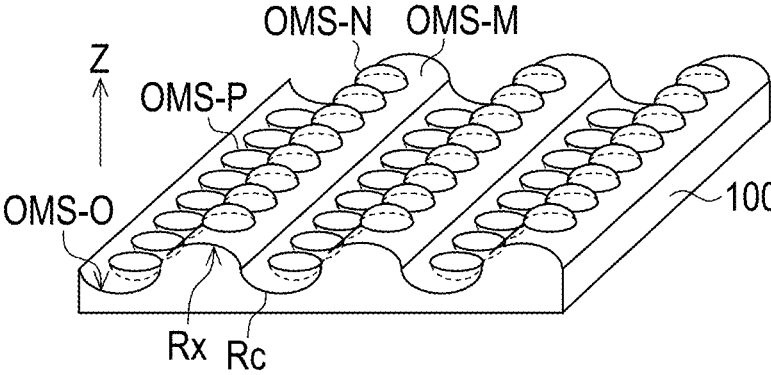

Referring to FIG. 16H to FIG. 16J, the difference between the light source module of the embodiment and the light source module of FIG. 16A lies in that the configuration of the optical microstructure is different. Specifically, in the light source module of the embodiment, the plurality of optical microstructures are disposed on the surface of the light guide plate, and the plurality of optical microstructures may include strip-shaped convex curved surfaces and strip-shaped concave curved surfaces (e.g., the optical microstructures OMS-M and OMS-O in FIG. 16H), point-shaped convex curved surfaces and point-shaped concave curved surfaces (e.g., the optical microstructures OMS-N and OMS-P in FIG. 16I), or a combination of the two (e.g., the optical microstructures OMS-M, OMS-N, OMS-O and OMS-P in FIG. 16J). For example, the curved surface in each of FIG. 16H to FIG. 16J may be an arc-shaped curved surface. In FIG. 16H to FIG. 16J, the optical microstructures OMS-M and OMS-O may be alternately arranged along a direction, and the optical microstructures OMS-N and OMS-P may be alternately arranged along at least one direction, but the invention is not limited thereto.

In the embodiments of FIG. 16A to FIG. 16J, a lens-like curved surface structure can be formed on the substrate of the light guide plate by using ultra-precision substrate processing technology, and light guide plates with the aforementioned optical microstructures can be formed by laser direct writing lithography technology, electroforming mold production, etc., but the invention is not limited thereto.

FIG. 17A is a three-dimensional schematic diagram of an optical microstructure of a light guide plate according to an embodiment of the invention. FIG. 17B to FIG. 17F are three-dimensional schematic diagrams of other modified embodiments of the optical microstructure of FIG. 17A. It is particularly noted that FIGS. 17A to 17F only illustrate the optical microstructure and omit the light guide plate. Referring to FIG. 17A to FIG. 17F, FIGS. 17A to 17F respectively illustrate three-dimensional schematic diagrams of the optical microstructures OMS-Q, OMS-R, OMS-S, OMS-T, OMS-U, and OMS-V. As shown in FIG. 17A, FIG. 17B and FIG. 17F, each of the optical microstructure OMS-Q, the optical microstructure OMS-R and the optical microstructure OMS-V has a curved surface R and/or a curved surface R'. For example, each of the curved surface R and the curved surface R' in FIG. 17A, FIG. 17B and FIG. 17F may be an arc-shaped curved surface. The size and angle range of each optical microstructure in FIGS. 17A to 17F are as follows: the curvature radius of each of the curved surface R and the curved surface R' may be greater than or equal to 10 $\mu$m and less than or equal to 30 $\mu$m. The height Hc may be greater than or equal to 0.1 $\mu$m. and less than or equal to 10 $\mu$m. The width We1 of a first end portion may be greater than or equal to another width We1' of the first end portion. The width We1 may be greater than or equal to 5 $\mu$m and less than or equal to 30 $\mu$m. The ratio of the width We1 to the height Hc may be greater than or equal to 2 and less than or equal to 7. The width We2 of a second end portion may be greater than or equal to another width We2' of the second end portion. The first angle θc1 may be greater than or equal to 65 degrees and less than or equal to 85 degrees, and the second angle θc2 may be greater than or equal to 35 degrees and less than or equal to 55 degrees. For example, in an embodiment in which the optical microstructure is a recessed structure recessed from the surface of the light guide plate, the first end portion and the second end portion may be the opening and the bottom surface of the optical microstructure respectively, but the invention is not limited thereto.

The shape structure of the optical microstructure of the light guide plate of the invention is not limited to FIGS. 17A to 17F. The shape of the optical microstructure may be conical, triangular, trapezoidal, cylindrical, bowl-shaped or other suitable shapes. The shape structure of the optical microstructure can also be a symmetrical or asymmetric shape structure. In addition, the aforementioned optical microstructure may be preferably produced by using laser continuous dotting technology, ultra-precision processing technology, different etching processes, impact point process, etc., but the invention is not limited thereto.

Figure 18A:
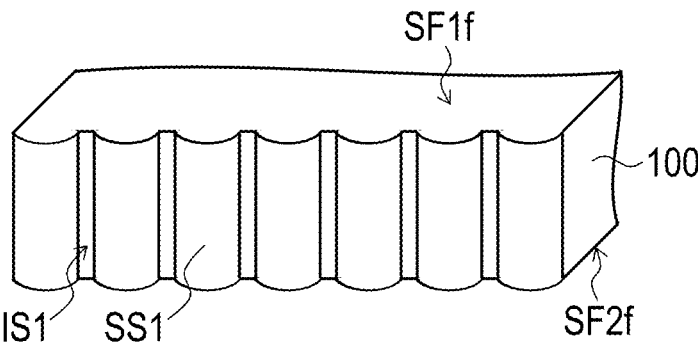
FIG. 18A is a schematic three-dimensional view of a light guide plate according to an embodiment of the invention.
Figure 18B:
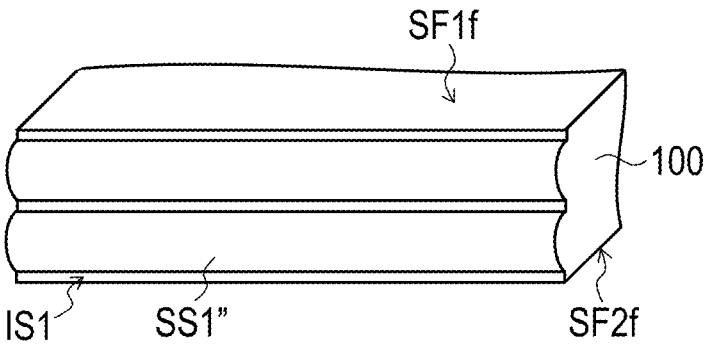
FIG. 18B to FIG. 18H are schematic three-dimensional views of other embodiments of the light guide plate of FIG. 18A.

FIG. 18A is a schematic three-dimensional view of a light guide plate according to an embodiment of the invention. FIG. 18B to FIG. 18H are schematic three-dimensional views of other embodiments of the light guide plate of FIG. 18A. Referring to FIG. 18A, in order to make the optical path distribution of the light emitted by the light source (e.g., the first light source LS1 shown in FIG. 1B) more uniform after passing through the first light incident surface IS1, the first light incident surface IS1 of the light guide plate 100 may be provided with a plurality of surface structures SS1, and these surface structures SS1 are, for example, a plurality of lenticular lens structures. For example, these lenticular lens structures may be arranged along a direction parallel to the first light incident surface IS1 and the first surface SF1$f$, and each of the lenticular lens structures extends in the normal direction of the first surface SF1$f$. However, the invention is not limited thereto. Referring to FIG. 18B, in other modified implementation, the plurality of lenticular lens structures (i.e., the surface structure SS1") may be arranged along the normal direction of the first surface SF1$f$, and each of the lenticular lens structures extends in a direction parallel to the first light incident surface IS1 and the first surface SF1$f$.

Figure 18C:
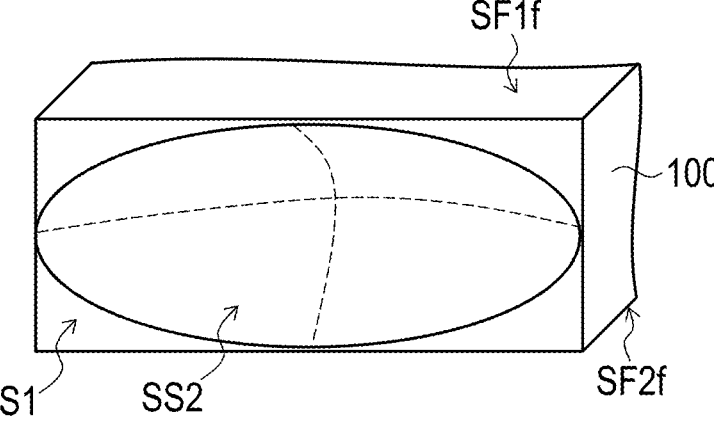
Figure 18D:
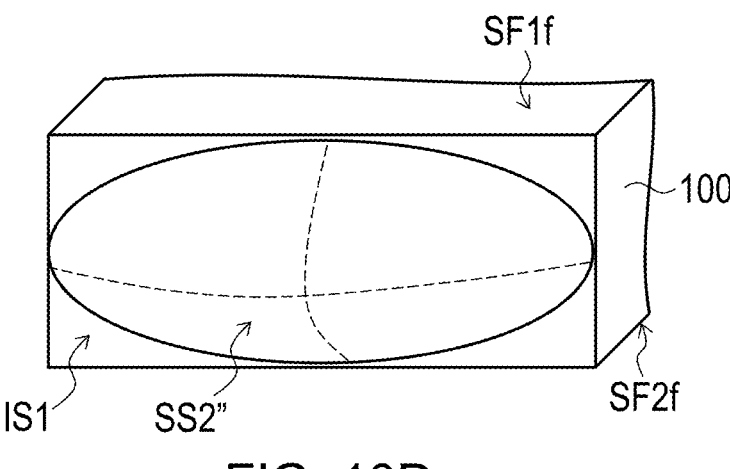
Figure 18E:
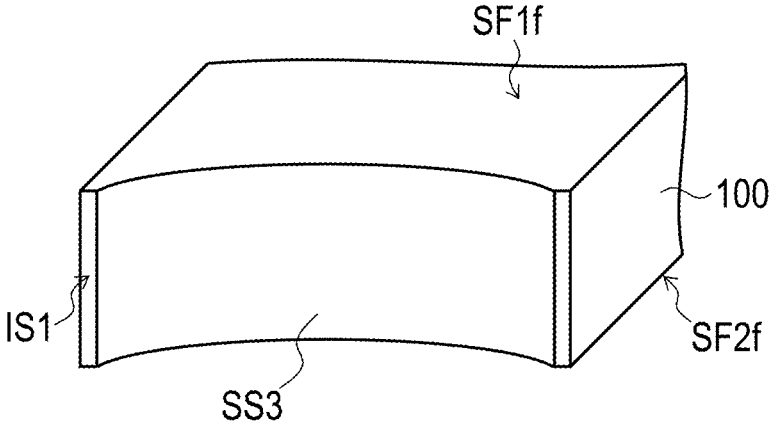
Figure 18F:
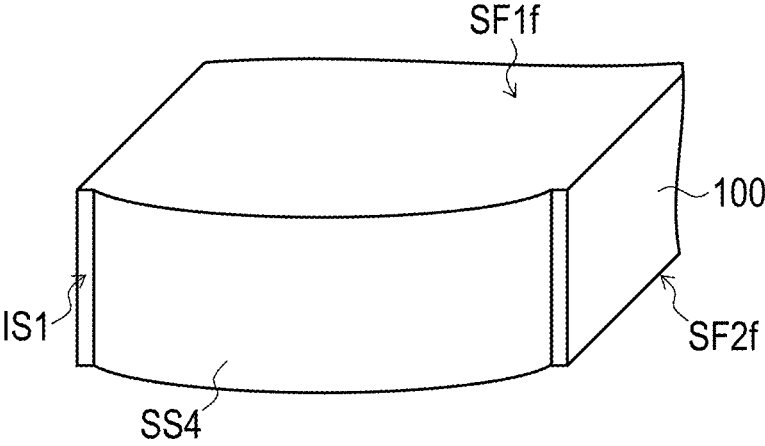
Figure 18G:
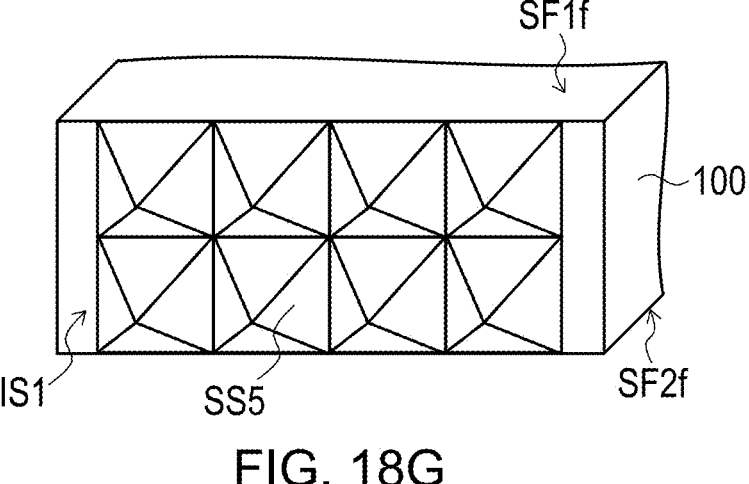

However, the invention is not limited thereto. Referring to FIG. 18C, in a modified implementation, a surface structure SS2 may be provided on the first light incident surface IS1 of the light guide plate 100, and the surface structure SS2 may be a lens structure, for example. The lens structure may be a concave lens structure recessed from the first light incident surface IS1 toward the inside of the light guide plate 100, but the invention is not limited thereto. Referring to FIG. 18D, in a modified implementation, the lens structure (i.e., the surface structure SS2") may be a convex lens structure protruding from the first light incident surface IS1 in a direction away from the light guide plate 100. Referring to FIGS. 18E and 18F, FIGS. 18E and 18F illustrate modified embodiments of the concave lens structure and the convex lens structure respectively. In FIG. 18E, a surface structure SS3 is provided on the first light incident surface IS1, and the surface structure SS3 is, for example, a concave lens structure recessed from the first light incident surface IS1 toward the light guide plate 100. In FIG. 18F, a surface structure SS4 is provided on the first light incident surface IS1, and the surface structure SS4 is, for example, a convex lens structure protruding from the first light incident surface IS1 in a direction away from the light guide plate 100. Referring to FIG. 18G, In another modified embodiment, the first light incident surface IS1 is provided with a plurality of surface structures SS5, and these surface structures SS5 are, for example, a plurality of pyramid structures protruding from the first light incident surface IS1. A quadrangular pyramid structure of FIG. 18G is an example of the pyramid structure, but the invention is not limited thereto.

Figure 18H:
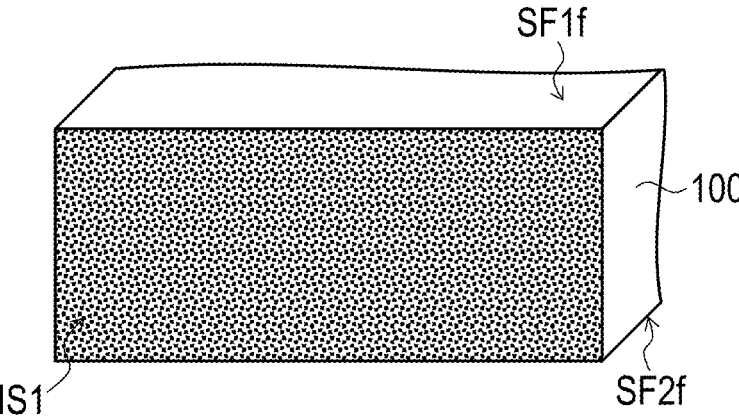

In the aforementioned embodiments of FIG. 18A to FIG. 18G, the first light incident surface IS1 is structured to change the path of the light emitted by the light emitting device and incident on the first light incident surface IS1 so that the light is evenly diffused, but the invention is not limited thereto. Referring to FIG. 18H, in a modified implementation, the first light incident surface IS1 can be roughened to form a rough light incident surface, so that the light emitted by the light emitting device and incident on the first light incident surface IS1 may be evenly diffused. In addition, in some modified implementations, the first light incident surface IS1 may be structured and roughened.

Figure 19A:
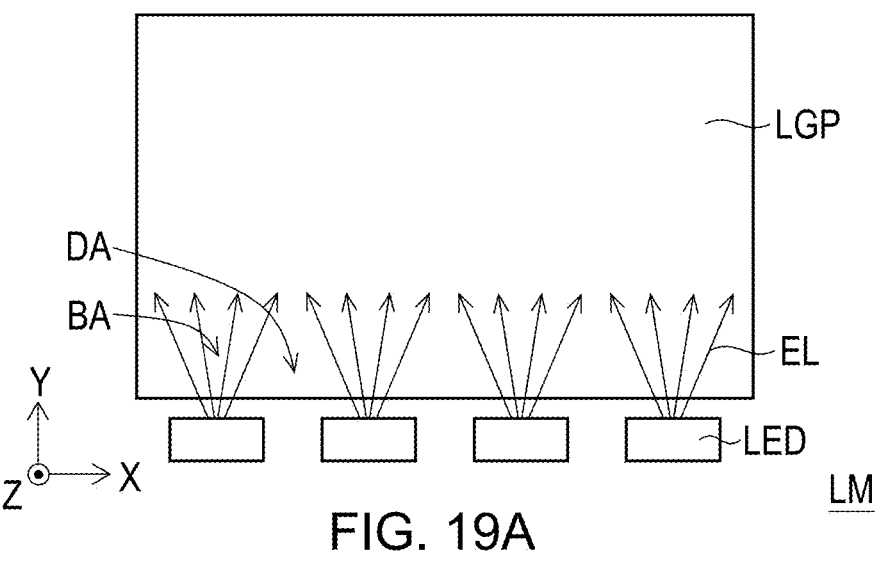
FIG. 19A is a schematic top view of a light source module of a prior art.
Figure 19B:
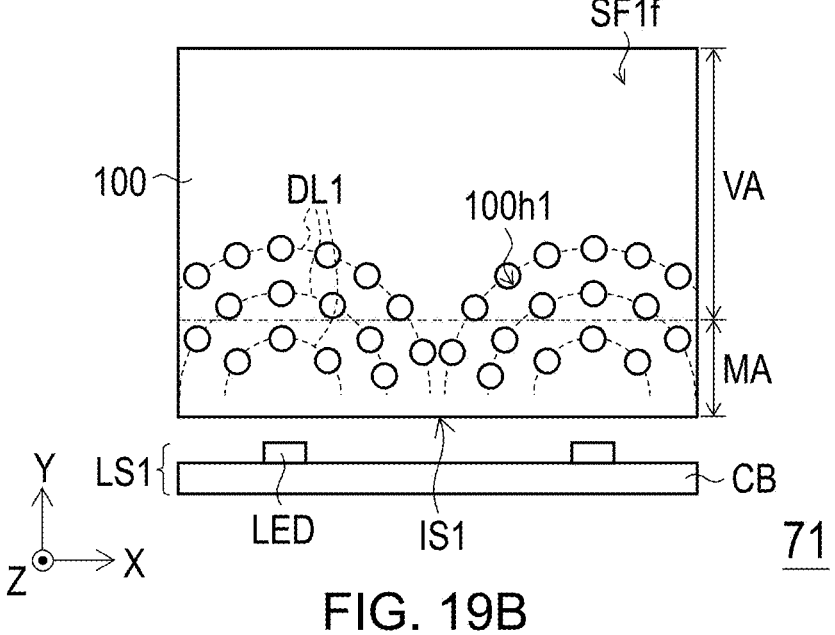
FIG. 19B is a schematic top view of a light source module according to a tenth embodiment of the invention.
Figure 19C:
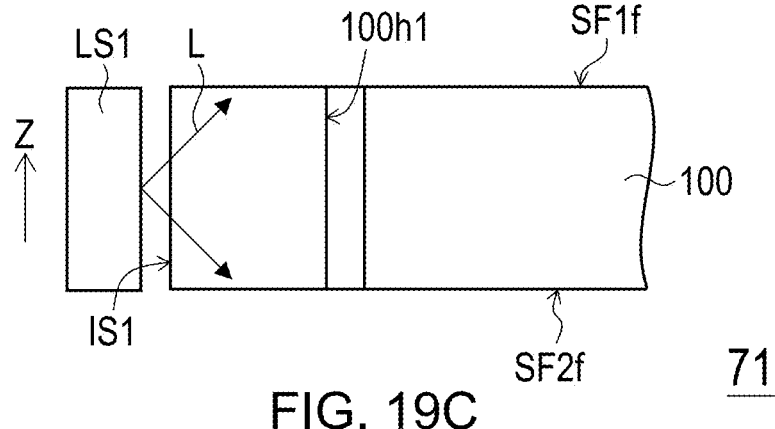
FIG. 19C is a schematic cross-sectional view of the light source module of FIG. 19B.

FIG. 19A is a schematic top view of a light source module of a prior art. FIG. 19B is a schematic top view of a light source module according to a tenth embodiment of the invention. FIG. 19C is a schematic cross-sectional view of the light source module of FIG. 19B. FIG. 19D to FIG. 19G are schematic top views of other embodiments of the light source module of FIG. 19B. For clarity, the light guide plate 100 in FIG. 19B to FIG. 19G omits the illustration of distribution of the optical microstructures OMS on the first surface SF1$f$ as shown in FIG. 1A.

Referring to FIG. 19A, in the light source module LM of the prior art, due to the spacing between adjacent light-emitting devices LED and the fan-shaped light pattern of the light EL emitted by the light-emitting device LED, the light guide plate LGP exhibits hot spot phenomenon with bright areas BA and dark areas DA. Referring to FIG. 19B and FIG. 19C, the light guide plate 100 of a light source module 71 of the embodiment has a light mixing area MA and a viewable area VA. The light mixing area MA is located between the viewable area VA and the first light incident surface IS1, and is adjacent to the first light incident surface IS1. The light L emitted by the plurality of light emitting devices LED of the first light source LS1 is mixed in the light mixing area MA to generate uniform light entering the viewable area VA. It is particularly noted that the light guide plate 100 may be provided with at least one hole between the viewable area VA and the first light incident surface IS1. For example, in the embodiment, the light guide plate 100 may be provided with a plurality of holes 100$h$1 overlapping the light mixing area MA and the viewable area VA. An orthographic projection profile of each of the holes 100$h$1 on the first surface SF1$f$ is circular, and the holes 100$h$1 may be distributed in a radial manner corresponding to each light emitting device LED of the first light source LS1. In other embodiment not shown, the orthographic projection profile of the hole on the first surface SF1$f$ may be a polygon, a combination of straight lines and curves, or other suitable shapes. As shown in FIG. 19B, the plurality of holes 100$h$1 are arranged along a plurality of arc-shaped virtual distribution lines DL1, and the arc-shaped virtual distribution lines DL1 correspond to and partially surround the light-emitting device LED. More specifically, as shown in FIG. 19B, two light-emitting devices LED are adjacent to each other along the direction X, and two arc-shaped virtual distribution lines DL1 adjacent to each other along the direction X respectively correspond to the two light-emitting devices LED. The configuration of the holes 100$h$1 allows the light from the first light incident surface IS1 to be further refracted or reflected, thereby changing its optical path, such that the optical path distribution of the light emitted by the first light source LS1 may be more uniform when entering the viewable area VA. In particular, although FIG. 19C illustrates the hole 100$h$1 penetrating through the light guide plate 100, the cross-sectional view of the hole 100$h$1 in FIG. 17B is merely an example, and the cross-sectional shape of the hole 100$h$1 of the invention is not limited thereto. For example, the hole may extend from the first surface SF1$f$ or the second surface SF2$f$ of the light guide plate 100 into the light guide plate 100 without penetrating the light guide plate 100, or the hole may be entirely within the light guide plate 100 and not penetrate the light guide plate 100, that is, the hole may be completely enclosed by the light guide plate 100.

Figure 19D:
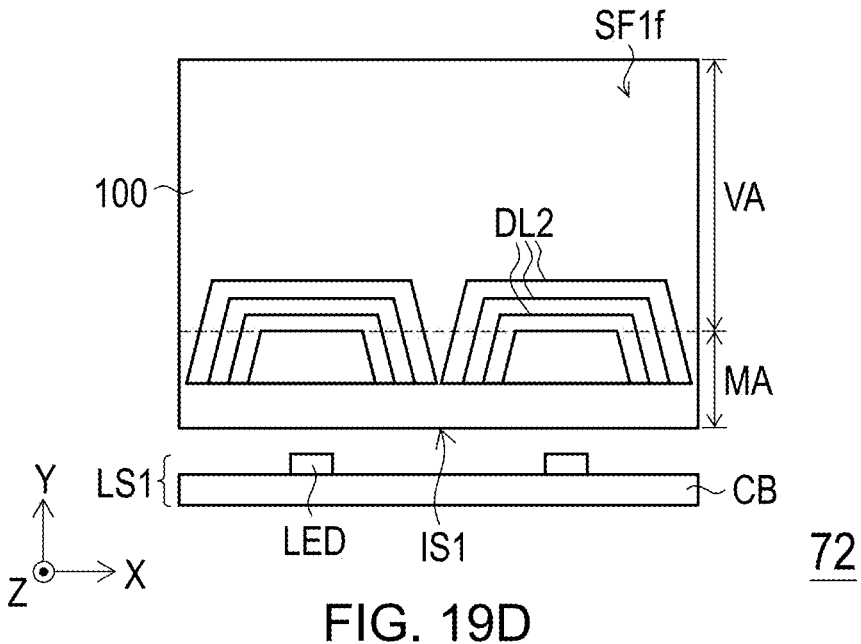
FIG. 19D to FIG. 19G are schematic top views of other embodiments of the light source module of FIG. 19B.
Figure 19E:
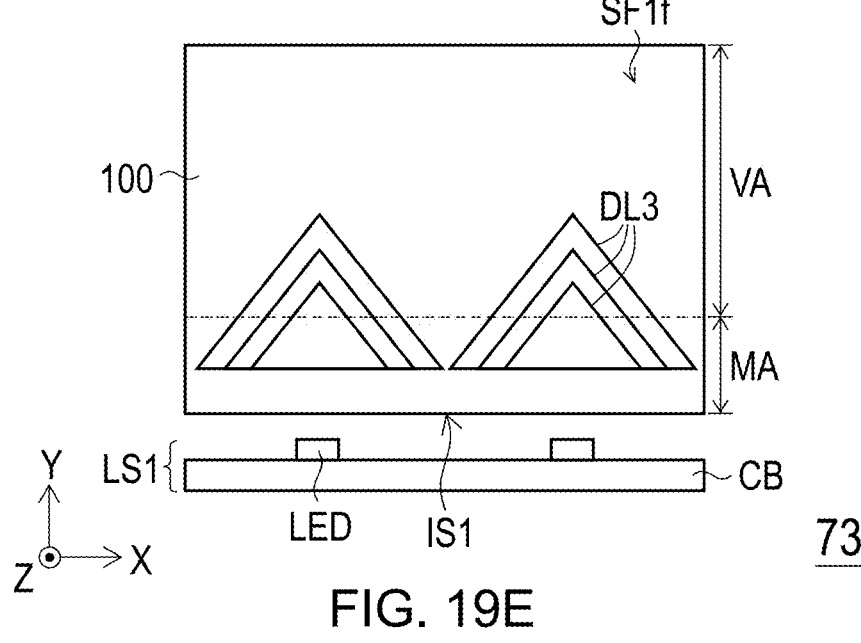
Figure 19F:
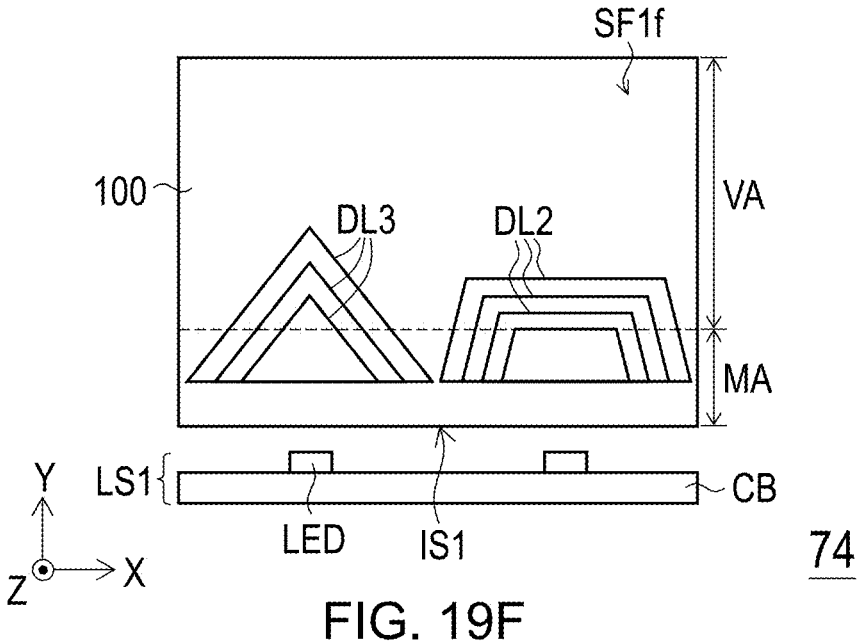
Figure 19G:
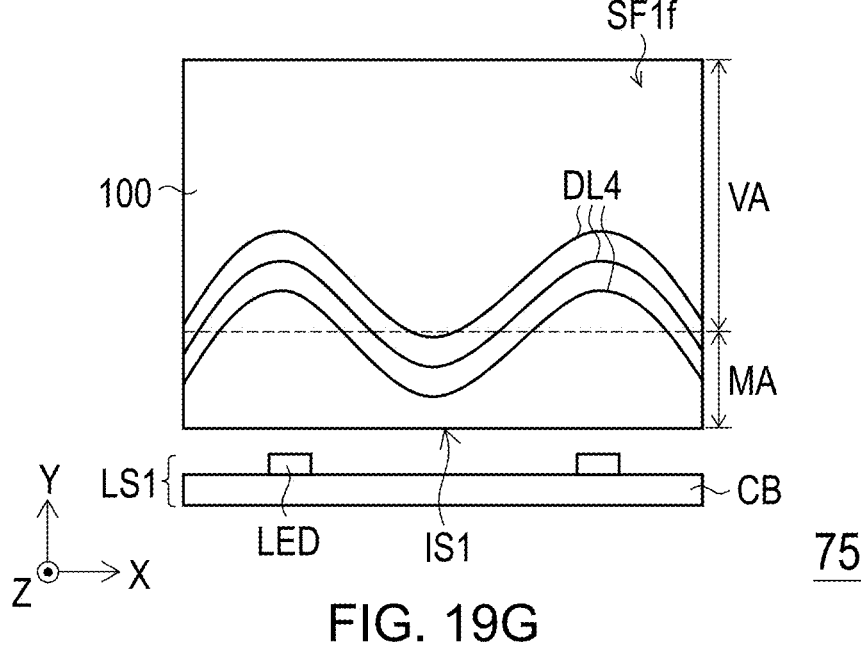

However, the invention is not limited thereto. Referring to FIG. 19D, in a light source module 72 of a modified embodiment, each of the plurality of holes (not shown) on the light guide plate 100 is arranged along a plurality of virtual distribution lines DL2. Each of the plurality of virtual distribution lines DL2 corresponds to and partially surround the light-emitting device LED, and an orthographic projection profile of each virtual distribution line DL2 on the first surface SF1$f$ may be Polygonal (e.g., at least part of a trapezoid), but the invention is not limited thereto. For clarity, FIG. 19D and subsequent FIG. 19E to FIG. 19G omit the illustration of the holes arranged on the virtual distribution lines. Referring to FIG. 19E, in a light source module 73 of a modified implementation, the orthogonal projection profile of the virtual distribution line DL3 on the first surface SF1$f$ may be another polygon (e.g., at least part of a triangle). Referring to FIG. 19F, in a light source module 74 of another modified implementation, the plurality of virtual distribution lines may be a combination of the virtual distribution lines DL2 and the virtual distribution lines DL3. Referring to FIG. 19G, in a light source module 75 of another modified implementation, the orthographic projection profile of each of the plurality of virtual distribution lines DLA on the first surface SF1$f$ of the light guide plate 100 may be wavy. Besides, the density of the plurality of holes on the plurality of virtual distribution lines may be adjusted. More specifically, the density of the plurality of holes may vary along at least one of the direction X and the direction Y. For example, in FIG. 19F, the density of holes provided on the plurality of virtual distribution lines DL2 may change from low density to high density along the direction Y, and the density of holes provided on the plurality of virtual distribution lines DL3 may change from low density to high density along the direction Y. In FIG. 19G, the density of holes arranged on a virtual distribution line DL4 close to the first light incident surface IS1 may be configured sequentially as low density, high density and low density along the direction X, wherein the positions of the aforementioned low density, high density and low density respectively correspond to the light-emitting device LED on the left side, the area between the two light-emitting devices LED and the light-emitting device LED on the right side along the direction Y. The density of the holes arranged on another virtual distribution line DL4 away from the first light incident surface IS1 may be configured sequentially as high density, low density and high density along the direction X, wherein the positions of the aforementioned high density, low density and high density respectively correspond to the light-emitting device LED on the left side, the area between the two light-emitting devices LED and the light-emitting device LED on the right side.

It is particularly important to note that due to the range of the light emission angle of the light emitting device LED and the light intensity distribution within the range of the light emission angle, in an area of the light guide plate 100 close to the first light incident surface IS1, as shown in FIG. 19B and FIG. 19D to FIG. 19G, a partial area between two adjacent light emitting devices LED corresponding to the first light source LS1 is prone to form a dark area. Therefore, by creating a sparse and dense distribution of the aforementioned holes on the virtual distribution lines in the light mixing area MA and part of the viewable area VA along at least one direction, a hot spot phenomenon of a plurality of bright areas and a plurality of dark areas alternately arranged generated by the plurality of light emitting devices LED in the area of the light guide plate 100 close to the first light incident surface IS1 can be effectively improved.

Figure 21B:
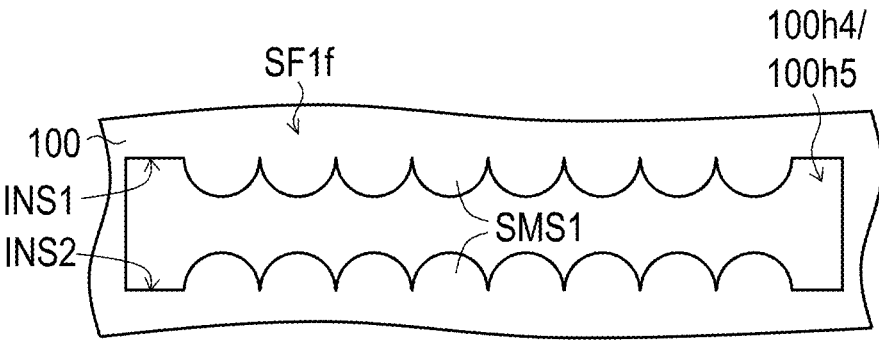
FIG. 21B to FIG. 21D are schematic top views of other modified embodiments of the hole of FIG. 21A.
Figure 21C:
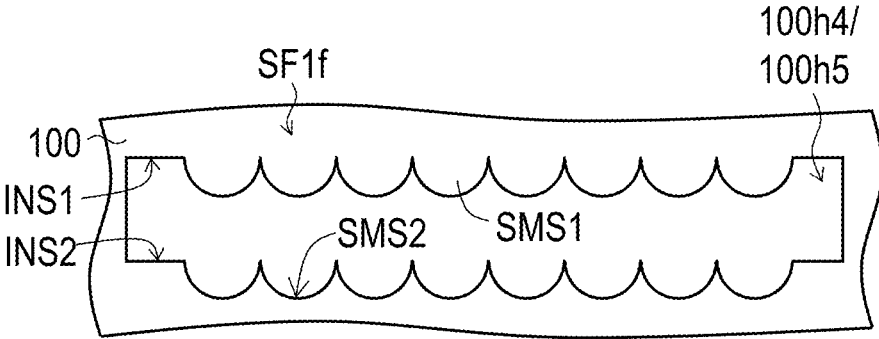
Figure 21D:
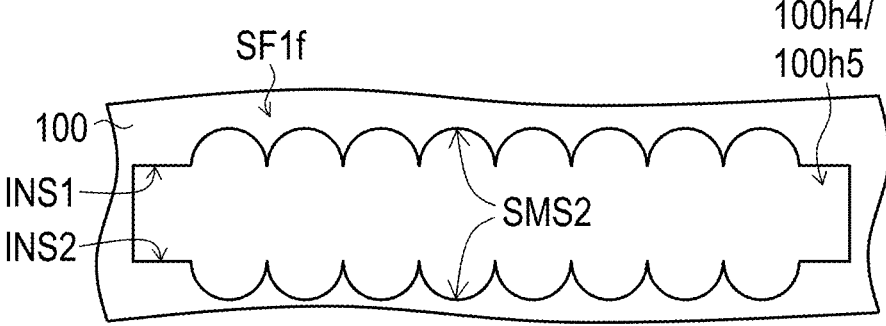

FIG. 20A is a schematic top view of a light source module according to an eleventh embodiment of the invention. FIG. 20B is a schematic top view of another modified embodiment of the light source module of FIG. 20A. FIG. 21A is an enlarged schematic diagram of a hole of a light guide plate of FIG. 20A or FIG. 20B. FIG. 21B to FIG. 21D are schematic top views of other modified embodiments of the hole of FIG. 21A.

Referring to FIG. 20A, it is different from the embodiments of FIG. 19B that the light guide plate 100 of a light source module 81 of the embodiment is provided with a hole 100$h$4. The hole 100$h$4 is, for example, a strip-shaped hole extending parallel to the first light incident surface IS1, and is arranged in the light mixing area MA. However, the invention is not limited thereto. In a light source module 82 of a modified embodiment, the number of strip-shaped holes on the light guide plate 100 may be multiple, such as two holes 100h5 shown in FIG. 20B, and the two holes 100h5 are respectively disposed correspond to two light emitting devices LED of the first light source LS1.

Furthermore, the light guide plate 100 further has a first inner surface INS1 and a second inner surface INS2 defining the hole 100h4 in FIG. 20A or the hole 100h5 in FIG. 20B. It is particularly noted that at least one of the first inner surface INS1 and the second inner surface INS2 may be provided with a plurality of surface microstructures. For example, the plurality of surface microstructures SMS1 may be disposed only on the first inner surface INS1 of the hole 100h4 or the hole 100h5 (as shown in FIG. 21A), disposed on the first inner surface INS1 and the second inner surface INS2 of the hole 100h4 or the hole 100h5 (as shown in FIG. 21B), or disposed only on the second inner surface INS2 (not shown).

In FIG. 21A and FIG. 21B, the surface microstructure SMS1 may be a protruding structure protruded from the first inner surface INS1 or the second inner surface INS2, but the invention is not limited thereto. In a modified implementation, the surface microstructure SMS2 on the second inner surface INS2 may be a recessed structure recessed from the second inner surface INS2 (as shown in FIG. 21C), each of the surface microstructures SMS2 on the first inner surface INS1 and the second inner surface INS2 may be a recessed structure recessed from the first inner surface INS1 or the second inner surface INS2 (as shown in FIG. 21D), or the surface microstructure on the first inner surface INS1 may be a recessed structure recessed from the first inner surface INS1 and the surface microstructure on the second inner surface INS2 may be a protruding structure protruded from the second inner surface INS2 (not shown). In addition, in a modified implementation of FIG. 21A, the surface microstructure may be a recessed structure (not shown) only provided on the first inner surface INS1 and recessed from the first inner surface INS1, or the surface microstructure only provided on the second inner surface INS2 may be a recessed structure recessed from the second inner surface INS2 or a protruding structure protruded from the second inner surface INS2 (not shown). In the above description, the recessed structure recessed from the first inner surface INS1 is a recessed structure recessed from the first inner surface INS1 along a direction away from the second inner surface INS2, the protruding structure protruded from the first inner surface INS1 is a protruding structure protruded from the first inner surface INS1 along a direction toward the second inner surface INS2, the recessed structure recessed from the second inner surface INS2 is a recessed structure recessed from the second inner surface INS2 along a direction away from the first inner surface INS1, and the protruding structure protruded from the second inner surface INS2 is a protruding structure protruded from the second inner surface INS2 along a direction toward the first inner surface INS1.

Figure 22:
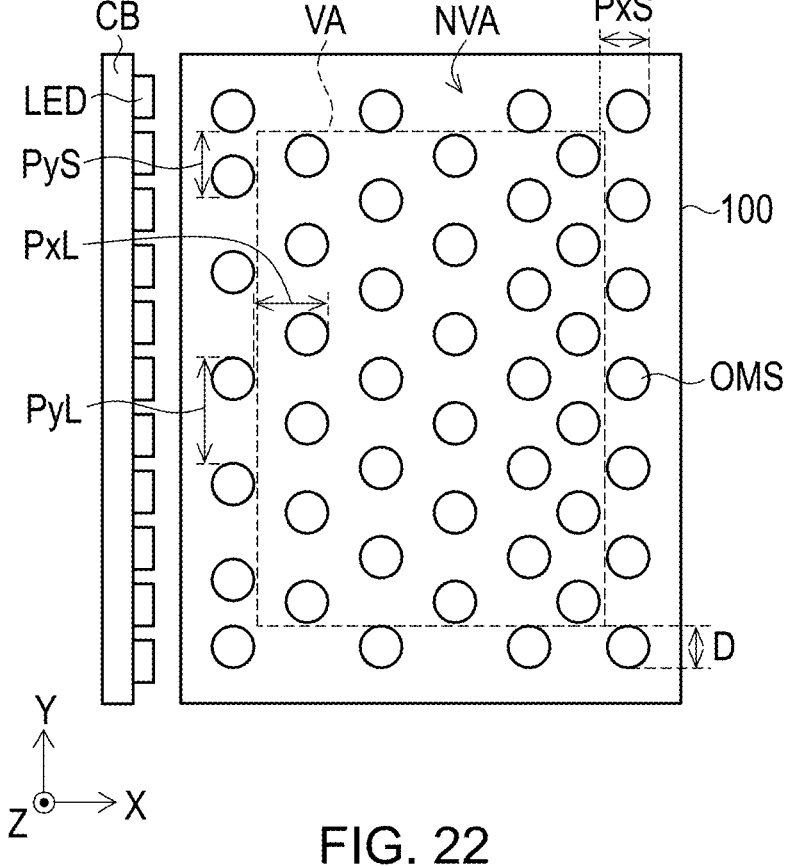
FIG. 22 is a schematic top view of a light source module according to a twelfth embodiment of the invention.

By arranging the aforementioned strip-shaped holes and the plurality of surface microstructures on at least one inner surface of the strip-shaped holes in the light mixing area MA, a hot spot phenomenon of a plurality of bright areas and a plurality of dark areas alternately arranged generated by the plurality of light emitting devices LED in the area of the light guide plate 100 close to the first light incident surface IS1 can be effectively improved FIG. 22 is a schematic top view of a light source module according to a twelfth embodiment of the invention. Referring to FIG. 22, a plurality of optical microstructures OMS are disposed on a surface of the light guide plate 100 and have a first pitch PxL and a second pitch PxS in the direction X. The plurality of optical microstructures OMS have a third pitch PyL and a four pitch PyS in the direction Y. The first pitch PxL and the second pitch PxS are respectively the maximum pitch and the minimum pitch of the plurality of optical microstructures OMS in the direction X, and the third pitch PyL and the fourth pitch PyS are respectively the maximum pitch and the minimum pitch of the plurality of optical microstructures OMS in the direction Y. In the embodiment, a ratio of the first pitch PxL to the second pitch PxS may be greater than or equal to 1 and less than or equal to 10, and a ratio of the third pitch PyL to the fourth pitch PyS may be greater than or equal to 1 and Less than or equal to 10. In an embodiment in which the plurality of optical microstructures OMS have different distribution densities in different areas of the light guide plate 100, the ratio of the first pitch PxL to the second pitch PxS may be greater than 1 and less than or equal to 10 and/or the ratio of the third pitch PyL to the fourth pitch PyS may be greater than 1 and less than or equal to 10. In addition, each of the first pitch PxL and the third pitch PyL is preferably less than or equal to 200 μm. In FIG. 22, the light guide plate 100 has a viewable area VA and a non-viewable area NVA. The non-viewable area NVA is located between a side surface of the light guide plate and the viewable area VA. The majority of the plurality of optical microstructures OMS are arranged in the viewable area VA, while the remaining portions are arranged in the non-viewable area NVA. A maximum distance D between the profile of the optical microstructure OMS arranged in the non-viewable area NVA and the viewable area VA is preferably less than or equal to 1 mm. In the embodiment, the maximum distance D may be the maximum distance along the direction X or the direction Y (i.e., the maximum distance along a direction perpendicular to an edge of the viewable area VA). It should be noted that although FIG. 22 illustrates that a light source LS is disposed on one side of the light guide plate, the position and number of the light source LS are not limited to the embodiment. For example, the light sources LS may be disposed on other side of the light guide plate and/or the number of the light sources LS may be greater than 1.

In particular, the aforementioned FIG. 1A to FIG. 22 illustrate various embodiments of the density distribution of the optical microstructure, the shape of the optical microstructure, the structure and shape of the light guide plate, the structure of the light incident surface of the light guide plate, the structure and configuration of the light source of the light source module of the invention. Different embodiments of the invention may be combined to improve the uniformity of light emission of the light source module and avoid light leakage.

To sum up, in a light source module of an embodiment of the invention, a light guide plate is provided with a plurality of optical microstructures on a first surface connected to a first light incident surface. The distribution densities of the optical microstructures in a first area and a second area of the first surface are different from each other. Accordingly, the uniformity of light emission of the light source module at large viewing angles may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light source module, comprising:
a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;
a first light source, disposed on one side of the first light incident surface of the light guide plate; and
a plurality of optical microstructures, disposed on the first surface, wherein a distribution density of the plurality of optical microstructures in the first area is less than a distribution density of the plurality of optical microstructures in the second area, the first light source includes a plurality of first light emitting devices and a plurality of second light emitting devices, the plurality of first light emitting devices and the plurality of second light emitting devices are arranged along a direction parallel to the first light incident surface, the plurality of first light emitting devices are arranged according to a first pitch, the plurality of second light emitting devices are arranged according to a second pitch, and the first pitch is greater than the second pitch.

2. The light source module according to claim 1, further comprising:
a second light source, disposed on one side of a second light incident surface of the light guide plate, wherein the first light incident surface and the second light incident surface are opposite or connected to each other, the first surface of the light guide plate further has a third area, the first area is located between the second area and the third area, and a distribution density of the plurality of optical microstructures in the third area is greater than the distribution density of the plurality of optical microstructures in the first area.

3. The light source module according to claim 1, wherein the plurality of optical microstructures are recessed or protruded from the first surface, each of the plurality of optical microstructures has a structural height along a normal direction of the first surface, and the structural heights of the plurality of optical microstructures gradually increase and then gradually decrease along a direction away from an edge of the first surface or gradually decrease and then gradually increase along the direction away from the edge of the first surface.

4. A light source module, comprising:
a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;
a first light source, disposed on one side of the first light incident surface of the light guide plate; and
a plurality of optical microstructures, disposed on the first surface, wherein a distribution density of the plurality of optical microstructures in the first area is less than a distribution density of the plurality of optical microstructures in the second area, the light guide plate further has a second surface connected to the first light incident surface, the second surface faces away from the first surface, and at least one of the first surface and the second surface is a curved surface,
wherein a distance between the first surface and the second surface gradually increases and then gradually decreases along a direction away from an edge of the first surface or gradually decreases and then gradually increases along the direction away from the edge of the first surface.

5. A light source module, comprising:
a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;
a first light source, disposed on one side of the first light incident surface of the light guide plate; and
a plurality of optical microstructures, disposed on the first surface, wherein a distribution density of the plurality of optical microstructures in the first area is less than a distribution density of the plurality of optical microstructures in the second area, the light guide plate further has a second surface connected to the first light incident surface, the second surface faces away from the first surface, and at least one of the first surface and the second surface is a curved surface,
wherein one of the first surface and the second surface is a concave curved surface, and the other of the first surface and the second surface is a convex curved surface.

6. A light source module, comprising:
a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;
a first light source, disposed on one side of the first light incident surface of the light guide plate; and
a plurality of optical microstructures, disposed on the first surface, wherein a distribution density of the plurality of optical microstructures in the first area is less than a distribution density of the plurality of optical microstructures in the second area,
wherein the plurality of optical microstructures are recessed from the first surface and each has a first optical surface, a second optical surface and a bottom surface connected to the first optical surface and the second optical surface, a first included angle is provided between the first optical surface and a virtual extension surface of the bottom surface, a second included angle is provided between the second optical surface and the bottom surface, the second included angle is greater than or equal to the first included angle, and the first included angle and the second included angle are each greater than or equal to 40 degrees and less than or equal to 50 degrees.

7. The light source module according to claim 6, wherein the first surface has a plurality of openings each defining a corresponding one of the plurality of optical microstructures, the opening and the bottom surface of one of the plurality of optical microstructures respectively have a first width and a second width along a normal direction of the first light incident surface, and the first width is greater than or equal to the second width.

8. The light source module according to claim 6, wherein a cross-sectional profile of each of the first optical surface and the second optical surface is linear, curvilinear, a polyline or a combination of linear and curvilinear.

9. A light source module, comprising:

a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;

a first light source, disposed on one side of the first light incident surface of the light guide plate; and a plurality of optical microstructures, disposed on the first surface, wherein a distribution density of the plurality of optical microstructures in the first area is less than a distribution density of the plurality of optical microstructures in the second area, the plurality of optical microstructures include a plurality of first optical microstructures protruded from the first surface and a plurality of second optical microstructures recessed from the first surface, and the plurality of first optical microstructures are spaced apart from the plurality of second optical microstructures, wherein each of the plurality of first optical microstructures has a first optical surface and a second optical surface connected to each other, the first optical surface is located between the first light incident surface and the second optical surface, a first included angle is provided between the first optical surface and a virtual extension surface of the first surface, a second included angle is provided between the second optical surface and the virtual extension surface, the first included angle is greater than the second included angle, each of the plurality of second optical microstructures has a third optical surface and a fourth optical surface connected to each other, the third optical surface is located between the first light incident surface and the fourth optical surface, a third included angle is provided between the third optical surface and the virtual extension surface, a fourth included angle is provided between the fourth optical surface and the virtual extension surface, and the third included angle is less than the fourth included angle.

10. The light source module according to claim 1, wherein the plurality of optical microstructures are protruded from the first surface and each has a first optical surface and a second optical surface connected to each other, the first optical surface is located between the first light incident surface and the second optical surface, a first included angle is provided between the first optical surface and a virtual extension surface of the first surface, a second included angle is provided between the second optical surface and the virtual extension surface, and the first included angle is greater than the second included angle.

11. A light source module, comprising:

a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;

a first light source, disposed on one side of the first light incident surface of the light guide plate; and a plurality of optical microstructures, disposed on the first surface, wherein a distribution density of the plurality of optical microstructures in the first area is less than a distribution density of the plurality of optical microstructures in the second area, wherein the plurality of optical microstructures are recessed from the first surface and each has a third optical surface and a fourth optical surface connected to each other, the third optical surface is located between the first light incident surface and the fourth optical surface, a third included angle is provided between the third optical surface and a virtual extension surface of the first surface, a fourth included angle is provided between the fourth optical surface and the virtual extension surface, and the third included angle is less than the fourth included angle.

12. The light source module according to claim 1, wherein each of the plurality of optical microstructures has a recessed portion recessed from the first surface and a protruding portion protruded from the first surface, the recessed portion and the protruding portion respectively have a depth and a height along a normal direction of the first surface, and the depth of the recessed portion is greater than or equal to the height of the protruding portion.

13. The light source module according to claim 1, wherein each of the plurality of optical microstructures has a first part and a second part, the first part connects the first surface and the second part, the first part is symmetrically arranged about an axis of symmetry perpendicular to the first surface, and the second part is asymmetrically arranged about the axis of symmetry.

14. The light source module according to claim 1, wherein the first light incident surface is provided with at least one surface structure, and the at least one surface structure include a lenticular lens structure, a lens structure or a pyramid structure.

15. The light source module according to claim 1, wherein the light guide plate is provided with at least one hole.

16. The light source module according to claim 15, wherein the at least one hole includes a plurality of holes, the plurality of holes are arranged along at least one virtual distribution line, and an orthographic projection profile of the at least one virtual distribution line on the first surface is arc-shaped, wavy or polygonal.

17. A light source module, comprising:

a light guide plate, having a first light incident surface, a first side surface and a first surface, wherein the first light incident surface and the first side surface connect the first surface, the first surface of the light guide plate has a first area and a second area, and the second area is located between the first area and one of the first light incident surface and the first side surface;

a first light source, disposed on one side of the first light incident surface of the light guide plate; and a plurality of optical microstructures, disposed on the first surface, wherein a distribution density of the plurality of optical microstructures in the first area is less than a distribution density of the plurality of optical microstructures in the second area, and the light guide plate is provided with at least one hole, wherein the at least one hole is a strip-shaped hole extending parallel to the first light incident surface, the light guide plate further has a first inner surface and a second inner surface defining the strip-shaped hole, and at least one of the first inner surface and the second inner surface is provided with a plurality of surface microstructures.

\* \* \* \* \*